United States Patent [19]
Abe et al.

[11] Patent Number: 5,140,349
[45] Date of Patent: Aug. 18, 1992

[54] RECORDING APPARATUS

[75] Inventors: Makoto Abe, Kashiwa; Kaoru Seto, Chigasaki; Takashi Kawana, Yokohama; Atsushi Kashihara, Hachioji; Hiroshi Mano; Tetsuo Saito, both of Tokyo; Hiroshi Sasame, Yokohama; Michio Itoh, Hachioji; Masaharu Ohkubo, Yokohama; Hiromichi Yamada, Yokohama; Masaki Ojima, Yokohama, all of Japan

[73] Assignee: Canon Kabushiki Kaisha, Tokyo, Japan

[21] Appl. No.: 714,987

[22] Filed: Jun. 14, 1991

Related U.S. Application Data

[63] Continuation of Ser. No. 412,986, Sep. 26, 1989, abandoned.

[30] Foreign Application Priority Data

Sep. 27, 1988 [JP] Japan ............... 63-239708
Dec. 5, 1988 [JP] Japan ............... 63-308409
Dec. 26, 1988 [JP] Japan ............... 63-328352
Dec. 27, 1988 [JP] Japan ............... 63-330591
Jan. 23, 1989 [JP] Japan ............... 1-011851

[51] Int. Cl.$^5$ ............................................. G01D 15/14
[52] U.S. Cl. ............................................. 346/160
[58] Field of Search ............ 346/154, 160, 160.1, 346/108; 359/296; 355/200, 208

[56] References Cited

U.S. PATENT DOCUMENTS

| 4,198,154 | 4/1980 | Masegi et al. | 346/160 |
| 4,528,561 | 7/1985 | Kitamura | 340/745 |
| 4,682,190 | 7/1987 | Ikeda | 346/160 X |
| 4,742,363 | 5/1988 | Shiraishi et al. | 346/108 |
| 4,768,043 | 8/1988 | Saito et al. | 346/160 X |
| 4,786,942 | 11/1988 | Kusumoto et al. | 355/200 |
| 4,816,924 | 3/1989 | Sikiya et al. | 358/296 |
| 4,922,335 | 5/1990 | Outa et al. | 358/80 |

FOREIGN PATENT DOCUMENTS

| 62-162547 | 7/1987 | Japan . |
| 62-162548 | 7/1987 | Japan . |
| 62-162549 | 7/1987 | Japan . |
| 62-162550 | 7/1987 | Japan . |
| 62-162551 | 7/1987 | Japan . |
| 62-163462 | 7/1987 | Japan . |
| 63-39268 | 2/1988 | Japan . |

Primary Examiner—Donald Griffin
Attorney, Agent, or Firm—Fitzpatrick, Cella, Harper & Scinto

[57] ABSTRACT

A recording apparatus includes an input circuit for inputting recording data, a process circuit for performing a recording operation on a photosensitive body on the basis of the recording data input from the input circuit, a designating circuit for designating a recording density, and a control circuit for controlling an operating condition of at least a high-voltage circuit on the basis of designation by the designating circuit. The process circuit includes the high-voltage circuit used for the recording operation.

83 Claims, 42 Drawing Sheets

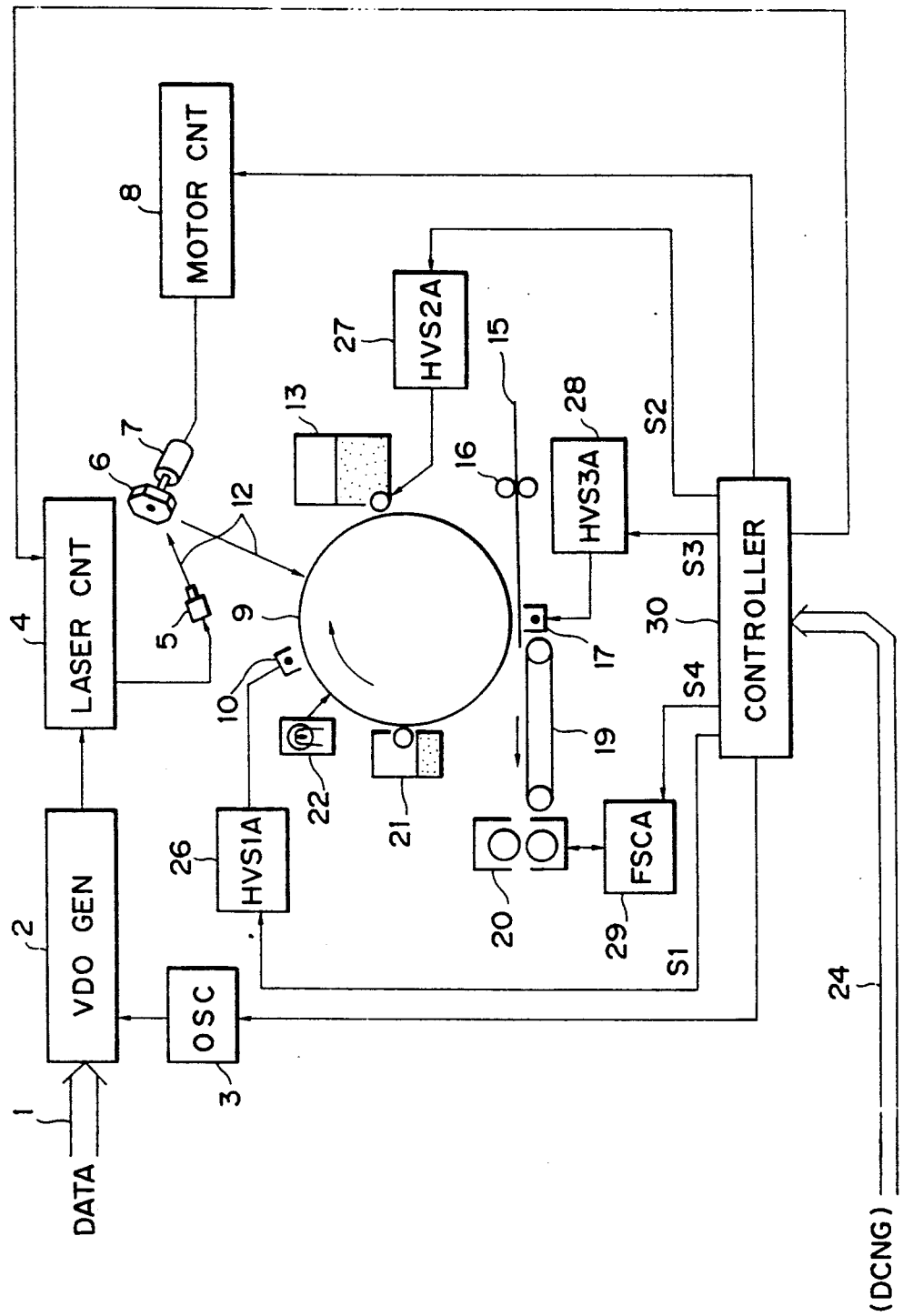

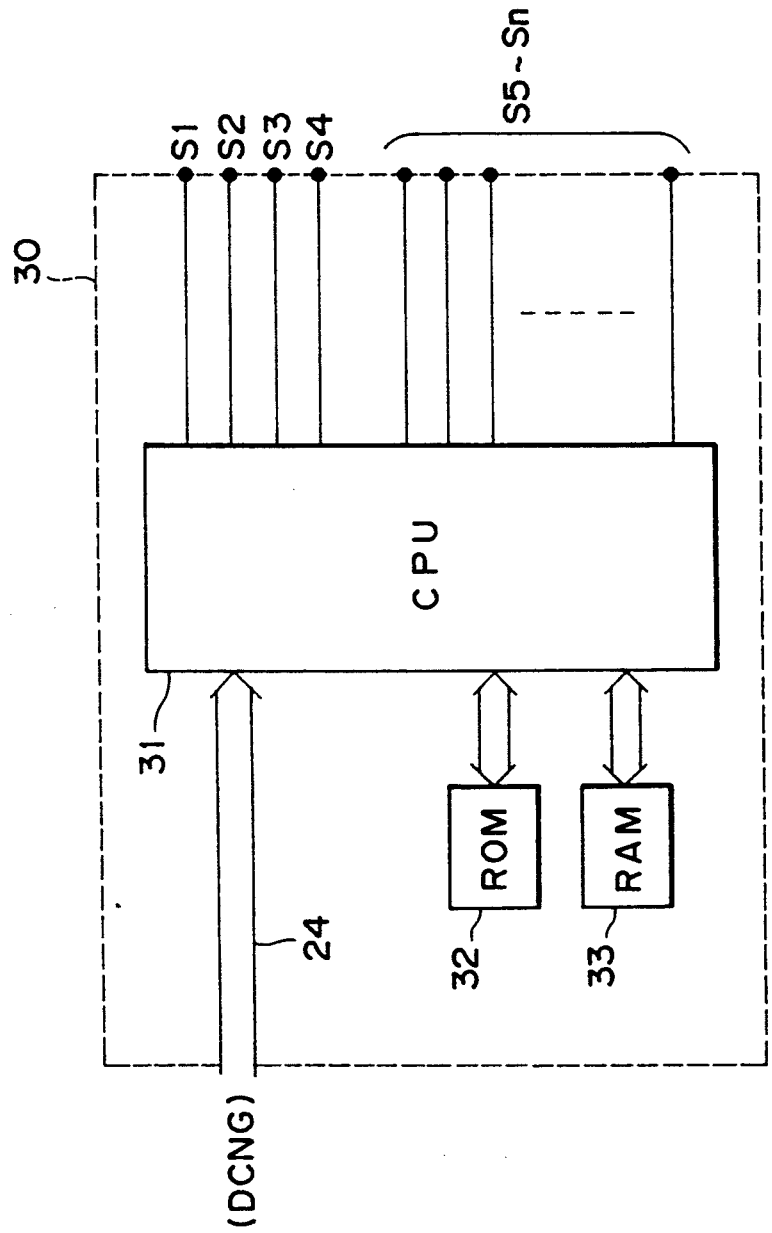

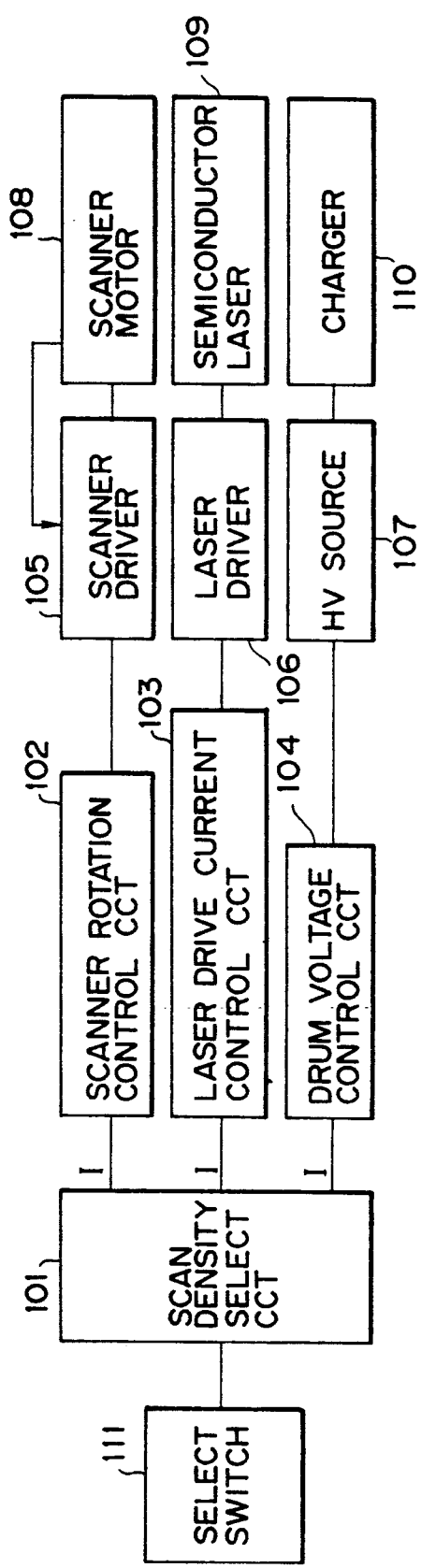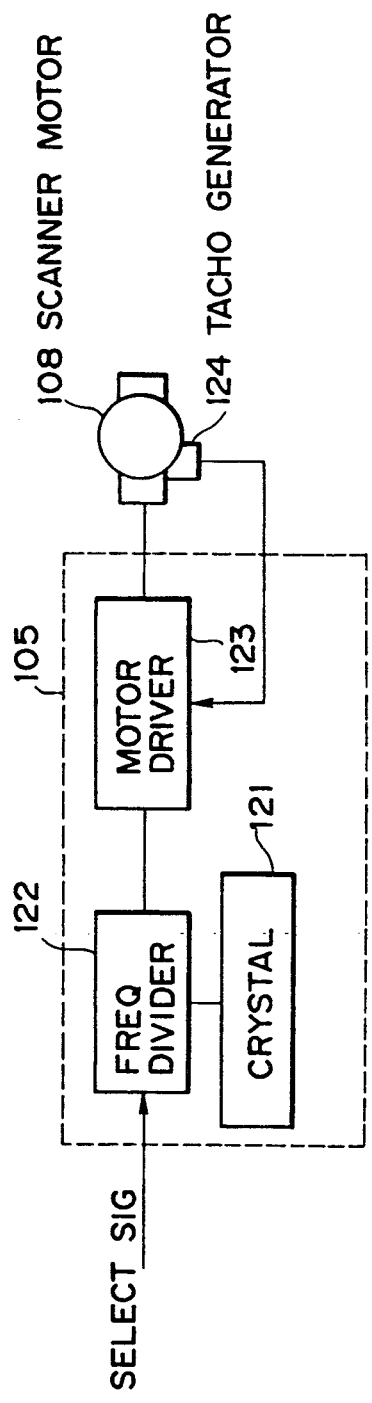
FIG.10
FIG.11

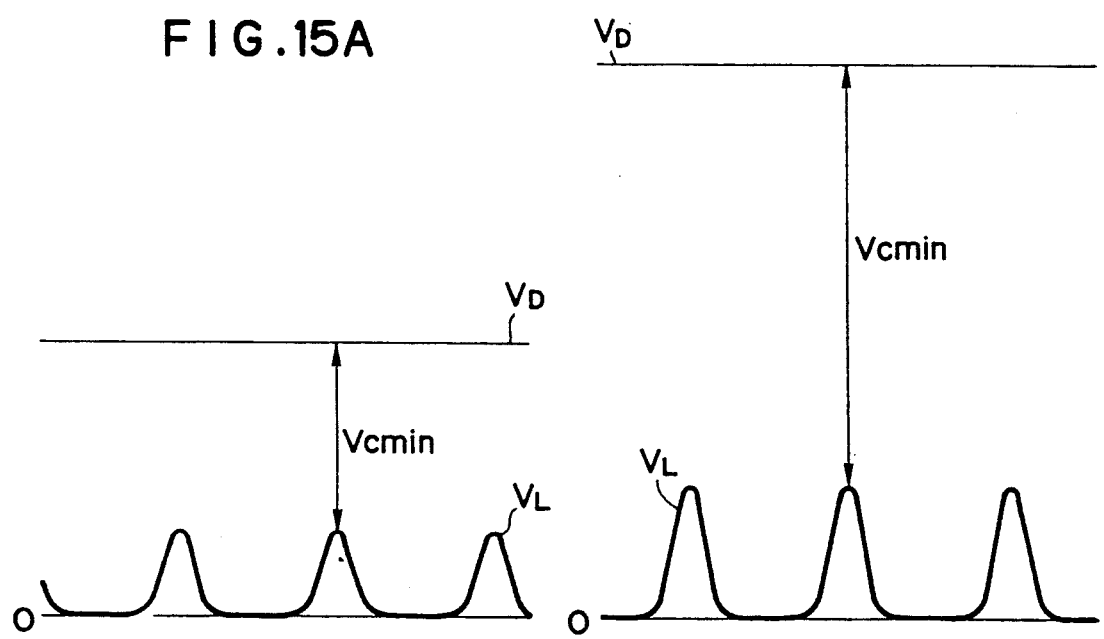

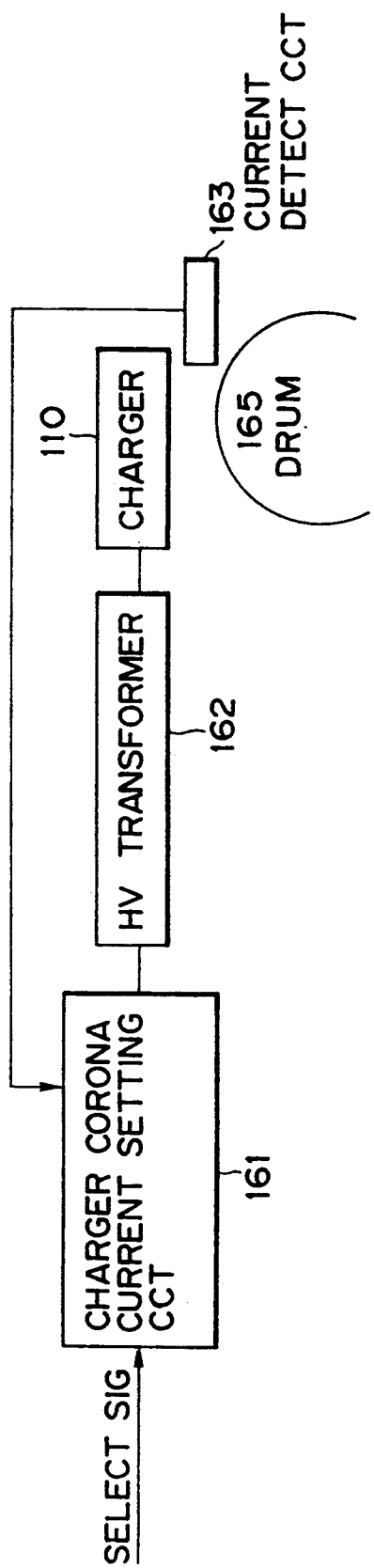

F I G. 24
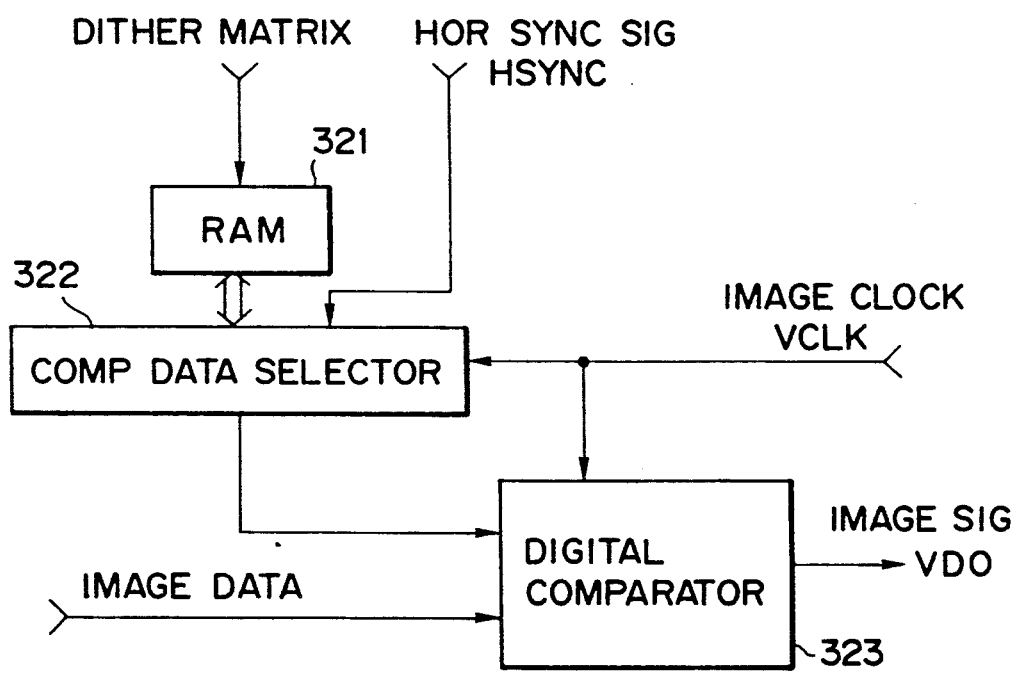

FIG.25A
| 87 | A5 | E1 | 69 |
|----|----|----|----|
| F0 | 0F | 3C | C3 |
| B4 | 5A | 78 | FF |
| 4B | D2 | 96 | 2D |
FIG.25B
| D2 | 5A | 96 | F0 |
|----|----|----|----|
| B4 | 0F | 2D | 87 |
| 78 | 3C | 4B | C3 |
| FF | A5 | 69 | E1 |
FIG.25C
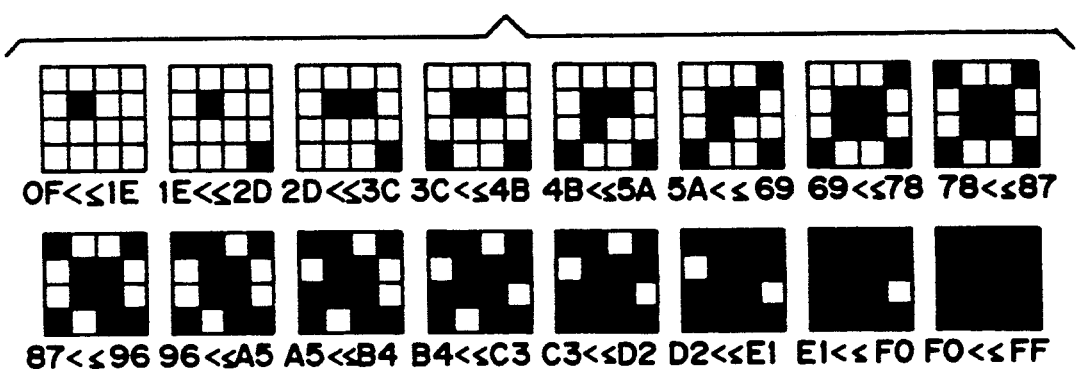
0F<≤1E  1E<≤2D  2D<≤3C  3C<≤4B  4B<≤5A  5A<≤69  69<≤78  78<≤87
87<≤96  96<≤A5  A5<≤B4  B4<≤C3  C3<≤D2  D2<≤E1  E1<≤F0  F0<≤FF
FIG.25D
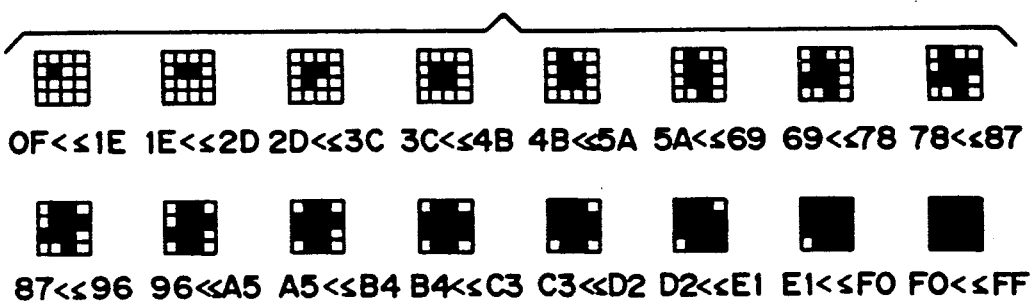
0F<≤1E  1E<≤2D  2D<≤3C  3C<≤4B  4B<≤5A  5A<≤69  69<≤78  78<≤87
87<≤96  96<≤A5  A5<≤B4  B4<≤C3  C3<≤D2  D2<≤E1  E1<≤F0  F0<≤FF

| 9C | 10 | D8 | 38 | 88 |
|----|----|----|----|----|
| 56 | CE | 60 | BA | 24 |
| B0 | 74 | 06 | 7E | EC |
| 2E | F6 | 6A | E2 | 4C |
| 92 | 42 | C4 | 1A | A6 |

| F5 | C3 | A5 | AF | B9 | CD | D7 | E1 | EB | FD |
|----|----|----|----|----|----|----|----|----|----|
| F0 | 9B | 87 | 73 | 5F | 69 | 7D | 91 | A3 | CB |
| E6 | 96 | 55 | 41 | 2D | 37 | 53 | 5D | 8F | AD |
| DC | 82 | 4B | 28 | 19 | 14 | 26 | 49 | 7B | B7 |
| D2 | 6E | 3C | 0F | 05 | 08 | 21 | 35 | 67 | C1 |
| BE | 64 | 32 | 1E | 0A | 0D | 12 | 3F | 71 | D5 |
| B4 | 78 | 46 | 23 | 17 | 1C | 2B | 4E | 85 | DF |
| AA | 8C | 5A | 50 | 3A | 30 | 44 | 58 | 99 | E9 |
| C8 | A0 | 94 | 80 | 6C | 62 | 76 | 8A | 9E | F3 |
| FA | EE | E4 | DA | D0 | BC | B2 | A8 | C6 | F8 |

FIG. 31

| OUTPUT DOT DENSITY | N | fo | ROTATIONS OF POLYGON MIRROR DRIVE MOTOR |
|---|---|---|---|
| 200 dpi | 120 | 33.33 Hz | 2000 r.p.m |
| 240 dpi | 100 | 40 Hz | 2400 r.p.m |
| 300 dpi | 80 | 50 Hz | 3000 r.p.m |
| 400 dpi | 60 | 66.67 Hz | 4000 r.p.m |
| 480 dpi | 50 | 80 Hz | 4800 r.p.m |

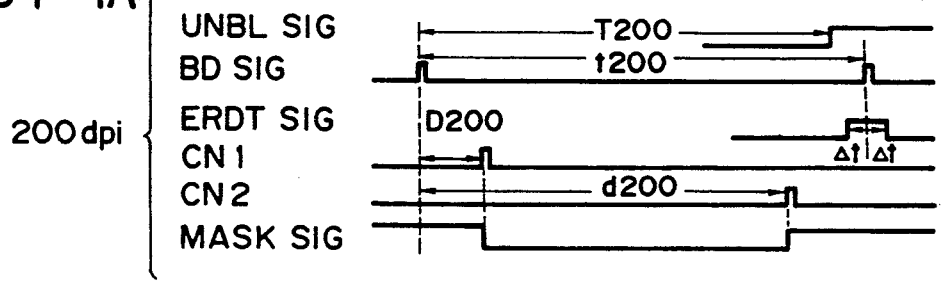
FIG. 34-1A 200 dpi
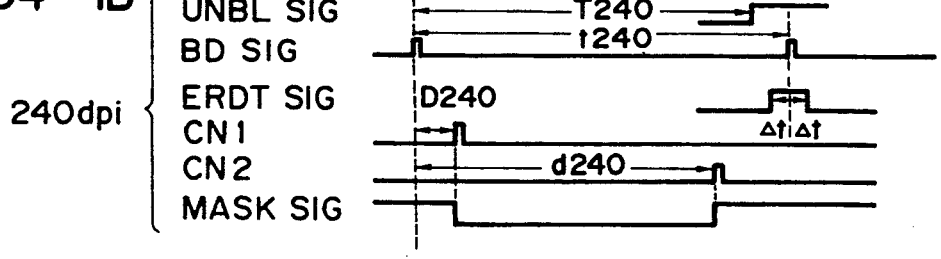
FIG. 34-1B 240 dpi
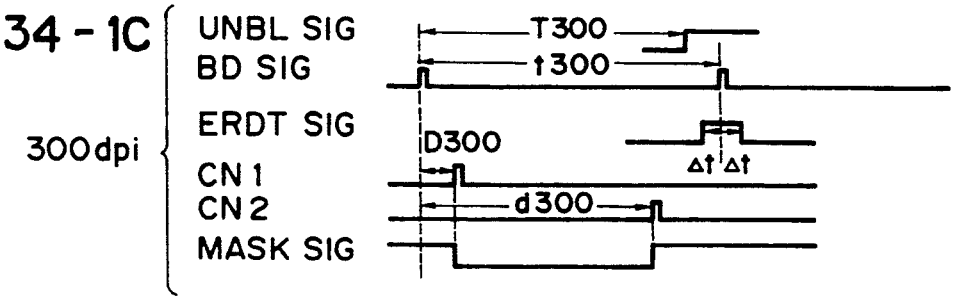
FIG. 34-1C 300 dpi
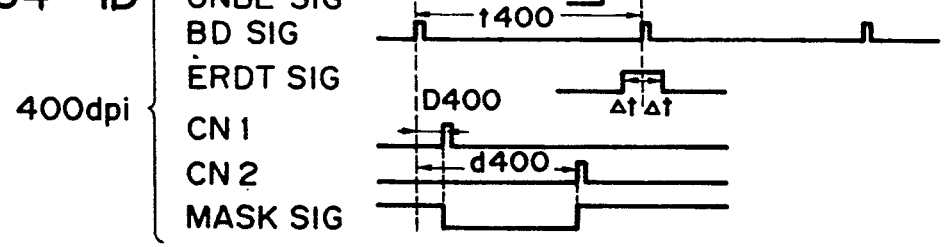
FIG. 34-1D 400 dpi
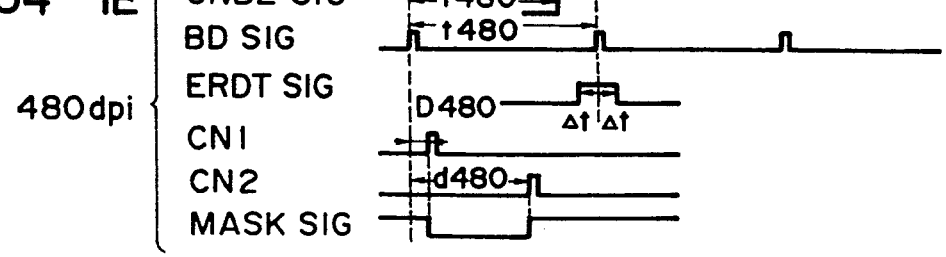
FIG. 34-1E 480 dpi

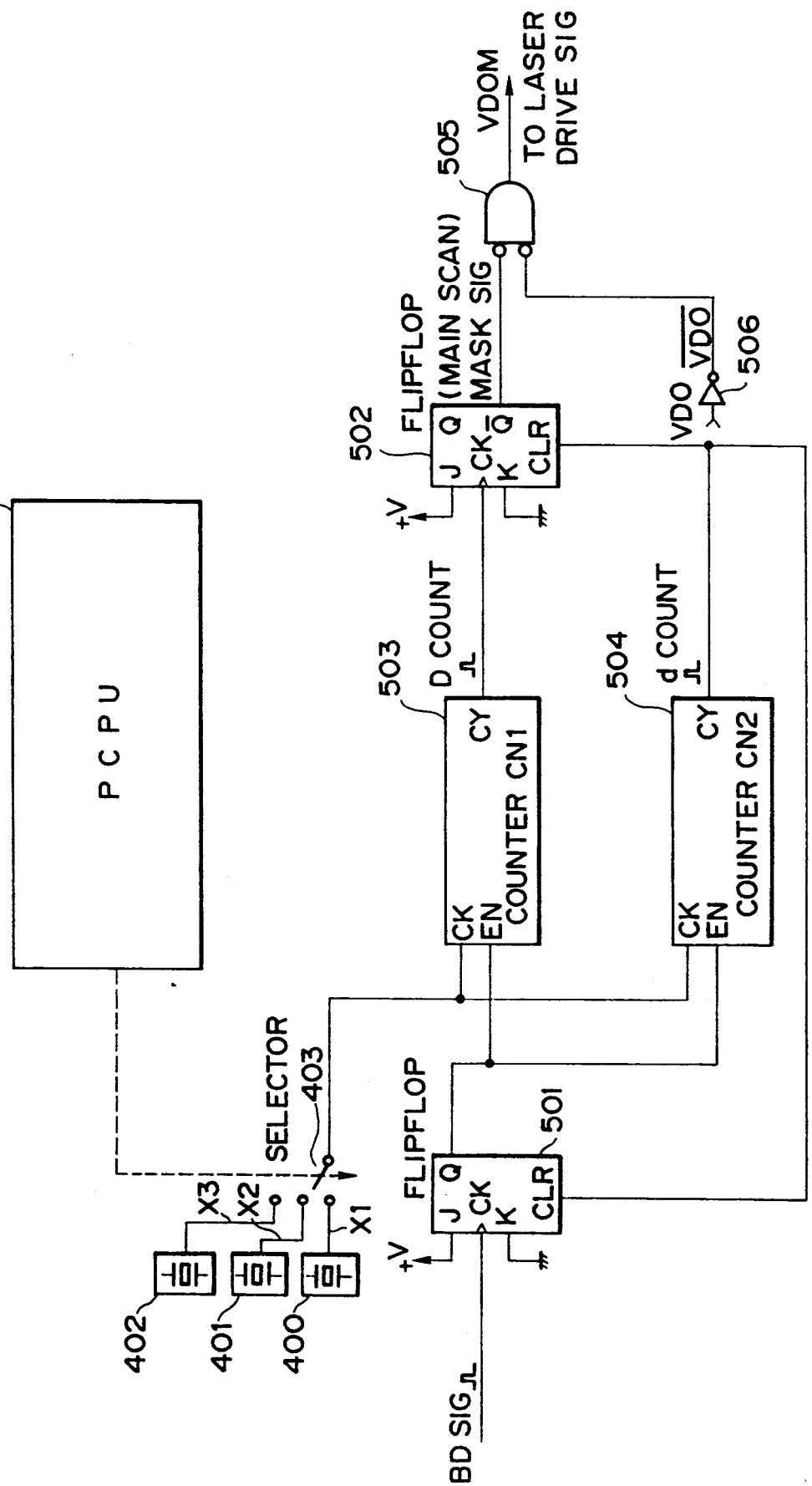

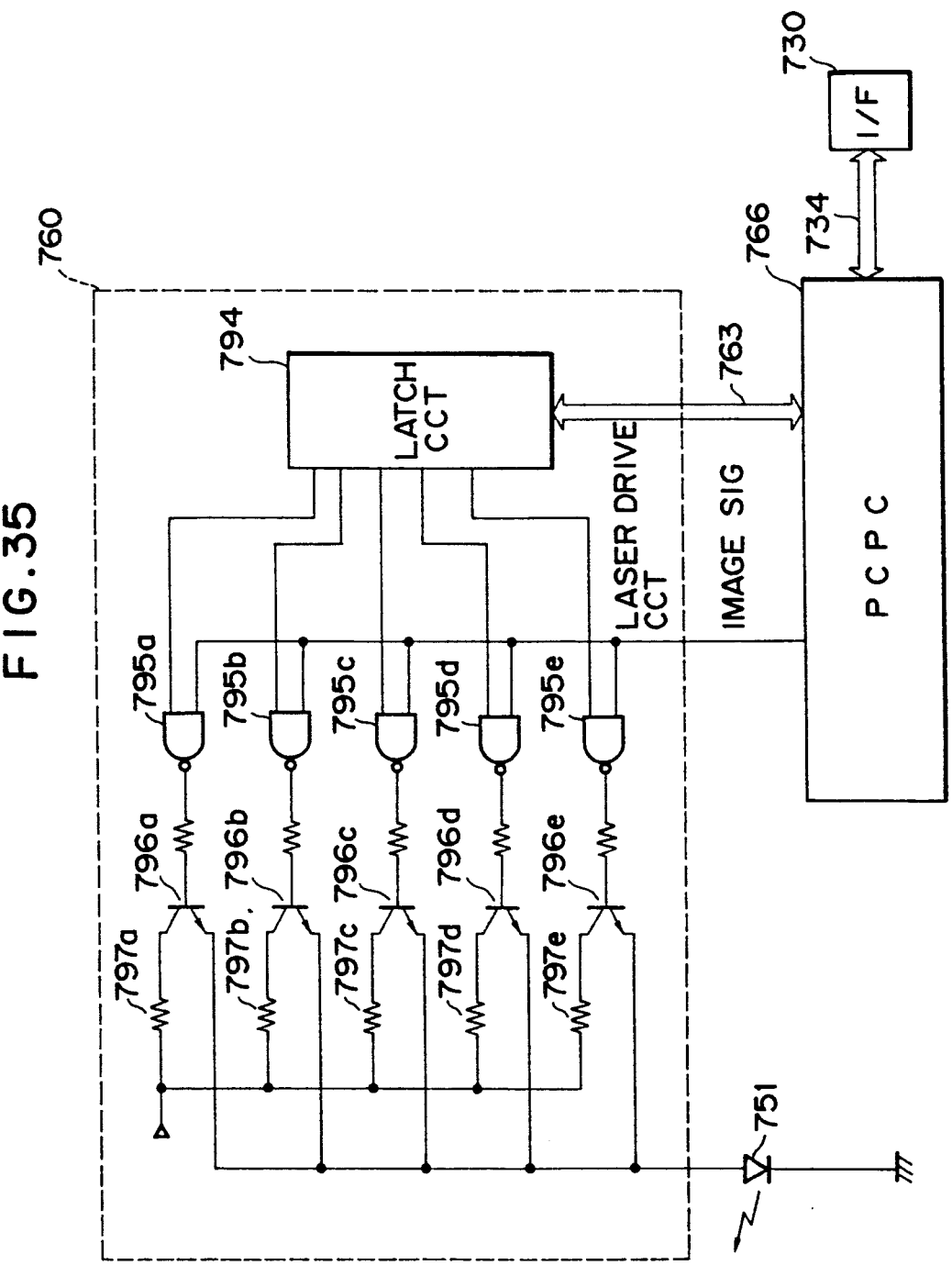

RECORDING APPARATUS

This application is a continuation of U.S. patent application Ser. No. 07/412,986 filed Sep. 26, 1989, now abandoned.

BACKGROUND OF THE INVENTION:

1. Field of the Invention

The present invention relates to a recording apparatus for recording an image on a recording medium on the basis of input data.

2. Related Background Art

As conventional non-impact type printers using an electrophotographic process, a laser printer using a laser diode, an LED printer using a light-emitting diode array as a light source, a liquid crystal printer using a liquid crystal shutter, and the like are known. Of these printers, some laser printers which can change a density of dots of an image to be output can change a dot density using a signal from an external apparatus or a select switch.

However, when a dot density is merely changed, an image is nonuniformly formed or reproducibility of a detailed portion is considerably degraded.

Printers such as a laser printer utilizing an electrophotographic technique process a binary image signal. When these printers output a halftone image, an image signal is subjected to processing such as dither processing by a host computer and is converted to a binary signal before it is input to a printer. The binary signal is input to the printer.

As a method of inputting multi-value image data to a laser printer or the like and outputting a halftone image, a method wherein an input image signal is converted to an analog image signal, and the analog image signal is compared with a cyclic analog pattern signal such as a triangular-wave signal, thus generating a pulse-width modulated binary image signal, is proposed (e.g., Japanese Patent Laid-Open (Kokai) No. 62-42693).

FIG. 22 is a block diagram showing an arrangement of the apparatus according to this method.

Multi-value image data sent from a host computer (not shown) is subjected to digital-to-digital conversion by a D/D converter 202 for density correction, and is then latched by a latch circuit 203 in response to an image clock signal CLK, thus synchronizing timings. The latched image data is converted to an analog signal VA by a D/A converter 204. The analog signal VA is compared by a comparator 205 with a triangular wave having a predetermined period, which is output from a triangular wave generating circuit 219. Thus, the analog signal is converted from a level signal to a time modulation signal, i.e., a pulse-width modulated signal. The pulse-width modulated output from the comparator 205 is input to a laser driver 206, thus driving a laser diode 207.

A laser beam emitted from the laser diode 207 is reflected by a rotating polygon mirror 208 and is converted to a scan beam. The scan beam is focused on a photosensitive body 210 by a lens 209 having f-θ characteristics and is converted to a constant-speed scan beam. Note that some scan beam components are received by a beam detection device (not shown) to generate a known beam detection (BD) signal as a horizontal sync signal for the printer. The BD signal is used as a sync signal for a signal generator.

The photosensitive body 210 is uniformly charged by a charger 211, and is then irradiated with the laser scan beam. Thus, an electrostatic latent image is formed on the surface of the photosensitive body, and is then developed by a developing unit 212. The developed pattern is transferred onto a transfer material 214 by a transfer charger 213, and is fixed thereon by thermal fixing rollers 215 and 216. A developing agent left on the surface of the photosensitive body 210 without being transferred is recovered by a cleaner 217. A residual charge on the photosensitive body 210 is erased by a pre-exposure beam. Thereafter, the same image formation process is repeated.

In the conventional apparatus, a resolution of a halftone image (to be referred to as a number of lines) is determined depending on a printer.

However, when an output image of a printer is used as a block copy of a printing apparatus, the number of lines may often be changed from 50 to 100 in light printing, 125 to 200 in high-quality printing, or according to a favor of a user.

When the host computer performs dither processing and the printer outputs an image, the host computer may change a matrix pattern of dither processing to change the number of lines. In this case, however, some printers have different correspondences between dither patterns and densities. Even if the same dither pattern is input, one printer may output a hard halftone image, and another printer outputs a soft halftone image. Even in a given printer, when the number of lines is changed, a halftone image density may vary.

As described above, a printer apparatus using an electrophotographic technique such as a laser beam printer has been widely used as an output apparatus of a computer. A printer apparatus of this type has many merits such as high image quality, low noise, and the like, and is increasingly used in the field of desk-top publishing (to be referred to as DTP hereinafter) in view of, especially, high image quality.

At the same time, along with development of a host computer or a controller for controlling the printing apparatus, various processing operations are available in halftone reproduction.

For example, when a halftone image is obtained as a hard copy, an area gradation method based on a dither method or the like is widely used at present.

In this method, a pixel density of a printer apparatus is set to be, e.g., 300 dpi, an 8×8 (pixel) matrix is formed, and pixels in the matrix are printed according to image data, thereby expressing gradation. In this case, the number of lines upon halftone reproduction is 37.5 lines per inch, and the number of gradation levels is 64. The number of lines and the number of gradation levels are not limited to the above numerical values but various other values may be employed according to necessity of an operator. For example, 75 lines and 16 gradation levels can be realized by a 4×4 (pixel) matrix.

The dither method is classified into a distributed type and a concentrated type depending on the way of filling pixels.

FIGS. 28A and 28B exemplify 4×4 (pixel) dither matrices and dot patterns. FIG. 28A shows a sample of the distributed type method, and FIG. 28B shows a sample of the concentrated type method. In FIGS. 28A and 28B, numerical values indicate the order of forming dots. The number of dots is increased in turn from low-density data on the basis of a predetermined threshold value.

In the conventional technique, however, only one dot pattern is prepared for one 8×8 (pixel) or 4×4 (pixel) matrix, and no countermeasure is taken for selecting a printing density of a printer engine. Thus, the following drawbacks are posed.

For example, in a printer in which a printer engine has two printing densities of 300 dpi and 600 dpi, and a 4×4 dither matrix is used, when the printing density is switched from 300 dpi to 600 dpi to express gradation while the 4×4 dither matrix remains the same, the number of lines is doubled, and a finer expression is allowed. However, at gradation level "1", i.e., when a dot is formed on one pixel in the matrix, since reproducibility per pixel is degraded due to the doubled number of lines, it is difficult to express this gradation level, and a completely blank portion is formed.

In contrast to this, at gradation level "15", i.e., when only one blank pixel is formed among black pixels, since its reproducibility is low, a resultant image is in solid black.

For this reason, the number of gradation levels to be reproduced is decreased, and an image having high black-and-white contrast, i.e., having a so-called steep gamma curve is undesirably obtained.

A laser beam printer is widely known in which a latent image is formed on a rotary drum by scanning a laser beam using a rotary polygon mirror or the like and is transferred onto a paper sheet after it is developed, thereby recording an image.

FIG. 39 shows an arrangement of a conventional laser beam printer, and a description will be made below with reference to FIG. 39.

In FIG. 39, a paper cassette 702 stores paper sheets 701 as recording media. Uppermost one of the paper sheets 701 in the cassette 702 is separated by a sheet feed cam 703, so that its leading edge portion is fed to sheet feed rollers 704 and 704'. The cam 703 is intermittently rotated every sheet feed operation. A reflection type photo-sensor 718 detects light reflected by the sheet 701 through a hole 719 formed in the bottom portion of the paper cassette 702 to detect the presence/absence of paper sheets.

When the paper sheet 701 is fed to a gap portion between the sheet feed rollers 704 and 704' by the sheet feed cam 703, the rollers 704 and 704' are rotated while lightly pressing the paper sheet 701 to feed the sheet 701. When the sheet 701 is fed and its leading edge reaches a position of a registration shutter 705, the paper sheet 701 is stopped by the registration shutter 705, and the sheet feed rollers 704 and 704' are kept rotated while slipping on the paper sheet 701 to generate a feed torque. In this case, when a registration solenoid 706 is driven to release the registration shutter 705 upward, the paper sheet 701 is fed to convey rollers 707 and 707'. The registration shutter 705 is driven in synchronism with a given timing of an image formed by focusing a laser beam 720 on a photosensitive drum 711. A photo-sensor 721 detects whether or not the paper sheet is present at the position of the registration shutter 705.

A rotary polygon mirror 75 is driven by a polygon mirror motor 753, and guides the beam 720 from a semiconductor laser 751 onto the photosensitive drum 711 via a reflection mirror 754, thereby forming a recording image on the photosensitive drum 711. A beam detector 755 arranged at a scan start position of the beam 720 detects the beam 720 to output a known BD signal which defines an image write timing in a main scan direction.

Thereafter, the paper sheet gains a feed torque by the convey rollers 707 and 707' in place of the sheet feed rollers 704 and 704', and is fed to the photosensitive drum 711 portion. An image exposed on the photosensitive drum 711 is transferred onto the paper sheet 701 in cooperation of a cleaner 712, a charger 713, a developing unit 714, and a transfer charger 715. The paper sheet 701 on which an image has been transferred is subjected to fixing processing by fixing rollers 708 and 708', and is then ejected onto a stacker 710 by sheet eject rollers 709 and 709'.

In FIG. 39, symbol A designates a guide for regulating a feed direction of the paper sheet 701.

A sheet feed table 716 allows to manually supply sheets one by one therefrom in addition to an automatic sheet feed operation from the paper cassette 702. A paper sheet manually fed to a gap portion between a manual sheet feed roller 717 and the sheet feed table 716 is fed while being lightly pressed by the roller 717 until its leading edge reaches the registration shutter 705. When the paper sheet has reached the shutter 705, the manual sheet feed roller slips. The following feed sequence is the same as that in the cassette sheet feed operation.

Note that the fixing roller 708 houses a fixing heater 724. The heater 724 controls a surface temperature of the fixing roller 708 to a predetermined temperature on the basis of a temperature detected by a thermistor 723 which is in slipping contact with the roller surface, thereby thermally fixing a recorded image on the paper sheet 701. A photo-sensor 722 detects whether or not a paper sheet is present at the position of the fixing rollers 708 and 708'.

The printer described above is not solely used but is connected to a controller through an interface cable. The printer receives a print command and an image signal from the controller to perform a print sequence. The arrangement of the interface cable and signals exchanged through the interface cable will be briefly described below.

FIG. 40 shows interface signals between a conventional printer and a controller.

As a printer 700, the laser beam printer described with reference to FIG. 39 can be employed.

Interface signals will be described below:

PPRDY Signal . . . informs the controller that the power switch of the printer is turned on and is ready CPRDY Signal . . . informs the printer that the power switch of the controller is turned on RDY Signal . . . informs that the printer is ready to start or continue a print operation when it receives a PRNT signal (to be described later) from the controller For example, when paper sheets in the paper cassette 702 are used up and the print operation cannot be executed, the RDY signal goes to FALSE level.

PRNT Signal . . . an instruction signal from the controller to the printer, which causes the printer to start the print operation or to continue the print operation during the print operation of the printer The printer starts the print operation upon reception of this signal.

VSREQ Signal . . . indicates that both the RDY and PRNT signals are at TRUE level and the printer is ready to receive a VSYNC signal (to be described later)

VSYNC Signal . . . a vertical (sub-scan) sync signal of an image to be printed, which is output from the controller to the printer to synchronize an image on the drum with a paper sheet BD Signal . . . a horizontal (main scan) sync signal of an image to be printed, which indicates that a laser beam is present at a main scan start position VDO Signal . . . an image signal to be printed output from the controller. The printer outputs a black image in response to the TRUE-level VDO signal, and outputs a white image in response to the FALSE-level VDO signal SC Signal . . . a bidirectional serial 8-bit signal for exchanging an instruction signal COMMAND (to be described later) from the controller to the printer, and a status information signal STATUS from the printer to the controller. Both the controller and the printer use an SCLK signal (to be described later) as a sync signal when this signal is exchanged. Since this signal is a bidirectional signal, an SBSY signal and a CBSY signal (to be described later) are used for I/O control.

The signal COMMAND is an 8-bit serial signal, and includes various control commands to the printer, such as a sheet feed instruction for turning off only the fixing heater of the printer to keep an energy-saving state, i.e., to set a so-called sheet feed state, a sheet feed cancel instruction for canceling the sheet feed state and turning on the fixing heater, a cassette sheet feed instruction for supplying paper sheets from the paper cassette, a manual sheet feed instruction for manually supplying paper sheets, and the like.

The signal STATUS is an 8-bit serial signal, and informs the printer of various states, i.e., that the printer state is a wait state in that the temperature of a fixing device does not yet reach a print temperature, a paper jam occurs, there are no paper sheets in the paper cassette, and so on.

SCLK Signal . . . a sync pulse signal used by the printer to fetch the signal COMMAND or by the controller to fetch the signal STATUS SBSY Signal . . . a signal for occupying an SC signal line and an SCLK signal line prior to transmission of the signal STATUS from the printer CBSY Signal . . . a signal for occupying the SC signal line and the SCLK signal line prior to transmission of the signal COMMAND from the controller GNRST Signal . . . a reset signal output from the controller to initialize the printer The operations between the printer and controller sections will be described below with reference to the system diagram showing connections between the printer and the controller.

Assume that the power switch of the printer is turned on, and the power switch of the controller is turned on. In this case, the printer initializes its internal states, and transmits the PPRDY signal to the controller. On the other hand, the controller initializes its internal states, and outputs the CPRDY signal to the printer. Thereafter, the printer energizes the fixing heater 724 housed in the fixing roller 708, and when the surface temperature of the fixing rollers 708 and 708' reaches a fixing temperature, the printer outputs the RDY signal to the controller.

Upon reception of the RDY signal, the controller transmits the PRNT signal according to necessity of the print operation. When the printer receives the PRNT signal, it rotates the photosensitive drum 711 to uniformly initialize the surface voltage of the photosensitive drum, and simultaneously drives the sheet feed cam 703 in a cassette sheet feed mode to feed the leading edge portion of a paper sheet to the position of the registration shutter 705. In a manual sheet feed mode, a paper sheet manually supplied from the sheet feed table 716 is fed to the position of the registration shutter 705. When the printer is ready to receive the VDO signal, it transmits the VSREQ signal to the controller.

Upon reception of the VSREQ signal, the controller transmits the VSYNC signal to the printer. When the printer receives the VSYNC signal, it drives the registration solenoid 706 in synchronism with the VSYNC signal to release the registration shutter 705. Thus, the paper sheet is fed to the photosensitive drum 711. After the controller outputs the VSYNC signal, it sequentially transmits the image signal VDO to be recorded to the printer in synchronism with the BD signal transmitted from the printer as a horizontal sync signal.

The printer turns on/off a laser beam in accordance with the VDO signal to form a latent image on the photosensitive drum 711. The latent image is developed with a toner in the developing unit 714, and the toner image is transferred onto the paper sheet by the transfer charger 715. Thereafter, the transferred image is fixed by the fixing rollers 708 and 708'. The paper sheet is then ejected.

When the sheet feed mode of the printer is switched to the cassette sheet feed mode or the manual sheet feed mode, the controller transmits an 8-bit serial code corresponding to the sheet feed mode to be selected to the printer in synchronism with the SCLK pulse signal through the SC signal line. When the printer receives the cassette sheet feed mode code, the printer is switched to a mode wherein the sheet feed roller 717 is not driven in the print operation, and the sheet feed cam 703 is driven to supply paper sheets from the cassette.

On the other hand, when the printer receives the manual sheet feed mode code, the printer is switched to a mode wherein the sheet feed cam 703 is not driven in the print operation, and the manual supply roller 717 is driven to allow a manual sheet feed operation.

When the power switch of the printer is initially turned on, the printer sets the sheet feed mode in the "cassette sheet feed mode" as an initial mode.

The GNRST signal is used to initialize the printer upon instruction from the controller. When the printer receives the GNRST signal from the controller, it resets all the executing jobs, and is reset to a state immediately after power-on. When a plurality of printers are connected to the controller, this signal is used to set the connected printers to an identical state.

In the conventional arrangement, a printer and a computer as a controller normally exchange interface signals through a connection cable having a length of 1 meter to several meters. A computer connected to the printer is not limited to one type, but various computers are often connected to the printer.

In this case, a conventional printer has a fixed dot density to be output. Therefore, a necessary printer must be prepared in accordance with an image processing speed or a required output dot density of a computer to be connected. For example, a plurality of printers having the fixed numbers of output dots in units of output dot densities like a 200-dpi printer having a dot density of 200 dots per inch, 240-dpi, 300-dpi, 400-dpi, and 480-dpi printers, and the like, and a model which can satisfy a requirement must be selected from these printers. In another improved printer, a dot density select switch is provided to an operation panel of the printer, and is manually switched by a serviceman or user to select a desired output dot density. In another printer free from a manual operation, the printer receives a dot density select command from the computer through a communication line, and rotations of a polygon scanner motor are changed in accordance with the designated dot density.

The printer which changes a dot density by the select switch on the operation panel or the printer which changes a dot density upon reception of a dot density change command from a computer suffers from the following problem.

In the conventional printer described above, when the printing density is selected upon an instruction from an external controller through a communication means such as a command, a scan speed in the main scan direction and that in the sub-scan direction are changed accordingly. In the conventional laser beam printer, an input image signal is masked so that unnecessary printing is not made on predetermined width portions of the leading, trailing, left, and right edge portions of a paper sheet to be subjected to printing (i.e., top, bottom, left, and right margins). An invalid image signal which may be transmitted from the controller, i.e., an image signal which is set at a timing falling outside a printing region is masked by an image signal masking means arranged in the printer, thus preventing an invalid printing operation on predetermined width regions from the leading, trailing, left, and right edges of the paper sheet. This operation is performed to a phenomenon in that a toner becomes attached to a region other than a paper region due to an offset feed operation of the paper sheet with respect to the photosensitive drum, and as a result, the toner which is not transferred onto the paper sheet contaminates the interior of the printer, and becomes attached to the subsequent printing image.

Such mask control of an image signal in the main scan direction is performed such that a predetermined number of clock pulses are counted after reception of the BD signal to determine an image mask timing in the main scan direction. For the mask control in the sub-scan direction, a predetermined number of BD signals are counted to determine the image mask timing in the sub-scan direction.

However, in the conventional control method, when the printing density is switched, the rotational speed (rotations) of a scanner motor is changed, and the scan speeds in the main scan and sub-scan directions are changed. Therefore, the image mask area cannot be accurately controlled. As a result, a printing image is contaminated with an excess toner, and maintenance or the like of the apparatus becomes very cumbersome.

When the printer receives a dot density select command for a second printing density during a print operation at a first printing density and starts to change the rotational speed of the polygon scanner motor, a printing image is undesirably distorted.

As improved recording apparatuses, U.S. Pat. No. 4,528,561, issued Jul. 9, 1985, U.S. patent application Ser. No. 350,649 filed on May 11, 1989, (refiled as U.S. patent application Ser. No. 563,859 on Aug. 7, 1990) Japanese Patent Laid-Open (Kokai) Nos. 62-162547, 62-162548, 62-162549, 62-162550, 62-162551, 62-163462, and 63-39268 have been proposed. However, further improvements are demanded.

SUMMARY OF THE INVENTION

It is an object of the present invention to eliminate the above-mentioned drawbacks.

It is another object of the present invention to improve a recording apparatus.

It is still another object of the present invention to provide a recording apparatus which can obtain a high-quality reproduced image.

It is still another object of the present invention to provide a recording apparatus which can change a resolution.

It is still another object of the present invention to provide a recording apparatus which overcomes various problems posed when a resolution is changed.

It is still another object of the present invention to provide a recording apparatus which can assure a high-quality image when a resolution is switched.

It is still another object of the present invention to provide a recording apparatus which can operate in correspondence with image data signals at various densities, and can record a good image at any density.

It is still another object of the present invention to provide a recording apparatus which can form a high-quality halftone image.

It is still another object of the present invention to provide a recording apparatus which can output a desired image with a simple arrangement.

It is still another object of the present invention to provide a recording apparatus which can change the number of lines without degrading image quality, and can reliably obtain a desired image.

It is still another object of the present invention to provide a recording apparatus which can perform masking of an accurate range.

It is still another object of the present invention to provide a recording apparatus which can prevent an erroneous operation or a recording error of the apparatus.

It is still another object of the present invention to provide a recording apparatus which can appropriately form margin portions on a recording medium.

Other objects of the present invention will become apparent from the following description of embodiments and appended claims taken in conjunction with the accompanying drawings.

BRIEF DESCRIPTION OF THE DRAWINGS

FIG. 1 is a diagram showing a principal arrangement of a laser printer according to a first embodiment of the present invention;

FIG. 2 is a circuit diagram of a controller 30;

FIG. 10 is a block diagram of an arrangement of control circuits in a second embodiment of the present invention;

FIG. 11 is a circuit diagram showing an arrangement of a scanner driver of the second embodiment;

FIGS. 15A and 15B are charts showing a drum surface voltage obtained when exposure is performed with different dark voltages;

FIG. 16 is a block diagram for explaining drum surface voltage control;

FIGS. 18-1 to 18-3 are graphs showing conversion characteristics of three D/D converters in the third embodiment;

FIG. 24 is a block diagram showing an arrangement of an image data process circuit 302 arranged in the sixth embodiment;

FIGS. 25A and 25B show dither matrices selected in the sixth embodiment, in which FIG. 25A shows a dither matrix at a printing density of 300 dpi and FIG. 25B shows a dither matrix at a printing density of 600 dpi;

FIG. 25C shows a transition state of printing dot patterns based on the dither matrix shown in FIG. 25A;

FIG. 25D shows a transition state of printing dot patterns based on the dither matrix shown in FIG. 25B;

FIG. 31 is a table showing the relationship among values to be set in a pre-set counter in the polygon mirror motor control motor control circuit, rotations of a polygon mirror motor, and an output dot density;

FIGS. 34-1A to 34-1E are operation timing charts of the BD signal process circuit shown in FIG. 33 and a mask signal generating circuit shown in FIGS. 34-3 and 34-4;

FIG. 34-2 is a view for explaining a mask area;

FIGS. 34-3 and 34-4 are detailed block diagrams of the mask signal generating circuit;

FIG. 35 is a detailed block diagram of a laser drive circuit;

FIGS. 38-1A to 38-1E are operation timing charts of a mask signal generating circuit shown in FIG. 38-2;

FIG. 38-2 is a detailed block diagram of the mask signal generating circuit;

DETAILED DESCRIPTION OF THE PREFERRED EMBODIMENTS

Preferred embodiments of the present invention will now be described with reference to the accompanying drawings.

Figure 8:
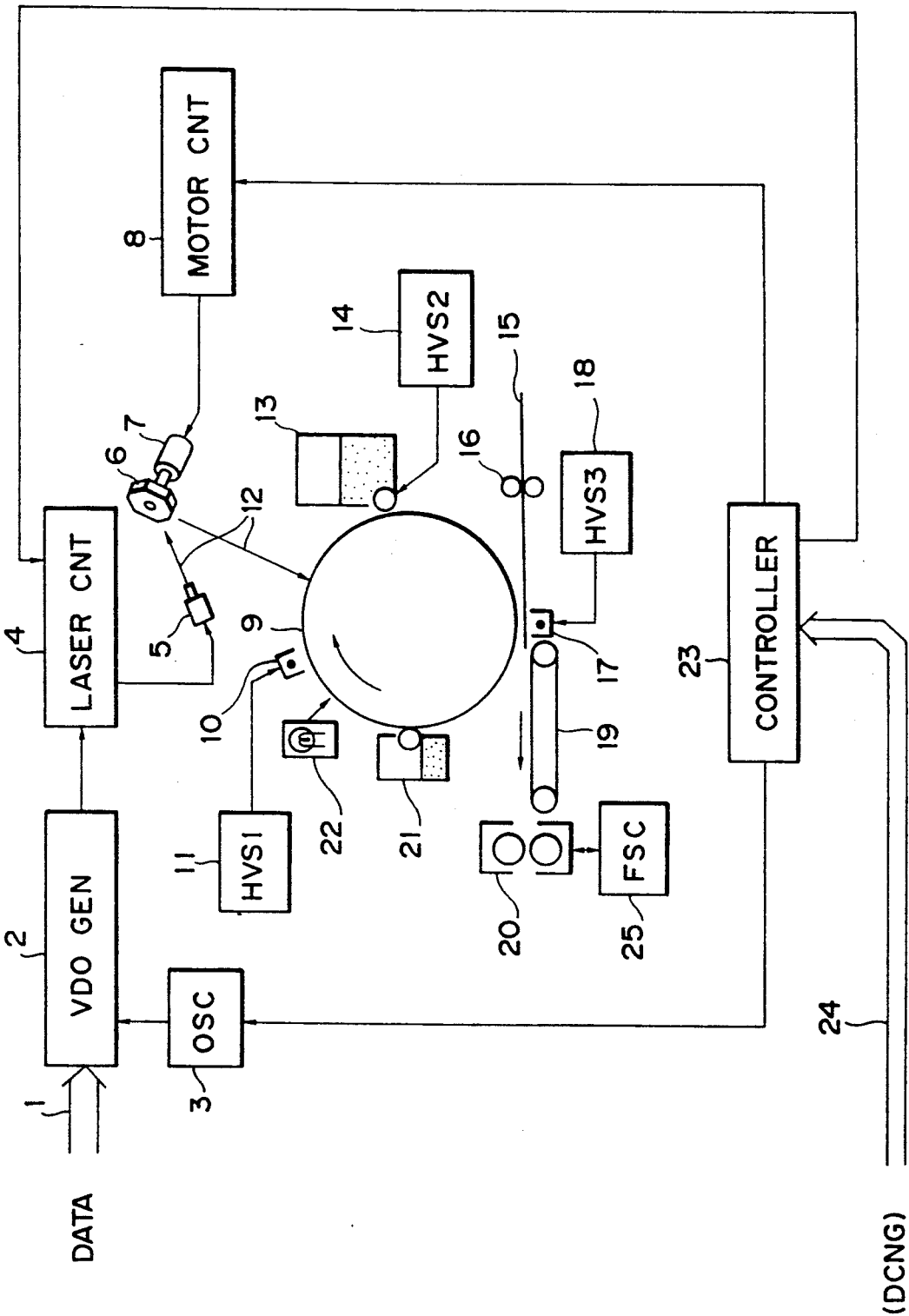
FIG. 8 is a diagram of a laser beam printer having a dot density select function.

FIG. 8 shows an arrangement of a laser printer capable of selecting a dot density. Image data 1 sent from an external apparatus is input to a video generator (VDO GEN) 2. The video generator 2 develops the image data 1 into a bit map (not shown) on the basis of a block signal (image clock) sent from an oscillator (OSC) 3 to generate a video signal as a modulation signal for a laser diode 5, and supplies it to a laser control circuit (LASER CNT) 4.

The oscillation frequency of the oscillator 3 is switched in accordance with a control signal sent from a controller 23. Therefore, the maximum frequency of the video signal can be switched.

The laser control circuit 4 modulates a drive current of the laser diode 5 using the video signal, and switches a laser light amount on the basis of a control signal from the controller 23.

A modulated laser beam 12 is reflected by a rotary polygon mirror 6, and raster-scans the surface of a photosensitive drum 9.

The rotary polygon mirror 6 is rotated at a constant speed by a motor 7 which is arranged on a line extending from the rotary polygon mirror 6, and a motor control circuit (MOTOR CNT) 8.

The motor control circuit 8 selects rotations of the rotary polygon mirror 6 in accordance with the control signal sent from the controller 23.

An image forming operation based on an electrophotographic process using the laser light source will be described below.

A primary charger 10 performs positive corona discharge on the basis of a voltage supplied from a high voltage source (HVS1) 11, and uniformly and positively charges the surface of the photosensitive drum 9. The photosensitive drum 9 is rotated at a constant speed, as indicated by an arrow, and a latent image is formed on the surface by the modulated laser beam 12. The latent image is developed with a developing agent, e.g., a toner by a developing device 13. Furthermore, a developing cylinder for causing the toner to be attached to the surface of the photosensitive drum 9 is arranged in the developing device 13 adjacent to the surface of the photosensitive drum 9. An electric field is generated in a developing section based on a voltage supplied from a high voltage source (HVS2) 14, and the latent image is then developed with the toner. A visible image formed on the photosensitive drum is transferred by a transfer charger 17 onto a transfer sheet 15 conveyed by convey rollers 16.

The transfer charger 17 performs negative corona discharge on the basis of a voltage supplied from a high voltage source (HVS3) 18, and causes the toner on the surface of the photosensitive drum 9 to become attached to the transfer sheet 15.

The transfer sheet 15 on which an image is formed is fed to a fixing device 20 by a conveyor belt 19. A pair of rollers (to be referred to as fixing rollers hereinafter) arranged in the fixing device 20 are controlled to a constant temperature by a heater (not shown) and a fixing temperature control circuit 25. When the transfer sheet 15 passes through a gap between the fixing rollers, the toner is thermally fixed on the transfer sheet 15, thus completing a print operation. After the transfer operation, the toner remaining on the surface of the photosensitive drum 9 is cleaned by a cleaner 21. The photosensitive drum 9 is then initialized by an exposure lamp 22.

Dot density select control with the above arrangement will be described below. The controller 23 starts control upon reception of dot density select data from an external apparatus. The dot density select data is obtained by receiving a dot density command (DCNG) through an interface bus 24 with an external apparatus.

When the command is received, control signals according to a dot density are supplied to the oscillator 3, the laser control circuit 4, and the motor control circuit 8, thus completing dot density selection.

A further improved apparatus of the apparatus shown in FIG. 8 will be described below.

First Embodiment

FIG. 1 shows the principal arrangement of the first embodiment of the present invention. Note that the same reference numerals in FIG. 1 denote the same parts as in FIG. 8.

A high voltage source 1A (to be abbreviated to as an HVS1A hereinafter) changes a charge amount of a photosensitive body. The HVS1A (26) supplies a high voltage to a primary charger 10 to cause it to perform corona discharge, thereby uniformly charging the photosensitive drum 9. The HVS1A (26) switches a voltage to be generated in accordance with a control signal S1 from a controller 30.

A high voltage source 2A (to be abbreviated to as an HVS2A hereinafter) constitutes a means for changing a bias voltage to be applied to a developing sleeve. The HVS2A (27) applies a bias voltage to the developing sleeve of a developing device 13 to perform development of an image on the photosensitive drum 9 using a developing agent. The HVS2A (27) switches a voltage to be generated in accordance with a control signal S2 from the controller 30.

A high voltage source 3A (to be abbreviated to as an HVS3A hereinafter) constitutes a means for changing a corona discharge amount for a transfer operation. The HVS3A (28) supplies a high voltage to a transfer charger 17 to transfer a toner image onto a transfer sheet 15. The HVS3A (28) switches a voltage to be generated in accordance with a control signal S3 from the controller 30.

A temperature control circuit (to be abbreviated to as an FSCA hereinafter) 29 constitutes a means for changing a temperature at which a developing agent is thermally fixed on the transfer sheet. The FSCA 29 detects a temperature of the fixing rollers of a fixing device 20, and controls them to a predetermined temperature using a heater. The FSCA 29 switches a temperature to be controlled in accordance with a control signal S4 from the controller 30.

The controller 30 outputs the control signals S1 to S4 upon reception of a dot density command (DCNG) from an external apparatus (not shown) such as a host computer through a data bus 24.

The control means described above will be described in more detail below.

Figures 2, 34:
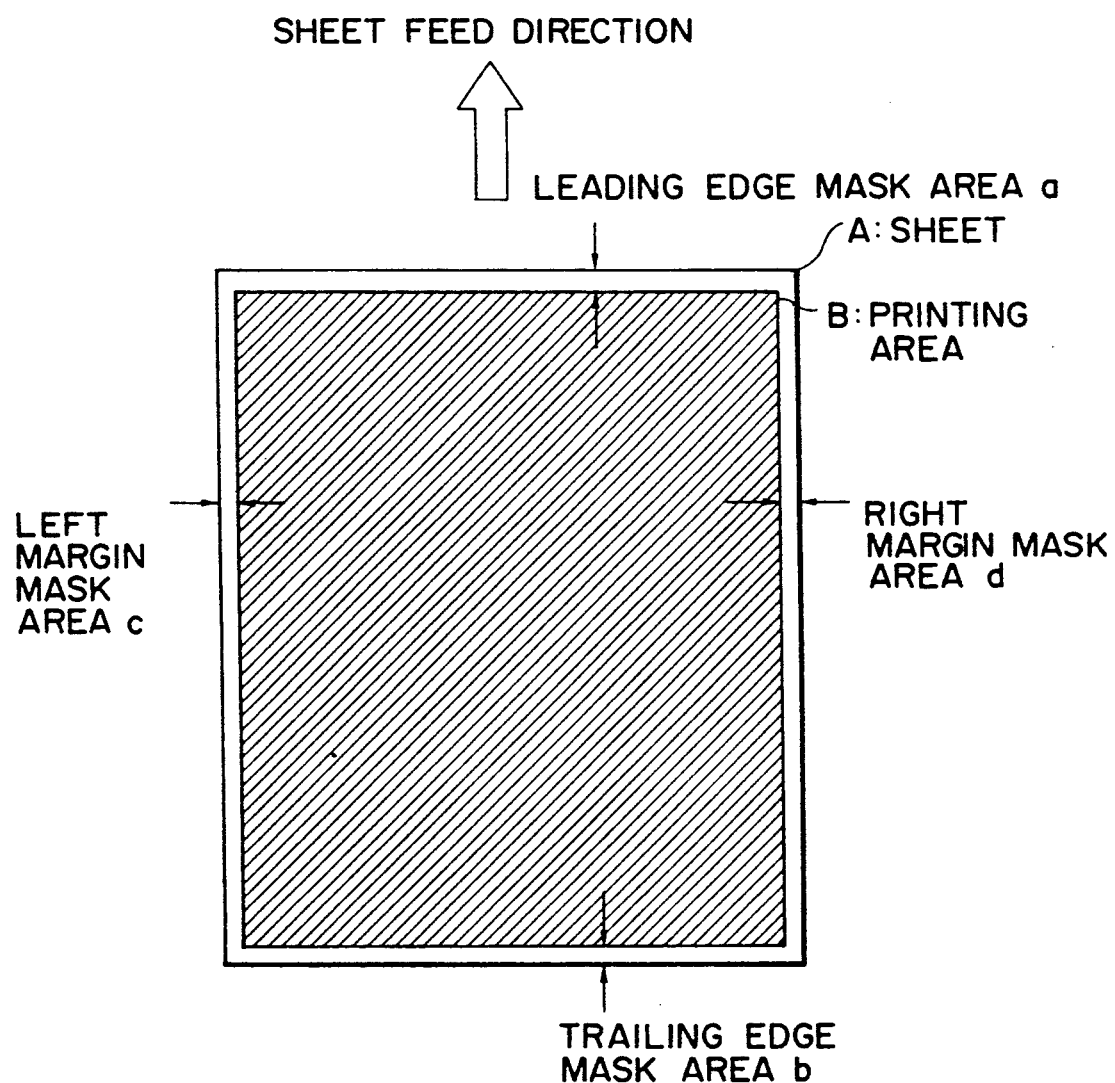
Figures 3, 34:
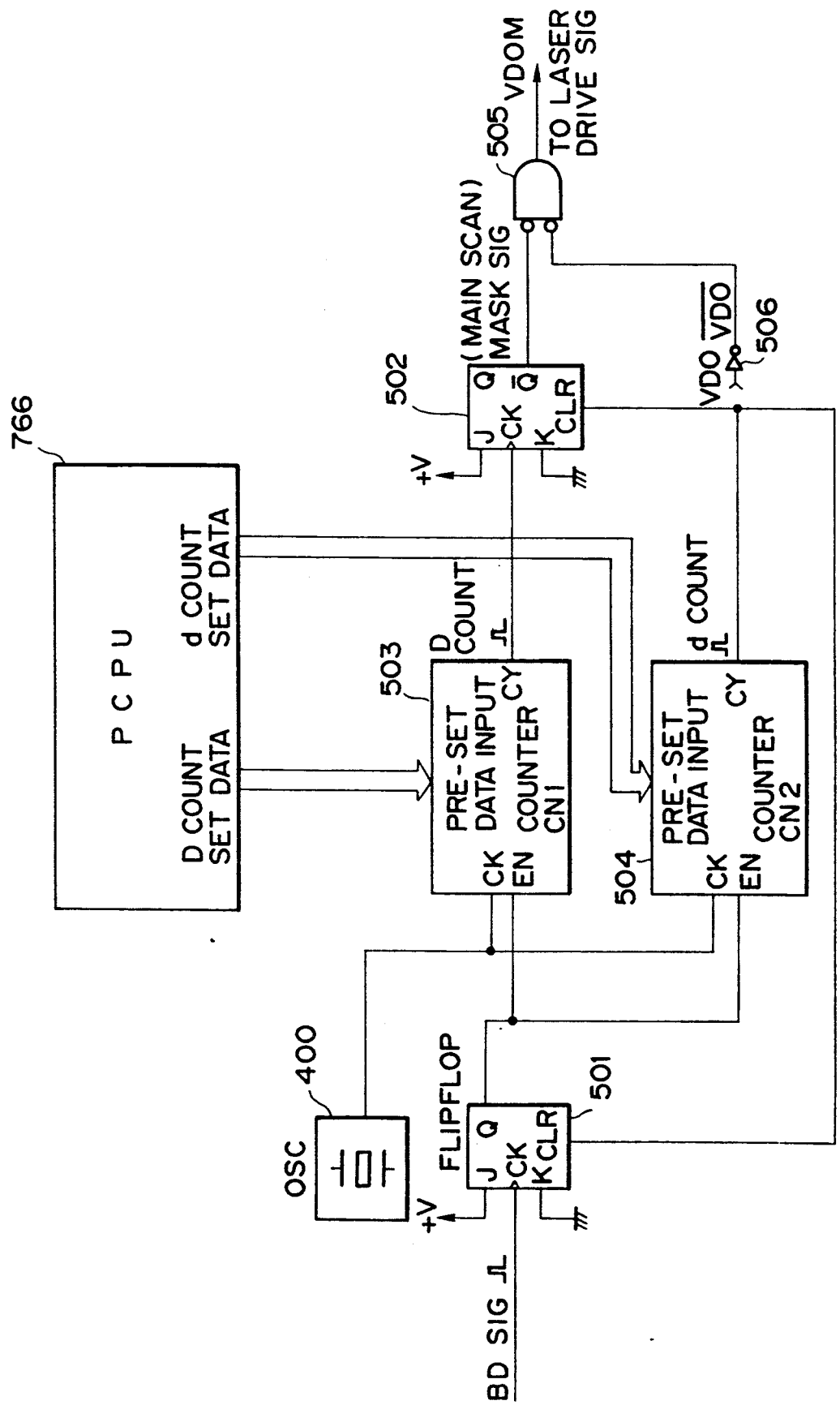

FIG. 2 is a block diagram showing an arrangement of the controller 30. A microcomputer (to be abbreviated to as a CPU hereinafter) 31 comprises a ROM 32 for storing programs, and a RAM 33 for temporarily storing data, and executes control. When the CPU 31 receives the dot density command DCNG through the data bus 24, it outputs the control signals S1 to S4 in accordance with the dot density. The CPU 31 also outputs control signals S5 to Sn used for other control operations, e.g., a drive operation of the photosensitive drum 9.

Figure 3:
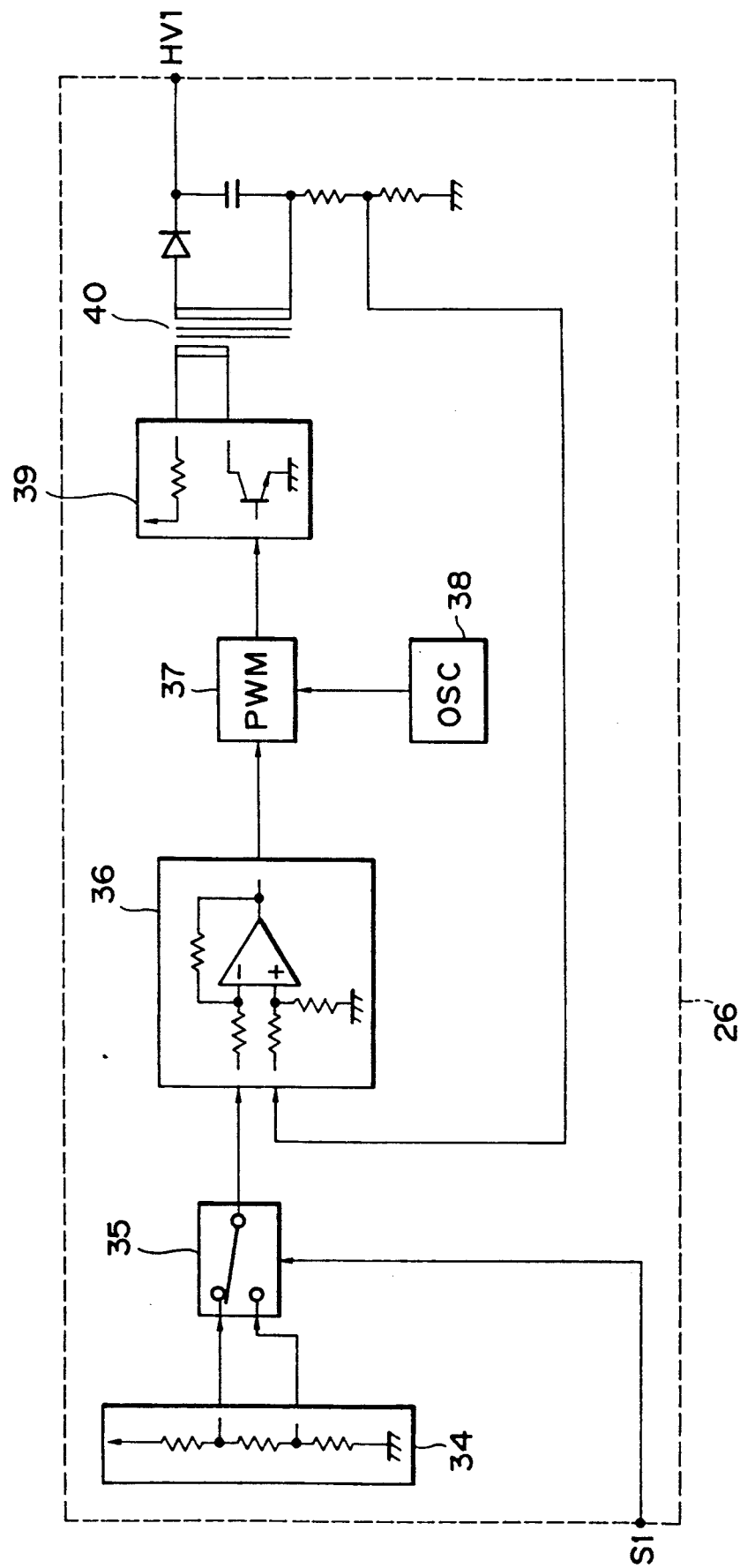
FIG. 3 is a circuit diagram of a high voltage source (HVS) 26.
Figure 4:
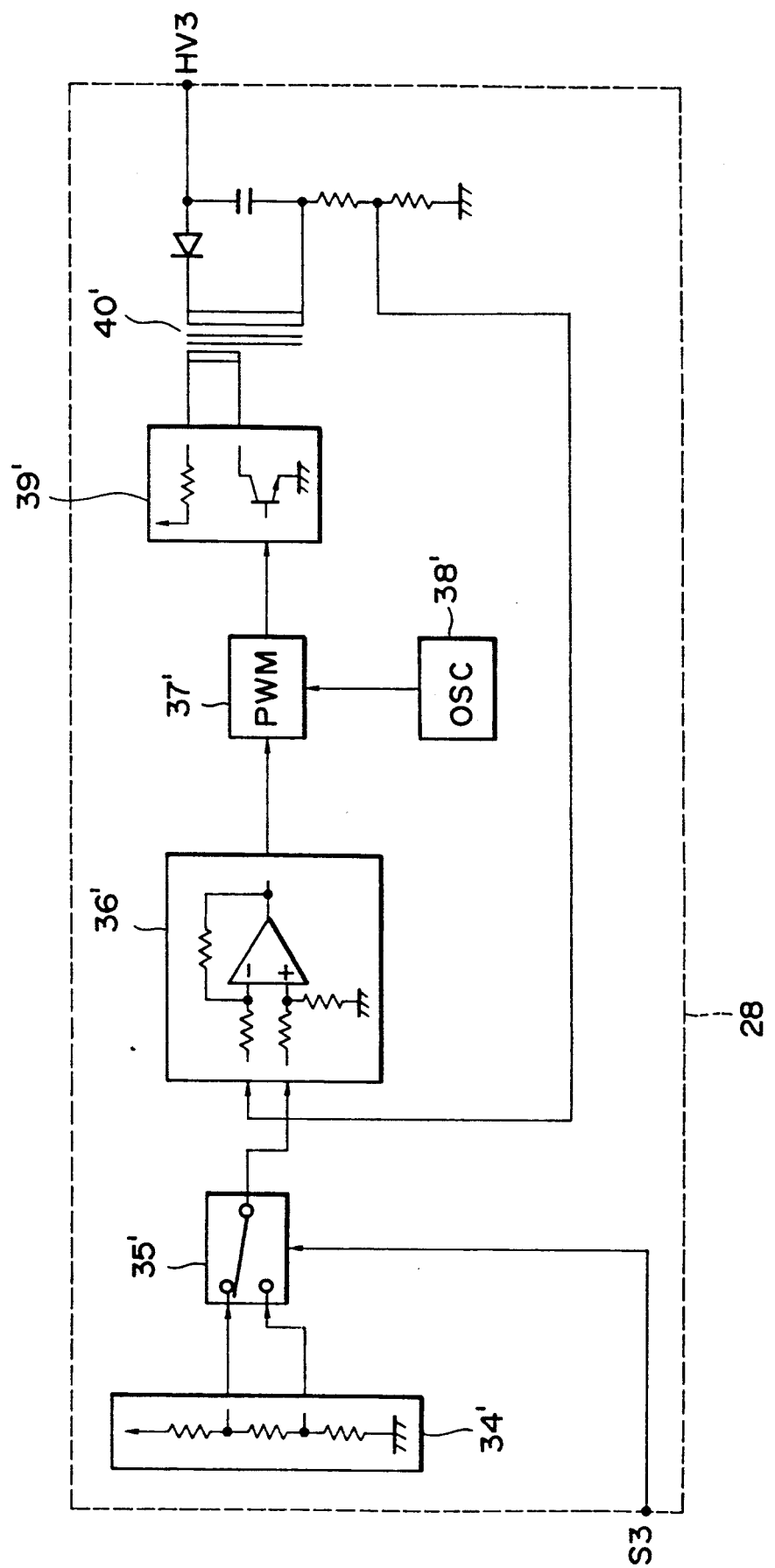
FIG. 4 is a circuit diagram of a high voltage source 28.

FIG. 3 is a block diagram showing an arrangement of the HVS1A (26). FIG. 4 is a block diagram showing an arrangement of the HVS3A (28). Since the HVS1A (26) and the HVS3A (28) perform substantially the same operation although high voltages to be output have opposite polarities, the HVS1A (26) shown in FIG. 3 will be described here.

In FIG. 3, a reference voltage generator 34 generates two different voltages.

A switch circuit 35 supplies one of the two reference voltages sent from the reference voltage generator 34 to the inverting input terminal of a differential amplifier 36 in accordance with the control signal S1. The non-inverting input terminal of the differential amplifier 36 receives a feedback signal of a primary charging high voltage HV1. According to the two inputs, the output voltage of the differential amplifier 36 is determined, and is input to a pulse-width modulator (PWM) 37.

An oscillation output of an oscillator (OSC) 38 is input to the pulse-width modulator 37. A pulse width of the oscillation output is determined by the modulator 37 in accordance with the output voltage of the differential amplifier 36, and is input to a drive circuit 39. The drive circuit 39 is connected to the primary winding of a high-voltage transformer 40, and causes the secondary winding of the high-voltage transformer 40 to generate a high voltage on the basis of the modulated pulse. The secondary winding output of the high-voltage transformer 40 is rectified and smoothed, thus supplying the high voltage HV1 to the primary charger 10.

Since a corona current in the primary charger 10 is fed back to the non-inverting input terminal of the differential amplifier 36 through a resistor, it is kept constant in accordance with the reference voltage of the reference voltage generator 34. Therefore, when the switch circuit 35 is switched in accordance with the control signal S1, the charge amount of the primary charger 10 can be switched.

The HVS3A shown in FIG. 4 has a polarity different from that of the HVS1A described above. A reference voltage generator 34' performs the same operation as in the generator 34 in FIG. 3. A switch circuit 35' performs the same operation as the switch circuit 35; a differential amplifier 36', 36; a pulse-width modulator 37', 37, an oscillator 38', 38; a drive circuit 39', 39; and a high-voltage transformer 40', 40. The polarity of a rectification diode for the secondary winding output of the high-voltage transformer 40' is inverted (that is, a high voltage HV3 is generated), so that the high voltage HV3 having a polarity opposite to that of the circuit shown in FIG. 3 is generated. The HVS3A switches a corona current of the transfer charger 17 in accordance with the control signal S3 in the same manner as in the HVS1A.

Figure 5:
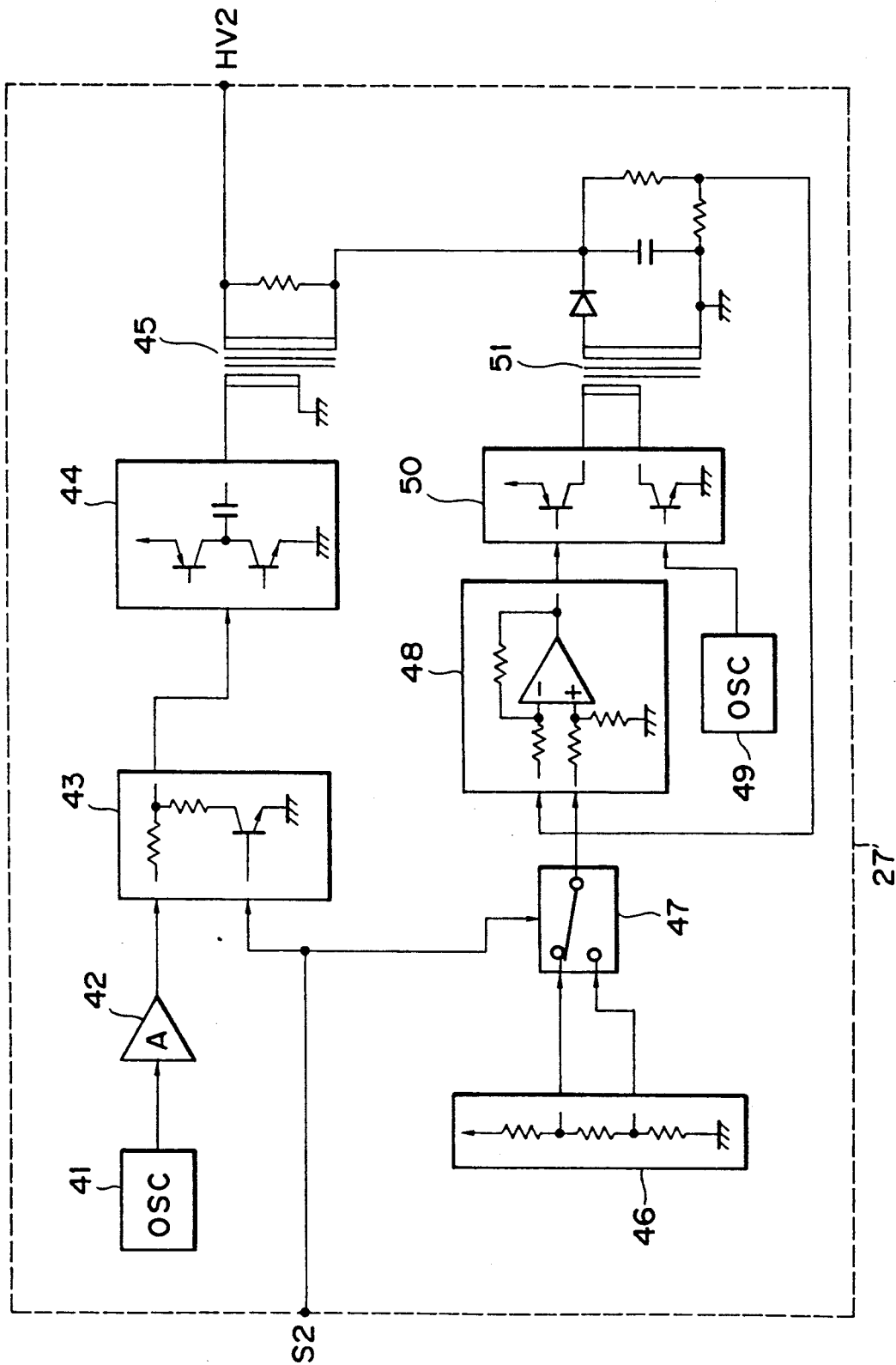
FIG. 5 is a circuit diagram of a high voltage source 27.

FIG. 5 is a block diagram showing an arrangement of the HVS2A (27) for supplying a bias voltage HV2 to the developing sleeve of the developing device 13. The bias voltage HV2 is generated by synthesizing output voltages from an AC voltage generating section with a DC voltage generating section. The AC voltage generating section comprises an oscillator 41, an amplifier 42, an attenuator circuit 43, a drive circuit 44, and a high-voltage transformer 45.

The oscillation output from the oscillator 41 is amplified by the amplifier 42. The attenuator circuit 43 switches a voltage level of the amplified oscillation output in accordance with the control signal S2. The oscillation output passing through the attenuator circuit 43 is input to the drive circuit 44 to oscillate the high-voltage transformer 45 connected to the drive circuit 44. Thus, an AC voltage appears at the secondary winding of the high-voltage transformer 45. Since the voltage level of the oscillation output passing through the attenuator circuit 43 is switched in accordance with the control signal S2, the level of the AC voltage generated by the high-voltage transformer 45 is switched.

The DC voltage generating section comprises a reference voltage generator 46, a switch circuit 47, a differential amplifier 48, an oscillator 49, a drive circuit 50, and a high-voltage transformer 51.

The reference voltage generator 46 generates two different voltages. The switch circuit 47 supplies one of the two reference voltages sent from the reference voltage generator 46 to one input terminal of the differential amplifier 48. The other input terminal of the differential amplifier 48 receives a feedback signal of the voltage generated by the high-voltage transformer 51. According to the two inputs, the output voltage of the differential amplifier 48 is determined. The drive circuit 50 for the high-voltage transformer 51 causes the high-voltage transformer 51 to oscillate on the basis of the oscillation output of the oscillator 49. The drive circuit 50 controls the primary current of the high-voltage transformer 51 and causes it to generate a secondary winding output voltage.

The secondary winding output of the high-voltage transformer 51 is rectified and smoothed to be converted to a DC voltage. The DC voltage is voltage-divided by a resistor, and becomes a feedback signal to the differential amplifier 48. Thus, a constant output voltage is kept in accordance with the reference voltage from the reference voltage generator 46. Therefore, when the switch circuit 47 is switched in accordance with the control signal S3, the level of the DC voltage generated by the high-voltage transformer 51 is switched.

The AC voltage generated by the high-voltage transformer 45 and the DC voltage are added to be the bias voltage HV2. The voltage level of the bias voltage HV2 is switched by the control signal S2.

Figure 6:
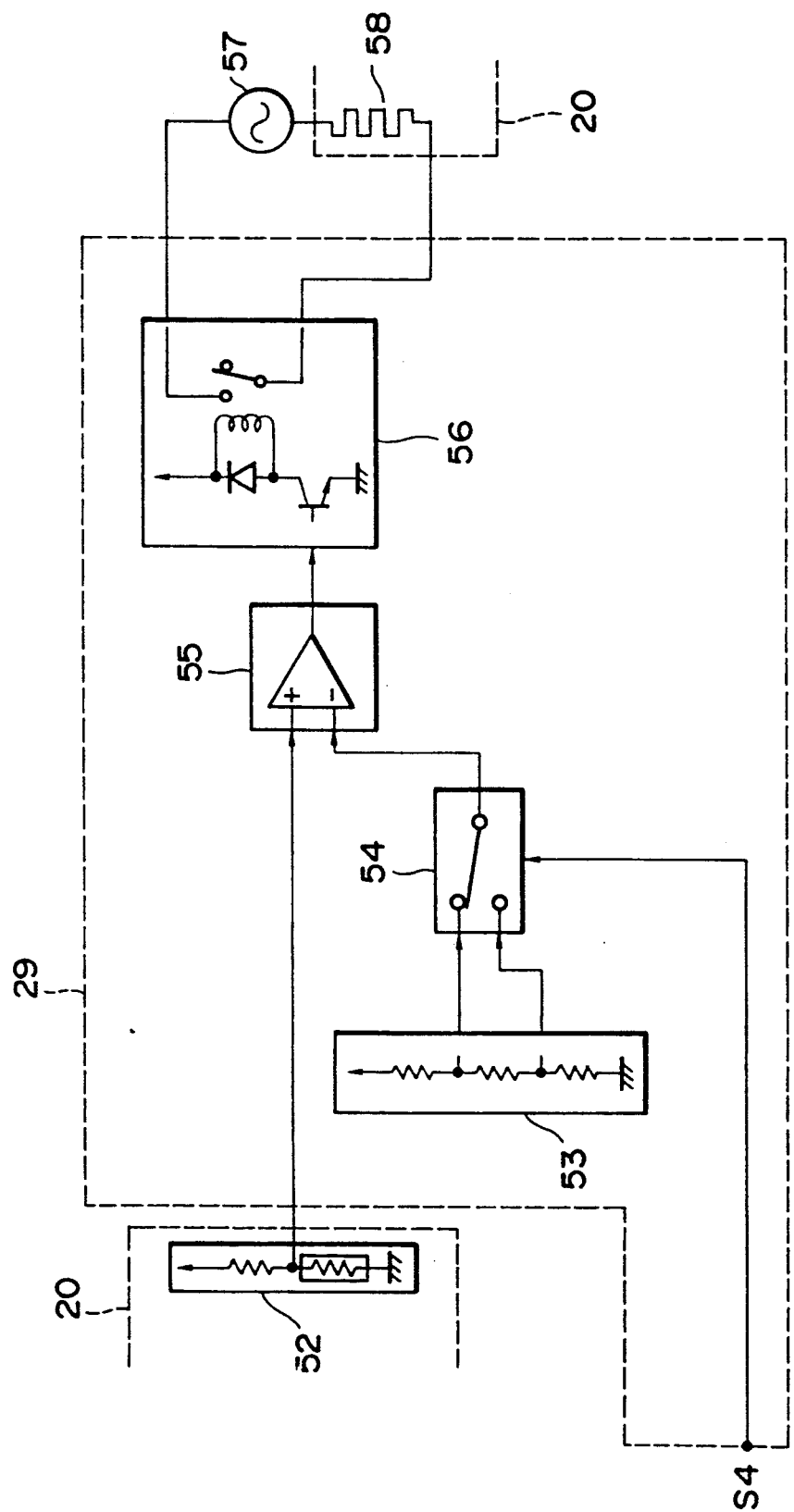
FIG. 6 is a circuit diagram of a temperature control circuit.

FIG. 6 is a block diagram showing an arrangement of the FSCA 29. A temperature sensor 52 is arranged in the fixing device 20, and comprises a resistor and a thermistor. Since the resistance of the thermistor changes depending on a fixing temperature, a voltage-divided output voltage level also changes. The output voltage of the temperature sensor 52 is input to a comparator 55. The other input terminal of the comparator 55 receives a reference voltage generated by a reference voltage generator 53 and selected by a switch circuit 54. The reference voltage is compared with the output voltage of the temperature sensor 52.

A relay circuit 56 is operated in accordance with the output result of the comparator 55 to supply an AC voltage 57 to a halogen heater 58 arranged in the fixing device 20. Thus, the fixing temperature is kept constant at a point where the output voltage of the temperature sensor 52 coincides with the reference voltage of the reference voltage generator 53. Therefore, when the switch circuit 54 is switched by the control signal S4, the fixing temperature is changed.

Figure 9:
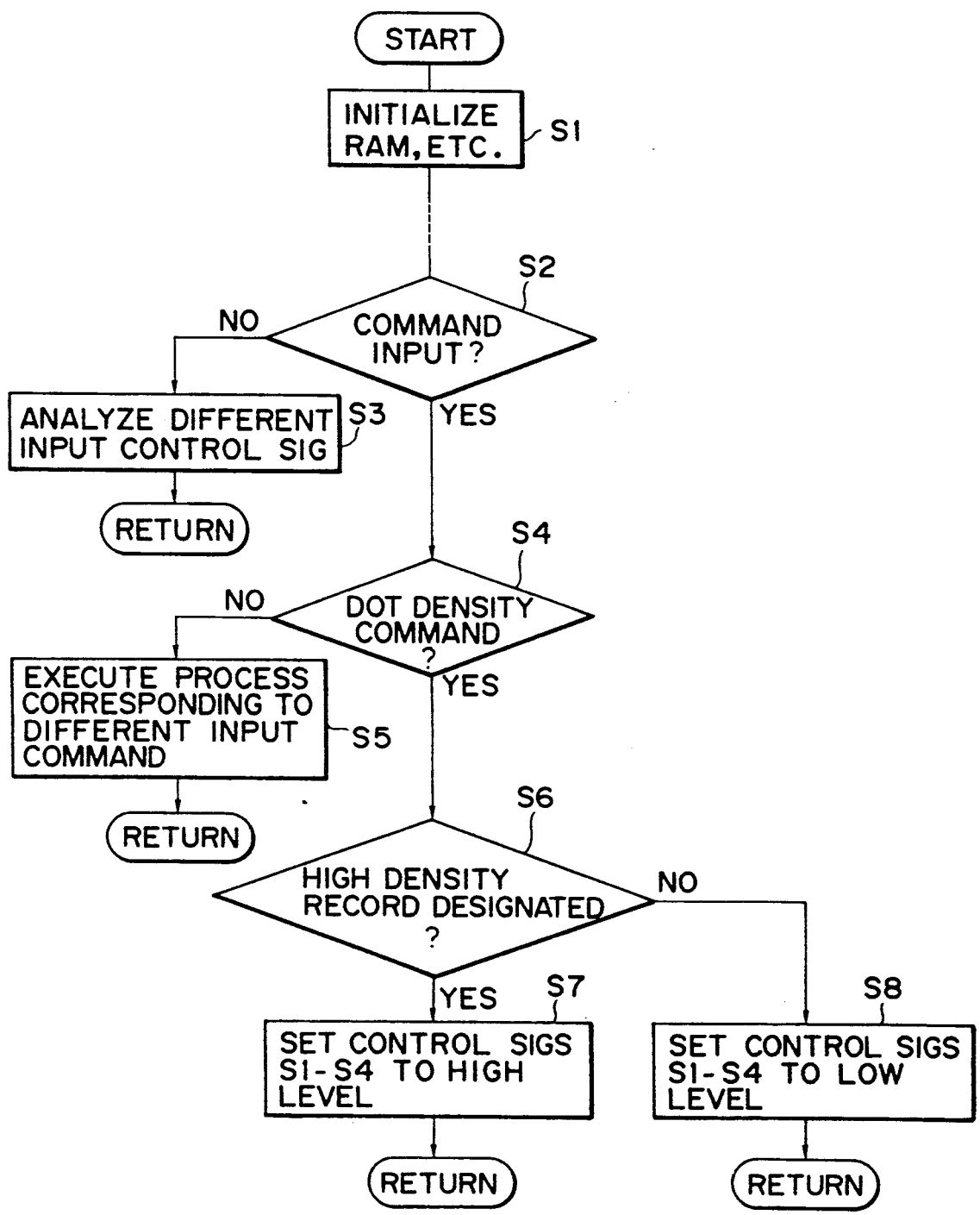
FIG. 9 is a control flow chart of the first embodiment.

The control operation executed by the CPU 31 will be described below with reference to the flow chart of FIG. 9. Note that the program of the flow chart shown in FIG. 9 is stored in the ROM 32.

When the program starts, the CPU 31 initializes the RAM 33, and the like in step S1. Thereafter, the CPU 31 exchanges data with the external apparatus to check if command data is input from the external apparatus (step S2). If NO in step S2, the flow advances to step S3, and the CPU 31 executes an analysis operation of an input control signal, and the like. If YES in step S2, the flow advances to step S4 to check if the input command data is a dot density command (DCNG). If NO in step S4, the flow advances to step S5, and the CPU executes processing corresponding to the input command data. If YES in step S4, i.e., if the input command data is the dot density command and designates a high-density recording mode, the flow advances to step S7; if it designates a low-density recording mode, the flow advances to step S8. In step S7, the control signals S1 to S4 are set at HIGH level to set select terminals of the switch circuits 35, 35', 47, and 54. More specifically, the select terminal of the switch circuit 35 is set to increase a discharge amount of the primary charger 10. The select terminal of the switch circuit 35' is set to decrease a corona current of the transfer charger 17. Furthermore, the select terminal of the switch circuit 47 is set to decrease the bias voltage to be applied to the developing sleeve. The select terminal of the switch circuit 54 is set to increase a temperature of the fixing rollers.

Figure 7:
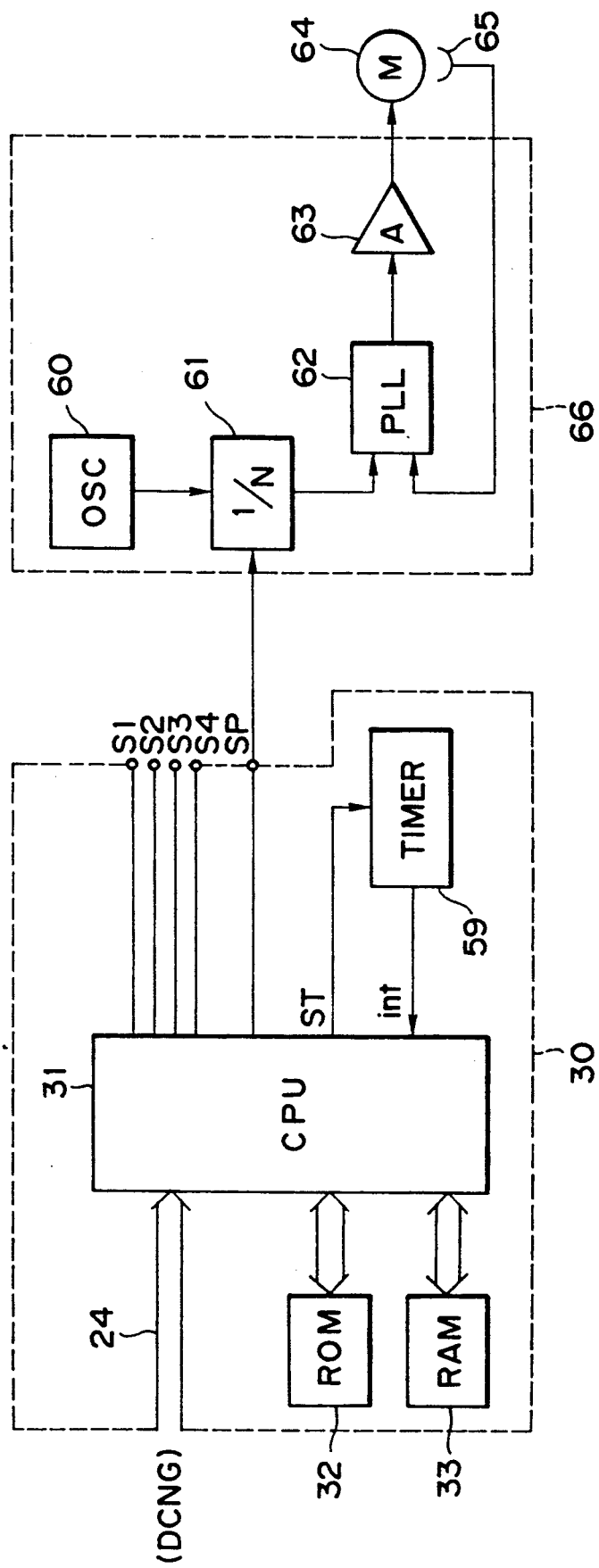
FIG. 7 is a diagram of a feed motor control circuit.

In step S8, the control signals S1 to S4 are set at LOW level to set the select terminals of the switch circuits 35, 35', 47, and 54 in a state opposite to that in FIG. 7. As a result, the discharge amount of the primary charger 10 is decreased and the corona current of the transfer charger 17 is increased as compared to those in the high-density recording mode. Furthermore, the bias voltage is increased, and the temperature of the fixing rollers is decreased. In this case, when the high-density recording mode is designated, the CPU 31 supplies the control signals to the oscillator 3, the laser control circuit 4, and the motor control circuit 8, switches the frequency of an image clock to the high-frequency side, and decreases the drive current of the laser, thereby decreasing a laser beam amount. Furthermore, the CPU switches the rotational speed of the rotary polygon mirror to a high speed. When the low-density recording mode is designated, the CPU switches the frequency of the image clock to the low-frequency side, and increases the laser amount as compared to those in the high-density recording mode. Furthermore, the CPU switches the rotational speed of the rotary polygon mirror to a low speed.

Note that in this embodiment, control is made while the rotational speed of the photosensitive drum 9, i.e., a printing speed of the transfer sheet 15 is fixed. However, a means for changing the printing speed may be combined.

FIG. 7 is a block diagram showing the means for changing the printing speed. The same reference numerals in FIG. 7 denote the same parts as in other drawings. A convey motor 64 serves as a power source for the photosensitive drum 9, the convey rollers 16, the conveyor belt 19, and the like in FIG. 1, and is rotated at a constant speed under the control of a convey motor control circuit 66.

An oscillation output of an oscillator 60 is frequency-divided by a frequency divider 61. The oscillation output which is frequency-divided by the frequency divider 61 is input to a PLL circuit 62 as a reference signal. The PLL circuit 62 receives an output signal from a rotation sensor 65 for generating a pulse signal in accordance with the rotational speed of the convey motor 64. The PLL circuit 62 performs phase control and frequency control based on the input signals to keep constant the rotational speed of the convey motor 64 through an amplifier 63 connected to the output terminal of the PLL circuit 62.

The frequency divider 61 changes a frequency-division ratio in accordance with a control signal SP supplied from the controller 30. Therefore, when the frequency of the reference signal input to the PLL circuit 62 changes, the rotational speed of the convey motor 64 also changes. The CPU 31 simultaneously changes an interrupt period of a timer interrupt circuit 59 used for sequence control in response to a control signal ST, thereby changing the sequence control.

Note that the frequency divider 61 sets the frequency-division ratio to decrease the speed of the convey motor 64 in the high-density recording mode; sets it to increase the speed of the motor 64 in the low-density recording mode as compared to that in the high-density recording mode.

As described above, the means for changing the printing speed can be easily combined to further improve printing quality, as a matter of course.

As described above, according to the embodiment of the present invention, a laser beam printer which employs an electrophotographic process and can change a dot density of a light source to be radiated on a photosensitive body on the basis of external data, comprises a means for changing a charge amount uniformly given to the photosensitive body, a means for changing a bias voltage to be applied to a developing sleeve, a means for changing a corona discharge amount for transferring a developing agent onto a transfer sheet, and a means for changing a temperature for fixing the developing agent on the transfer sheet. Thus, charging, developing, transferring, and fixing conditions can be controlled to optimal values in accordance with a dot density, and even if the dot density is switched, a high-quality print-out can always be obtained.

Second Embodiment

FIG. 10 is a block diagram showing an arrangement of control circuits of a laser printer according to a second embodiment of the present invention. As shown in FIG. 10, a scan density select circuit 101 outputs a select signal I indicating a scan density of 300 dpi, 600 dpi, or the like in accordance with a select switch 111. The select signal I is input to a scanner rotation control circuit 102, a laser drive current control circuit 103, and a drum voltage control circuit 104. A control method of the control circuits 102 to 104 which receive the select signal I will be described below with reference to the drawings.

The scanner rotation control circuit 102 control a rotational speed (rotations) of a scanner motor 108 for driving a polygon mirror through a scanner driver 105. When the scan density select circuit 101 outputs a 600-dpi select signal I, the scanner rotation control circuit 102 instructs the scanner driver 105 to rotate the scanner motor 108 at a rotational speed (rotations) twice that at 300 dpi. Thus, the scan density in a sub-scan direction can be doubled, and a 600-dpi image signal can be processed. A method of controlling the rotational speed (rotations) of the scanner motor 108 by the scanner rotation control circuit 102 of the second embodiment will be described below with reference to the block diagram of FIG. 11.

In FIG. 11, an oscillation frequency of a crystal oscillator 121 is frequency-divided by a frequency divider 122 in accordance with the select signal I. When the select signal I indicates 300 dpi, the oscillation frequency is frequency-divided by 8; when it indicates 600 dpi, the frequency is frequency-divided by 4. The frequency-divided frequency is input to a motor driver 123 to serve as a reference frequency for driving the scanner motor 108. Upon reception of this frequency, the motor driver 123 converts the frequency into a drive signal, and supplies the signal to the scanner motor 108. When the scanner motor 108 is rotated, a tacho generator 124 attached to the scanner motor 108 feeds back a frequency signal to the motor driver 123. The motor driver 123 compares this signal with the reference frequency to control the rotational speed of the scanner motor 108.

The laser drive current control circuit 103 shown in FIG. 10 controls a drive current for causing a semiconductor laser 109 to emit light through a laser driver 106. When the select signal I indicates 600 dpi, the drive current is controlled so that the spot size of a laser beam which can provide an appropriate exposure amount becomes about 42 $\mu$m. However, when the select signal I indicates 300 dpi, the drive current is controlled so that the spot size of a laser beam becomes about 85 $\mu$m.

This control is made to increase the drive current so as to cause the semiconductor laser 109 to emit light at a higher intensity, thereby eliminating nonuniformity of solid black in a low-density recording mode.

Figures 12A, 12B:
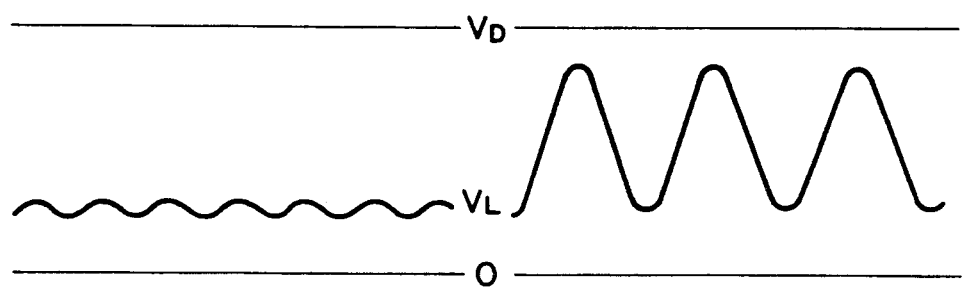
FIG. 12A is a chart showing a drum surface voltage obtained when proper exposure is made at 600 dpi.
FIG. 12B is a chart showing a drum surface voltage obtained when proper exposure is made at 300 dpi.

Note that FIGS. 12A and 12B show a drum surface voltage (or potential) $V_L$, and exemplify a case wherein the above-mentioned drive current control is not performed. FIG. 12A shows a case of 600 dpi and FIG. 12B shows a case of 300 dpi. As can be seen from FIGS. 12A and 12B, when the scan density is lowered, a nonuniform drum surface voltage $V_L$ for solid black is generated.

Figures 13A, 13B:
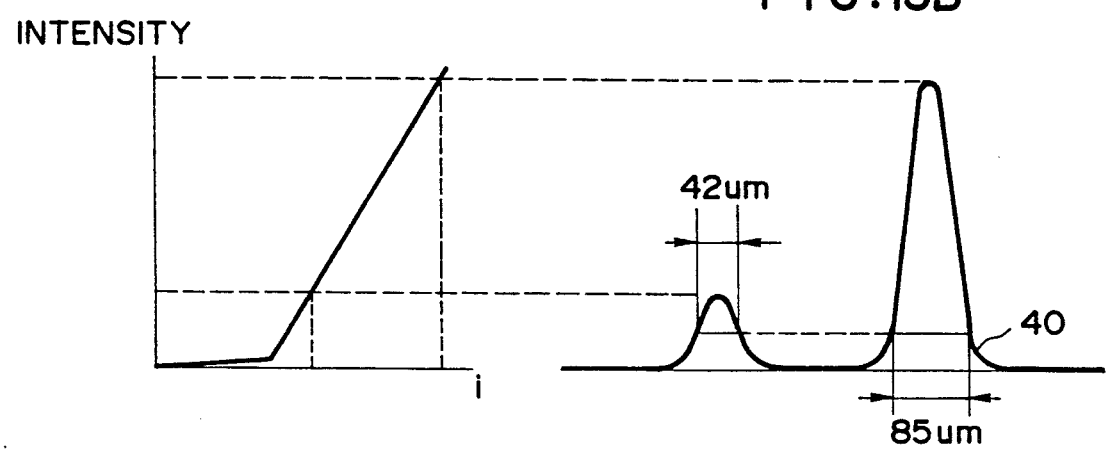
FIG. 13 shows graphs showing the relationship among a drive current, an intensity, and an intensity distribution.

FIG. 13A shows the relationship among a drive current i, an emission intensity, and an intensity distribution when the above-mentioned control is made. As shown in FIG. 13 at A, when the drive current i is changed, the emission intensity of the semiconductor laser 109 can be changed. As can be seen from FIG. 13 at B, when the emission intensity is changed, the spot size of a portion 40 which is exposed beyond a necessary minimum exposure amount can also be changed. Therefore, a spot size corresponding to a selected scan density can be obtained.

Finally, the drum voltage control circuit 104 will be described. The reason for necessity of drum voltage control will be explained below.

Figures 14A, 14B:
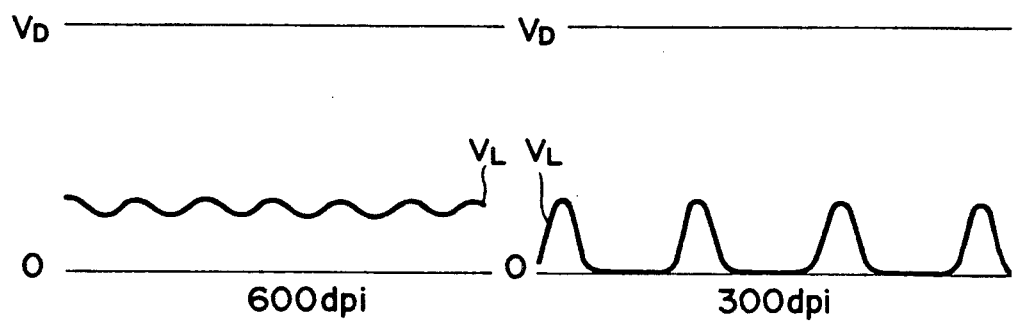
FIGS. 14A and 14B are charts showing the intensity distribution shown in FIG. 13B.

FIGS. 14A and 14B show the drum surface voltage $V_L$, obtained when a laser beam having an intensity distribution which is changed according to a scan density as shown in FIG. 13 at B is radiated on the drum. As can be seen from FIGS. 14A and 14B, at 600 dpi, nonuniformity of the surface voltage $V_L$, for solid black is small, but at 300 dpi, nonuniformity remains every scan interval. Taking a difference between a maximum value of the $V_L$ nonuniformity and a dark voltage $V_D$ (contrast: $V_C$) into consideration, the maximum value at 300 dpi becomes smaller than that at 600 dpi. For this reason, when this latent image is to be developed, a portion where $V_L$ remains high cannot be satisfactorily developed, and its density becomes low. As a result, a nonuniform portion is formed and adversely influences image quality. Thus, in order to increase the contrast $V_C$, a high dark voltage $V_D$ is set.

FIG. 15A shows a case wherein a laser beam is strongly emitted while the dark voltage $V_D$ remains the same, and FIG. 15B shows a case wherein the dark voltage $V_D$ is re-set to be high. Upon comparison between FIGS. 15A and 15B, the maximum values of $V_L$ causing nonuniformity do not have a large difference. In view of the relative contrast $V_C$, the contrast $V_C$ can be increased as the voltage $V_D$ is set to be higher. For this reason, when such a latent image is developed, density nonuniformity at a high $V_L$ portion which easily causes nonuniformity is not so conspicuous.

For the above-mentioned reasons, the drum surface voltage need be set to be high in the low-density recording mode (300 dpi in the second embodiment).

A method of controlling the drum voltage in the second embodiment will be described below with reference to FIG. 16.

As shown in FIG. 16, when a voltage is applied from a high-voltage transformer 162 to a charger 110, a photosensitive drum 165 is charged by corona discharge. In this case, a current detect circuit 163 detects a current flowing through the photosensitive drum, and feeds it back to a charger corona current setting circuit 161. The current setting circuit 161 compares the feedback current value with a reference current value, and controls the high-voltage transformer 162 to obtain an optimal current value. The reference current value to be compared is selected according to a scan density indicated by the select signal output from the scan density select circuit 101 shown in FIG. 10.

As described above, according to the second embodiment, a single apparatus can perform operations in correspondence with two types of scan density, and can obtain a good image.

In this embodiment, the scan density is selected between 300, dpi and 600 dpi. However, the present invention is not limited to this. For example, the present invention may be applied to arbitrary scan densities such as 240 dpi and 400 dpi, and the same effect as described above can be obtained.

In the second embodiment, the photosensitive drum has been exemplified as an image carrier. However, the present invention may be applied to all other image carriers utilized in electrophotographic techniques, such as a photosensitive belt.

In the second embodiment, a manual switch is used as a scan density select means. A scan density identification signal may be superposed on an image data signal sent from an external apparatus, so that a scan density can be automatically discriminated and selected.

In the second embodiment, in order to change the scan density in the sub-scan direction, the rotational speed of the scanner motor is controlled. However, the speed of the image carrier, e.g., the rotational speed of the photosensitive drum or the feed speed of a photosensitive belt may be controlled.

Upon control of the surface voltage of the image carrier, a current flowing through the image carrier is detected and controlled. However, the surface voltage of the image carrier may be directly measured and controlled.

Note that the present invention may be applied to various other image recording apparatuses such as a laser beam printer, an LED printer, and a liquid-crystal shutter printer, which record an image according to an image data signal on a recording medium upon radiation of a light beam.

Third Embodiment

Figure 17:
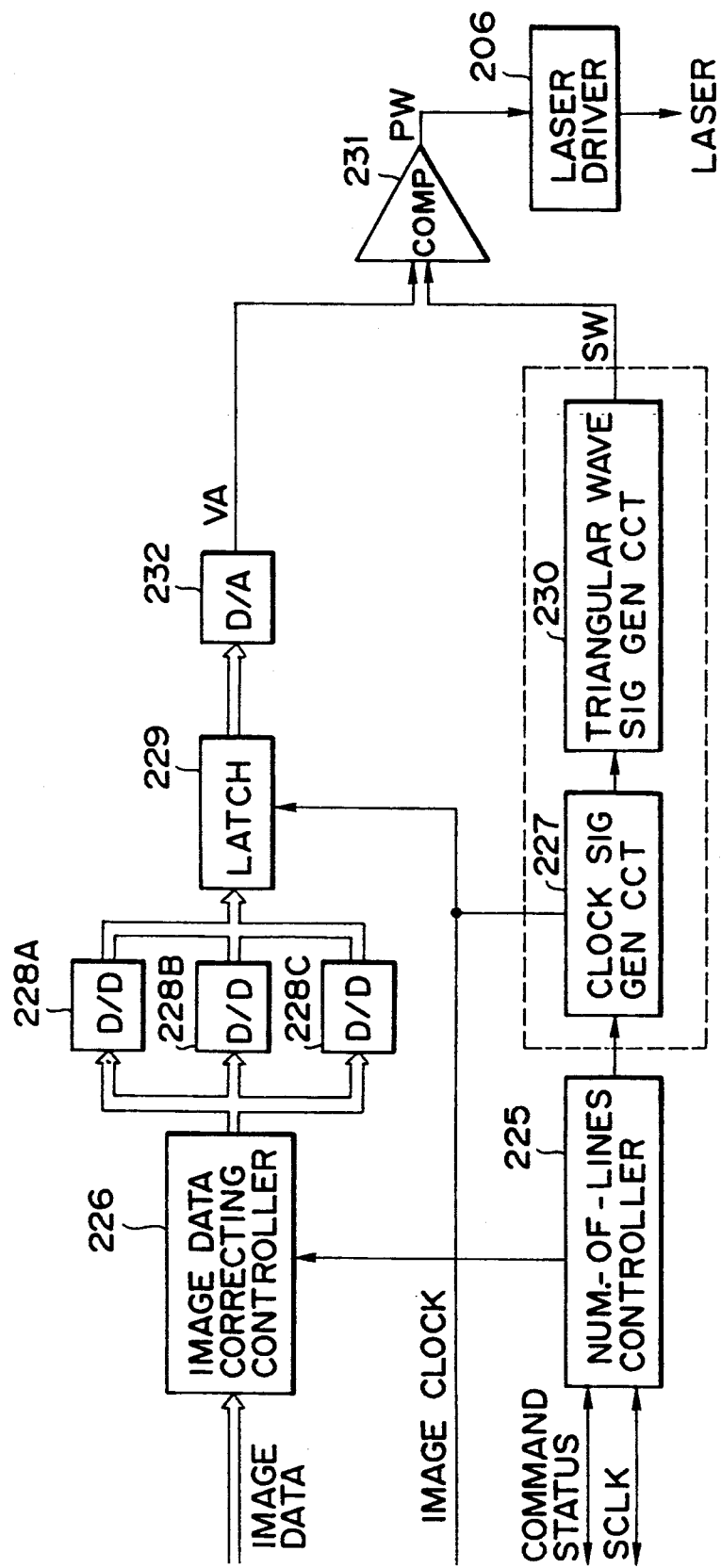
FIG. 17 is a block diagram showing a signal processing system of a laser printer according to a third embodiment of the present invention.

FIG. 17 is a block diagram showing a signal processing system of a laser printer according to a third embodiment of the present invention.

This signal processing system receives 8-bit image data, an image clock, a command status signal including a command for designating the number of lines of an image, and a serial clock (SCLK) used for fetching a command from a host computer (not shown).

For example, assuming that a printing density of this laser printer is 300 dpi and the number of lines (representing a resolution of an image to be printed) designated by the command is 150, an image clock is a clock corresponding to pixels at 300 dpi, and a number-of-lines controller 225 notifies to an image data correcting controller 226 and a clock signal generating circuit 227 that the designated number of lines is 150.

The image data correcting controller 226 selects a first D/D converter 228A for performing density correction suitable for a 150-line image output of this printer. 8-bit image data is digital-to-digital converted, and is latched by a latch circuit 229 on the basis of an image block to synchronize timings.

The image data correcting controller 226 can comprise a simple selection switch which is operated in accordance with an output signal from the number-of-lines controller 225. For example, the image data correcting controller 226 may be arranged to select a data bus of image data in accordance with the output signal from the number-of-lines controller 225, so that image data is output to one of first, second, and third D/D converters.

Figure 18:
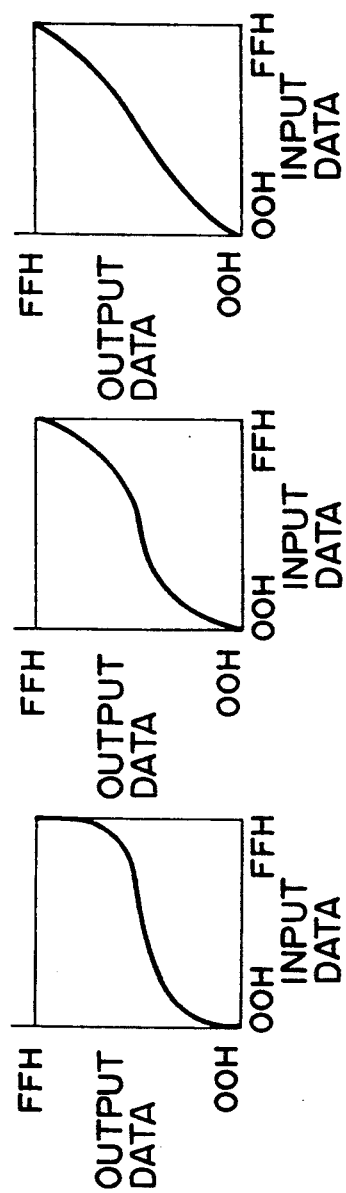

Second and third D/D converters 228B and 228C have density correction tables different from that of the first D/D converter 228A. If the D/D converters 228A, 228B, and 228C are used for 150 lines, 75 lines, and 32.5 lines, respectively, their density correction characteristics are as shown in FIGS. 18-1 to 18-3. More specifically, the D/D converters 228A, 228B, and 228C have different output data curves with respect to predetermined input data.

The clock signal generating circuit 227 which received the number-of-lines designating signal indicating 150 lines from the number-of-lines controller 225 sends a clock obtained by frequency-dividing the image clock by 2 to a triangular wave signal generating circuit 230. The triangular wave signal generating circuit 230 integrates the input clock signal, and supplies a triangular wave signal SW having a period corresponding to two 300-dpi pixels to a comparator 231. Note that the clock signal generating circuit 227 comprises a frequency divider for frequency-dividing the image clock in accordance with the output signal from the umber-of-lines controller 225.

Meanwhile, the 8-bit image data latched by the latch circuit 229 is converted to a 256-level analog signal VA by a D/A converter 232. The analog signal VA is compared with the triangular wave signal SW by the comparator 231, and is converted from a level signal to a time-modulation signal, i.e., to a pulse-width modulation signal PW. The signal PW is supplied to a laser driver 206.

Figure 19:
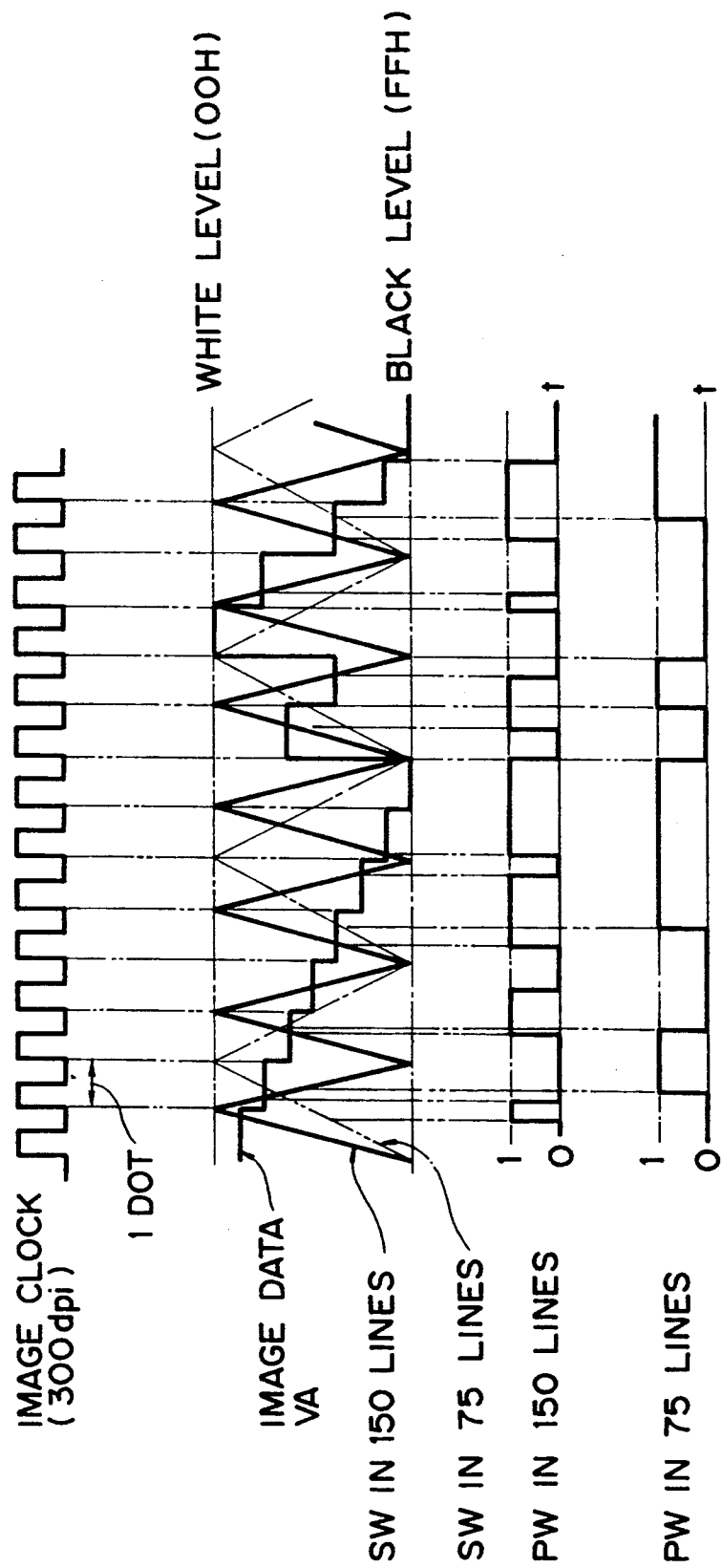
FIG. 19 is a timing chart showing the relationship among an analog signal VA, a triangular wave signal SW, and a pulse-width modulated signal PW when the number of lines is 150 lines and 75 lines in a 300-dpi printer of the third embodiment.

FIG. 19 is a chart showing the relationship among the analog signal VA, the triangular wave signal SW, and the pulse-width modulation signal PW when the numbers of lines correspond to 150 and 75 in a printer of 300 dpi. In 150 lines, two pixels correspond to one period of the triangular wave signal, and in 75 lines, four pixels correspond to one period of the triangular wave signal.

For common image data, different pulse-width modulation signals PW are generated in accordance with triangular wave signals SW based on the different numbers of lines.

In this embodiment, the three D/D converters 228A, 228B, and 228C corresponding to three types of number of lines are provided for density correction of image data. In order to cope with many types of number of lines, for example, a large number of density correction tables are stored in a ROM, the correction table according to the designated number of lines is loaded in a RAM, and density correction may be made on the basis of the loaded correction table. Many types of number of lines can be coped with upon combination of frequency dividers in the clock signal generating circuit 227.

In the third embodiment, the analog type pulse-width modulation processing has been described wherein digital image data is converted to analog image data and the analog data is compared with a triangular wave signal. However, if an up/down counter is used in place of the triangular wave generating circuit, digital type pulse-width modulation processing wherein output data from the up/down counter is compared with D/D-converted digital data by a comparator may be applied to halftone reproduction.

Fourth Embodiment

Figure 20:
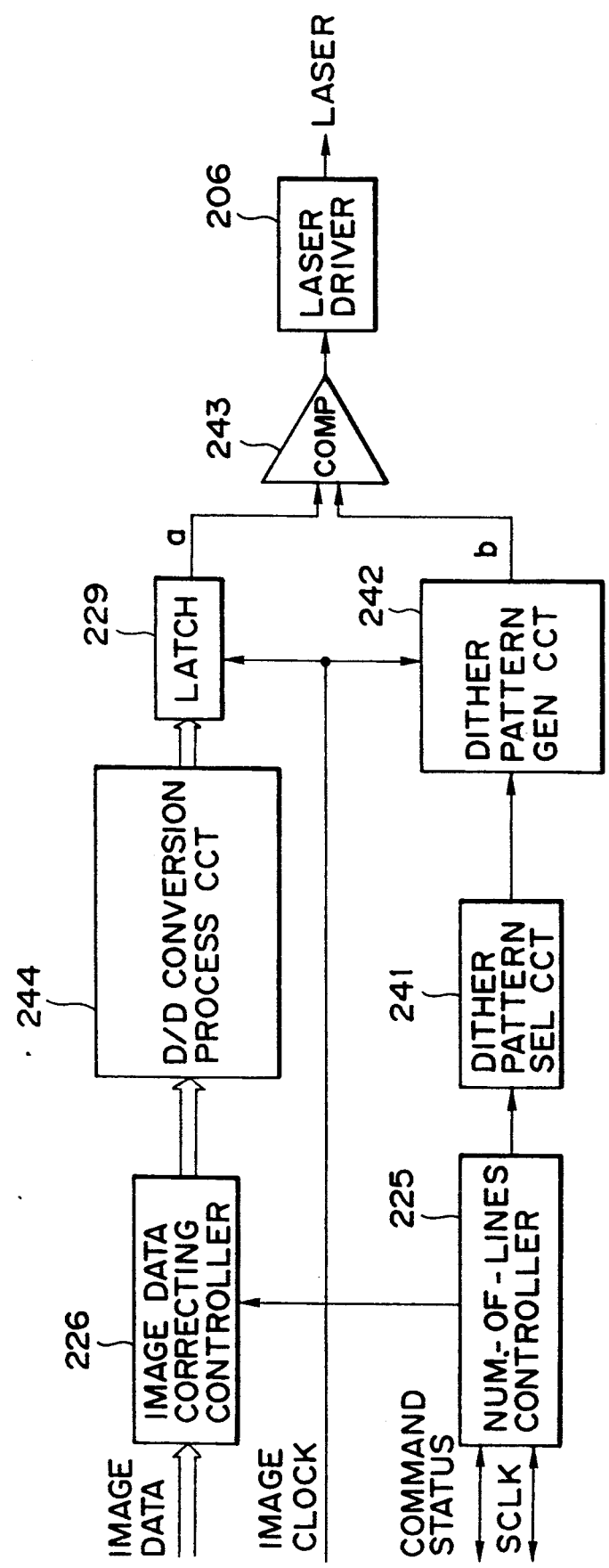
FIG. 20 is a block diagram showing a signal processing system of a laser printer according to a fourth embodiment of the present invention.

FIG. 20 is a block diagram showing a signal processing system of a laser printer according to a fourth embodiment of the present invention.

Note that the same reference numerals in FIG. 20 denote the same parts as in the arrangement shown in FIG. 17, and a repetitive description will be omitted.

A laser printer of this embodiment has a printing density of 600 dpi. On the basis of a number-of-lines designating command from a host computer, a number-of-lines controller 225 outputs a number-of-lines designating signal to a dither pattern select circuit 241 and an image data correcting controller 226.

If the designated number of lines is one of 300, 200, 150, 120, ..., the dither pattern select circuit 241 selects one of $2 \times 2$, $3 \times 3$, $4 \times 4$, $5 \times 5$, ... dither matrix patterns from a dither pattern generating circuit 242, and supplies its output b to a comparator 243. The image data correcting controller 226 selects a D/D-conversion table capable of performing optimal density correction with respect to the designated number of lines (i.e., the selected dither matrix pattern) from a D/D conversion process circuit 244, and supplies image data a which is subjected to optimal density correction based on the selected table to the comparator 243.

The comparator 243 supplies a "1"-level output to a laser driver 206 when the image data $a \geq$ output b; supplies a "0"-level output when the image data a < output b.

When the dither method is applied to a halftone image expression, since the dither matrix pattern can only take a given value, the numbers of lines capable of being output are restricted to some extent. For example, when the designated number of lines is one of 300, 200, 150, 120, ..., an output based on the designated number of lines can be obtained. However, when the designated number of lines is 270, 220, or the like, an output based on 300 or 200 lines approximate thereto is used for the designated number of lines. When the dither method is used, the number of lines of an output image may be one approximate to the designated number of lines. However, like in this embodiment, printer output characteristics are subjected to optimal data correction in correspondence with the number of lines, thus obtaining a high-quality halftone image in the designated number of lines.

Fifth Embodiment

Figure 21:
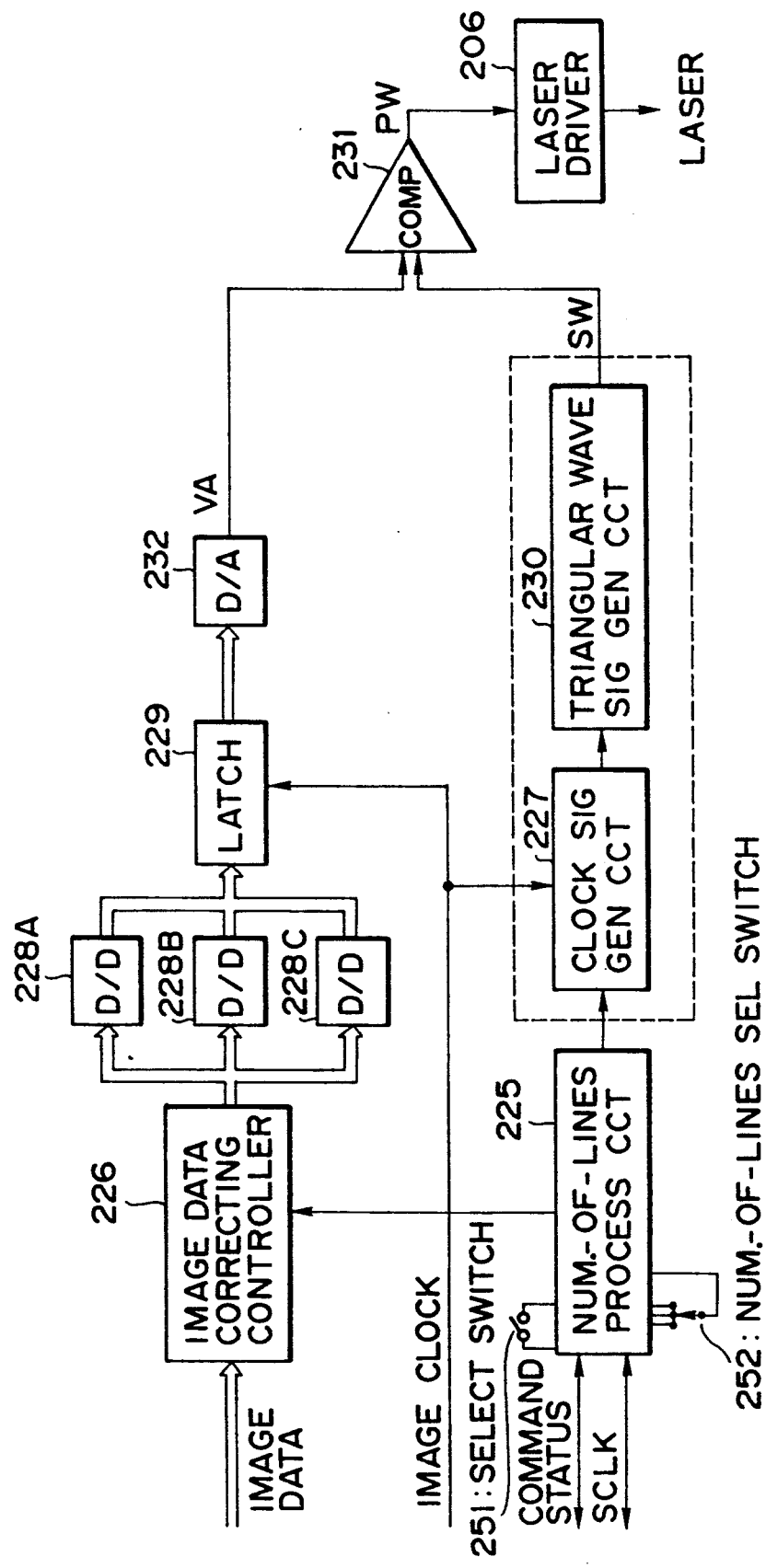
FIG. 21 is a block diagram showing a signal processing system of a laser printer according to a fifth embodiment of the present invention.
Figure 22:
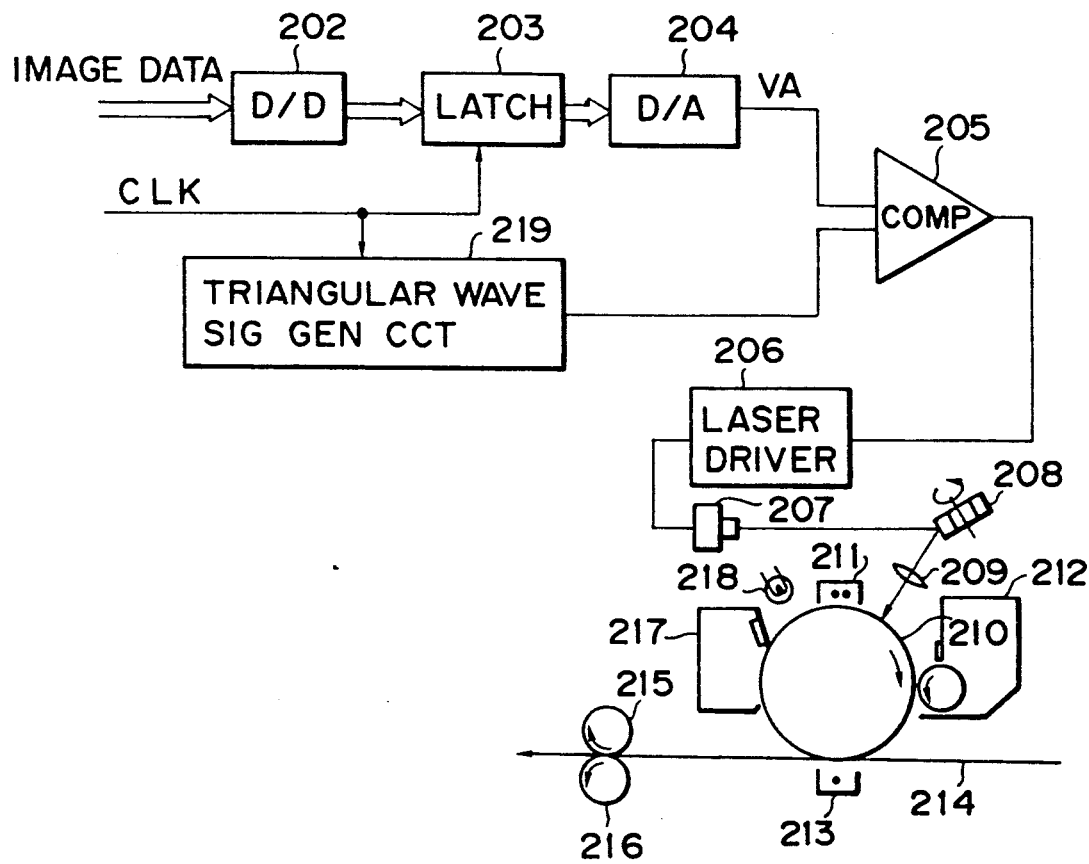
FIG. 22 is a block diagram showing a conventional laser printer.

FIG. 21 is a block diagram showing a signal processing system of a laser printer according to a fifth embodiment of the present invention.

Note that the same reference numerals in FIG. 21 denote the parts having the same functions as in FIG. 17.

In this embodiment, a host/printer select switch 251 and a number-of-lines select switch 252 are arranged on an operation panel (not shown) of the laser printer, and the number of lines can be designated by these switches.

Only when the printer is selected by the select switch 251, a number-of-lines process circuit 255 is operated on the basis of the designated number of lines by the number-of-lines select switch 252; otherwise, performs the same operation as in the number-of-lines controller 225 in the third embodiment. When the number-of-lines process circuit 255 is operated on the basis of the number of lines designated by the number-of-lines select switch 252, it supplies number-of-lines data to a host computer using a command status signal.

According to this embodiment, upon operations of the host/printer select switch 251 and the number-of-lines select switch 252, a halftone image having the number of lines independently of designation of the host computer can be obtained. Data of the actually output number-of-lines is supplied to the host computer, so that disturbance in the host computer can be avoided.

Note that selection at the number-of-lines select switch 252 may be automatically used to have priority over the host computer without arranging the host/printer select switch 251.

Sixth Embodiment

Figure 23:
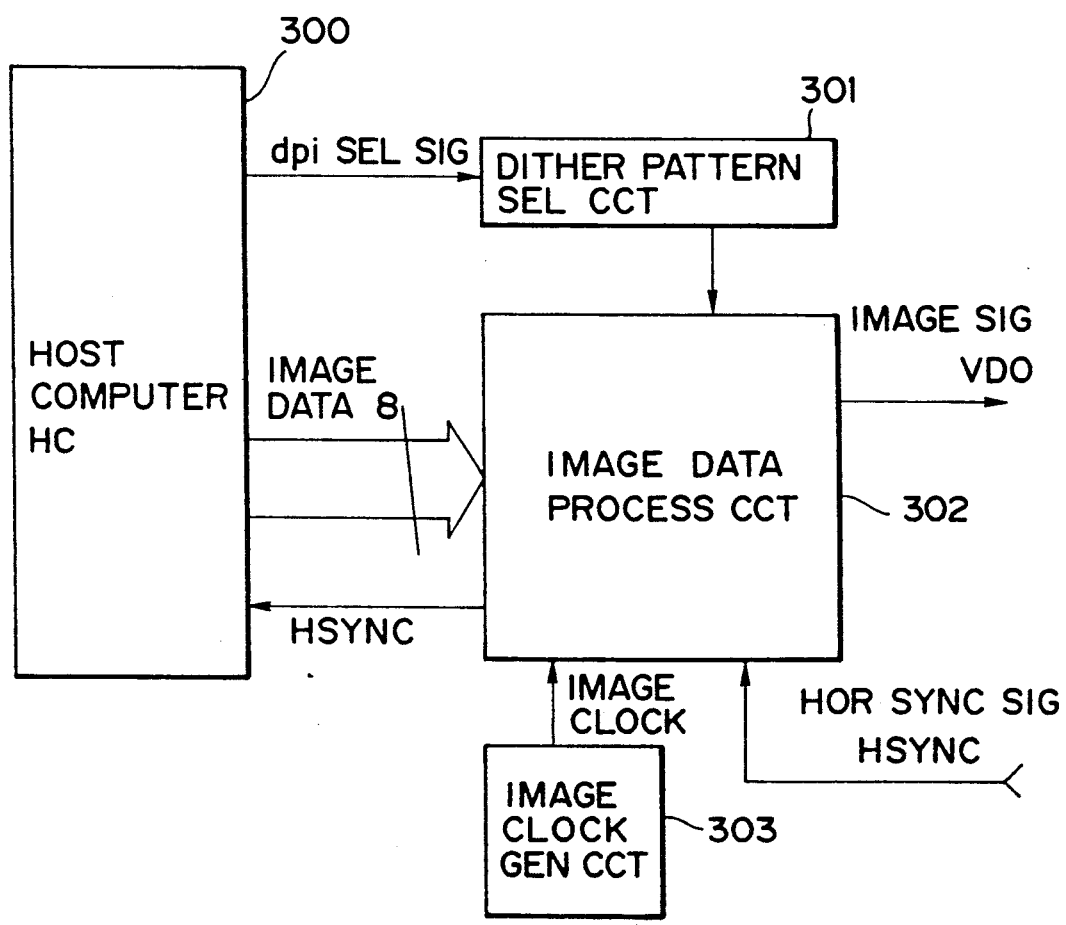
FIG. 23 is a block diagram showing a sixth embodiment of the present invention.

FIG. 23 is a block diagram showing a sixth embodiment of the present invention.

A printer apparatus of this embodiment has a dither pattern select circuit 301, an image data process circuit 302, and an image clock generating circuit 303. Image data supplied from a host computer 300 is dither-processed to generate a halftone image.

The host computer 300 outputs 8-bit image data to the printer apparatus at a predetermined timing on the basis of a horizontal sync signal HSYNC from the printer apparatus.

The dither pattern select circuit 301 selects a dither matrix suitable for a selected printing density from dither matrices stored in an internal ROM on the basis of a signal for designating a printing density sent from the host computer 300 (to be referred to as a dpi select signal hereinafter), and supplies the selected pattern to the image data process circuit 302.

FIG. 24 is a block diagram showing an arrangement of the image data process circuit 302.

The image data process circuit 302 comprises an internal RAM 321, a comparison data selector 322, and a digital comparator 323. The circuit 302 stores the dither matrix sent from the dither pattern select circuit 301 in the RAM 321, and after 8-bit image data is input, performs dither processing to convert the image data into a 2-bit image signal. The circuit 302 then supplies the image signal to a printer engine (not shown).

The comparison data selector 322 comprises an address counter, and the like, and is reset in response to the horizontal sync signal. The selector 322 sequentially accesses the dither matrix in the RAM 321 in the order of the first column, second column, third column, ... in synchronism with an image clock VCLK, and outputs a threshold value to the digital comparator 323. This operation is repeated in the same row until one-line scan is completed.

The digital comparator 323 compares the threshold value from the comparison data selector 322 and image data DATA from the host computer 300. The comparator 323 outputs an image signal VDO which goes to "1" level when the image data is larger than the threshold value; otherwise, goes to "0" level.

FIGS. 25A and 25B show dither matrices selected by the above arrangement. FIG. 25A shows a dither matrix at a printing density of 300 dpi, and FIG. 25B shows a dither matrix at a printing density of 600 dpi.

Both the dither matrices are 4×4 matrices. For the number of lines, the former matrix corresponds to 75 lines, and the latter matrix corresponds to 150 lines.

Values in each matrix are threshold values, and are compared with image data values to determine an ON/OFF state of each pixel.

FIG. 25C shows a transition state of a printing dot pattern from light tone to dark tone using the dither matrix shown in FIG. 25A. When the image data value falls within a range shown below each printing dot pattern, a print operation of the corresponding printing dot pattern is performed, thus expressing gradation.

FIG. 25D shows a transition state of a printing dot pattern from light tone to dark tone using the dither matrix shown in FIG. 25B. In FIG. 25B, when the image data value falls within a range shown below each printing dot pattern, a print operation of the corresponding printing dot pattern is performed, thus expressing gradation.

When the printing density is 300 dpi, reproducibility is good, and a distributed type dot pattern is employed. However, when the printing density is 600 dpi, since reproducibility is not so good, a concentrated type dot pattern is employed.

Seventh Embodiment

Figure 26:
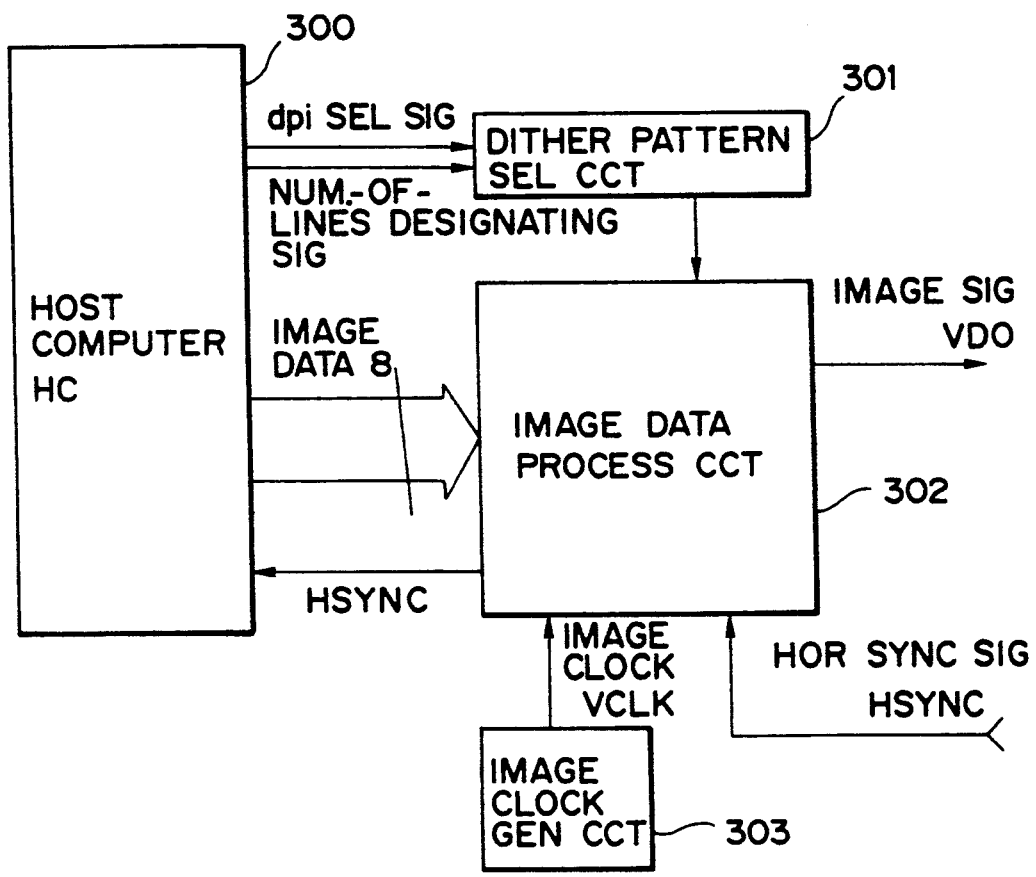
FIG. 26 is a block diagram showing a seventh embodiment of the present invention.

FIG. 26 is a block diagram showing a seventh embodiment of the present invention.

In this printer apparatus, a number-of-lines designating signal is sent from a host computer 300 to a dither pattern select circuit 301 in addition to the dpi select signal in the above embodiment, and a dither matrix is selected on the basis of this signal.

Figure 27A:
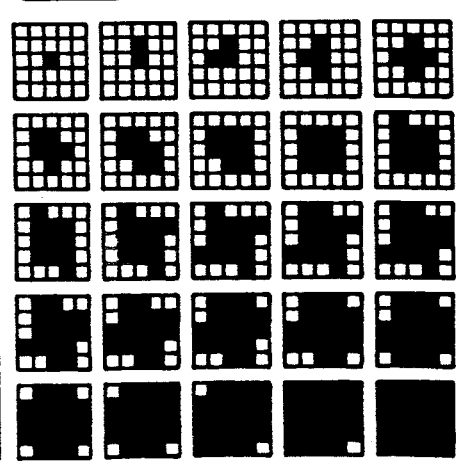
FIG. 27A shows a dither matrix selected when a printing density is 300 dpi and the number of lines is 60, and a transition state of printing dot patterns in the seventh embodiment.

For example, when the dpi select signal selects a printing density of 300 dpi, if the number-of-lines designating signal designates 60 lines, a dither pattern select circuit 301 selects a 5×5 concentrated type dither matrix shown in FIG. 27A.

Figures 27B, 27C:
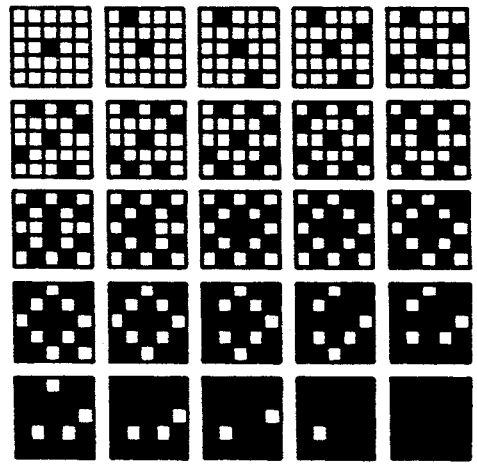
FIG. 27B shows a dither matrix selected when a printing density is 600 dpi and the number of lines is 120, and a transition state of printing dot patterns in the seventh embodiment.
FIG. 27C shows a dither matrix selected when a printing density is 600 dpi and the number of lines is 60, and a transition state of printing dot patterns in the seventh embodiment.
Figure 28A:
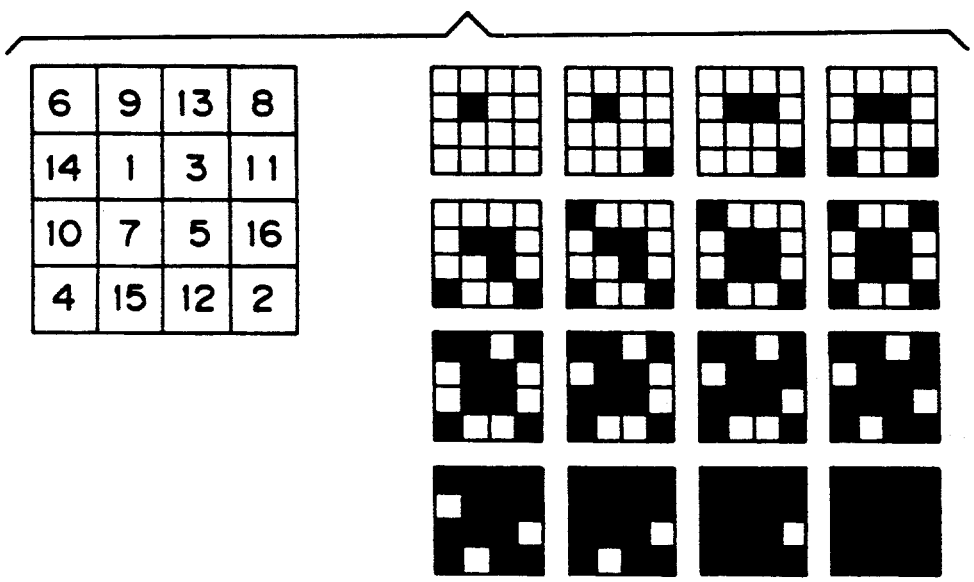
FIGS. 28A and 28B show typical dither matrices and transition states of printing dot patterns, in which FIG. 28A exemplifies a distributed type method and FIG. 28B exemplifies a concentrated type method.
Figure 28B:
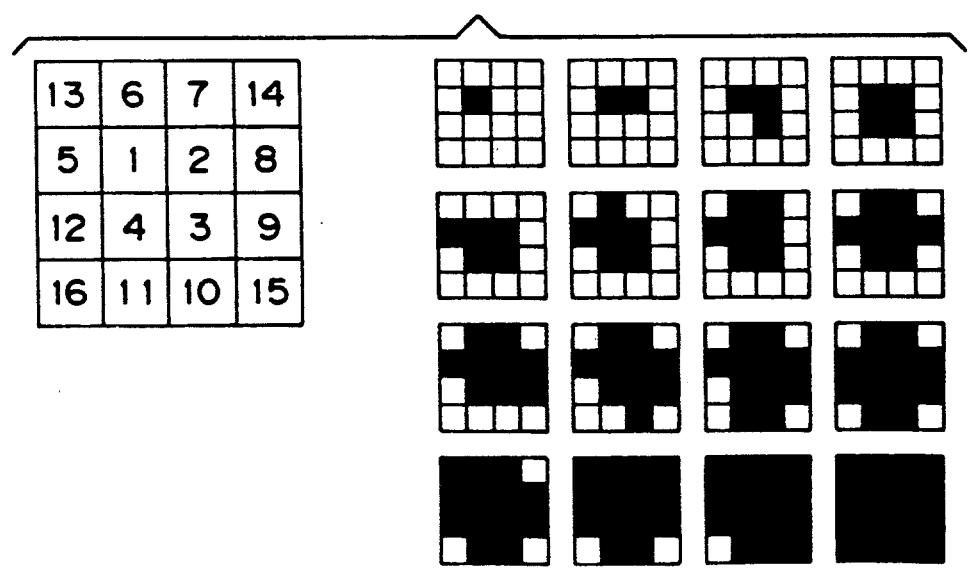

When the dpi select signal selects a printing density of 600 dpi and the number-of-lines designating signal designates 120 lines, the dither pattern select circuit 301 selects a 5×5 distributed type dither matrix shown in FIG. 27B.

Furthermore, when the dpi select signal designates 600 dpi and when an image whose number of gradation levels is to be increased while the resolution need not be so high like when a landscape picture is read from an image reader, if the number-of-lines designating signal designates 60 lines, the dither pattern select circuit 301 selects a 10×10 dither matrix shown in FIG. 27C. Thus, the number of gradation levels becomes four times, and a more smooth image output can be obtained.

In the sixth and seventh embodiments, the printing density is selected from two printing densities of 300 dpi and 600 dpi. For example, the present invention may be applied to a case wherein the printing density is selected from another combination of printing densities, e.g., 400 dpi and 500 dpi, or a case wherein the printing density is selected from a combination of three or more printing densities.

The order of filling a dither matrix is not limited to the concentrated type or distributed type described above. For example, an optimal order for the model may be selected according to an exposure method (image exposure or background exposure) of the printer apparatus, a printing density, and the like.

In the sixth and seventh embodiments, the selected dither matrix is loaded in the RAM 321. However, a plurality of types of dither matrix may be prestored in the RAM 321, and one of the dither matrices may be selected.

Eighth Embodiment

Arrangement of Eighth Embodiment (FIGS. 29 to 35, FIG. 38-1, and FIG. 38-2)

Figure 29:
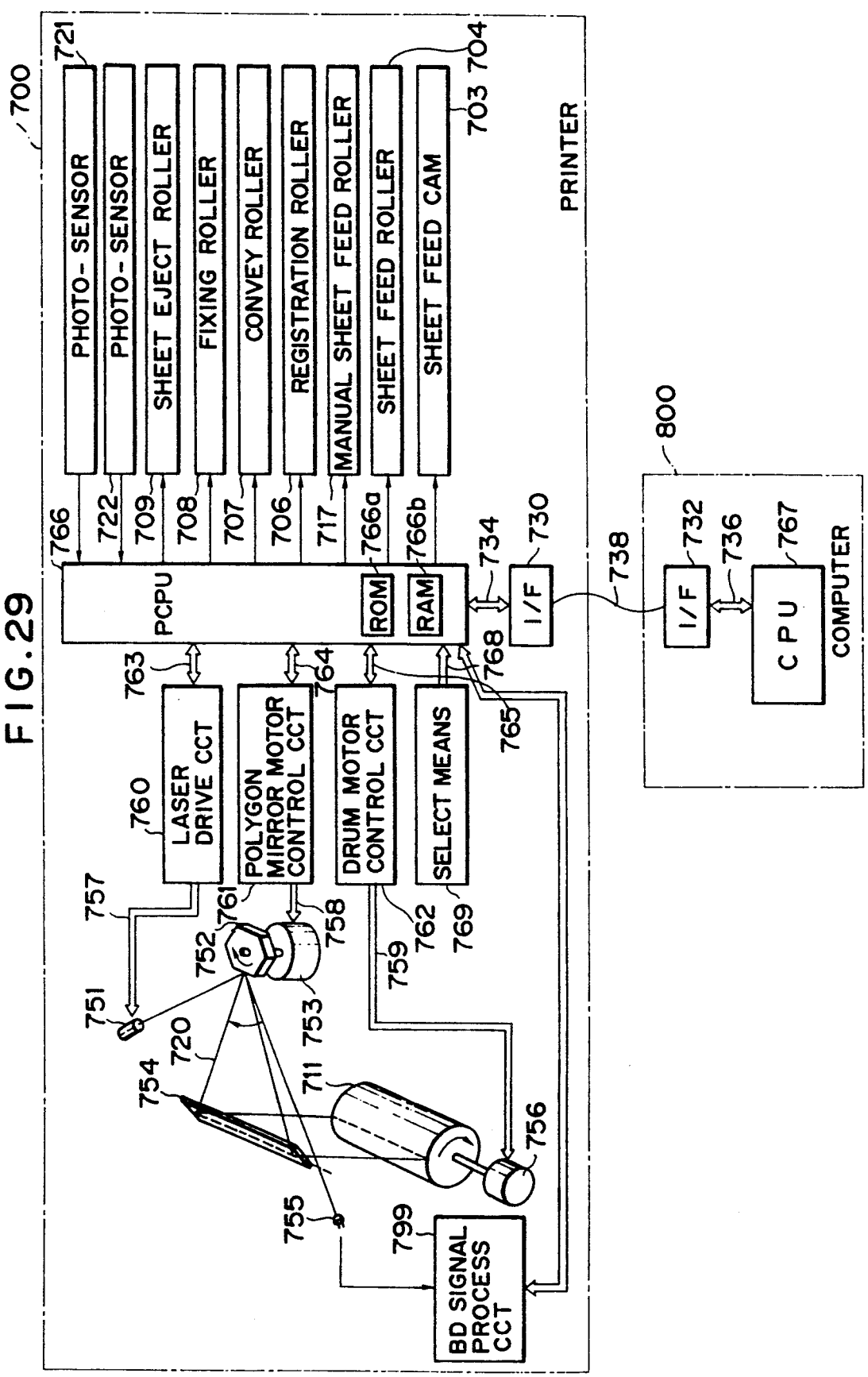
FIG. 29 is a block diagram of a laser beam printer according to an eighth embodiment of the present invention.
Figure 39:
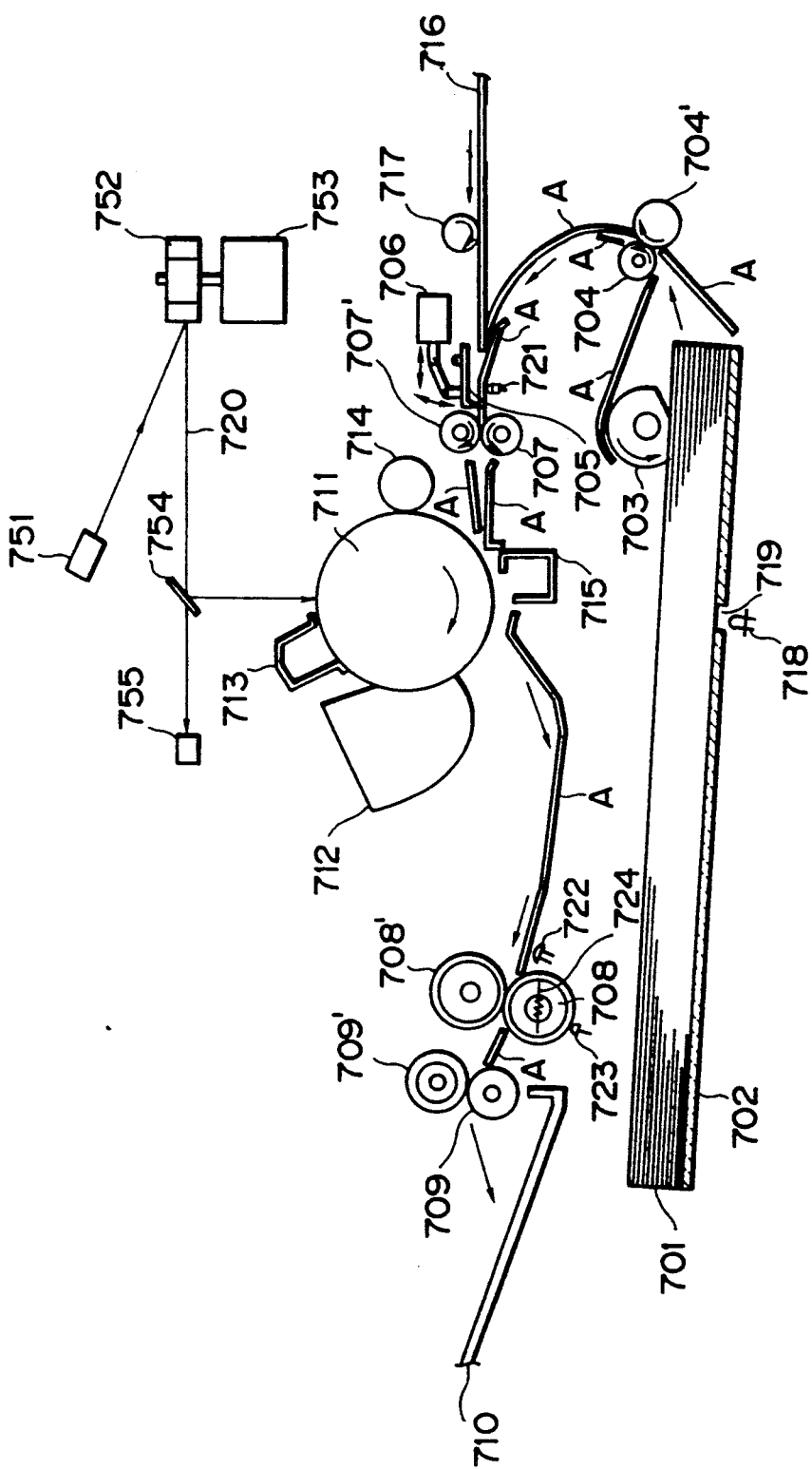
FIG. 39 is a detailed diagram of a conventional laser beam printer.

FIG. 29 is a block diagram of a laser beam printer according to an eighth embodiment of the present invention. A mechanism portion of the eighth embodiment is substantially the same as that in FIG. 39, and the same reference numerals in FIG. 29 denote the same parts as in FIG. 39.

In FIG. 29, a computer (external apparatus) 800 outputs data to a printer 700, and controls a dot density, and the like of the printer 700.

The printer 700 includes a drum motor 756 for rotating a photosensitive drum 711, a laser drive circuit 760 for driving a semiconductor laser 751 through a control line 757 under the control of a PCPU 766 through a data line 763, a polygon mirror motor control circuit 761 for controlling a polygon mirror motor 753 for rotating a rotary polygon mirror 752 through a control line 75B under the control of the PCPU 766 through a data line 764, and a drum motor control circuit 762 for controlling the drum motor 756. The drum motor control circuit 762 controls rotation of the drum motor 756 through a control line 759 under the control of the PCPU 766 through a data line 765.

The drum motor 756 is used as a sheet feed drive source through gears (not shown).

In place of an arrangement wherein an image signal from the computer 800 is input to the laser drive circuit 760 via the data line 763 through the PCPU 766, the image signal may be directly input to the laser drive circuit 760 through an I/O interface 730.

The PCPU (microprocessor) 766 controls the overall printer 700. The PCPU 766 incorporates a ROM memory 766a for storing a control program, a RAM memory 766b for storing various control data, and an I/O port (not shown) for controlling I/O data.

The PCPU 766 controls all the drive systems, e.g., a convey/eject drive system and a system for executing an electrophotographic process through the I/O port. FIG. 29 illustrates only a recording sheet drive system, and connections/control of sensors provided to the drive system and an optical system, and other systems are omitted. However, other systems can be controlled by a known method, as a matter of course.

The computer 800 for controlling the printer 700 includes an I/O interface 732 for performing serial communication and image communication with the printer 700. Note that the computer 800 also includes a CPU 767 for executing various data processing operations.

Figure 40:
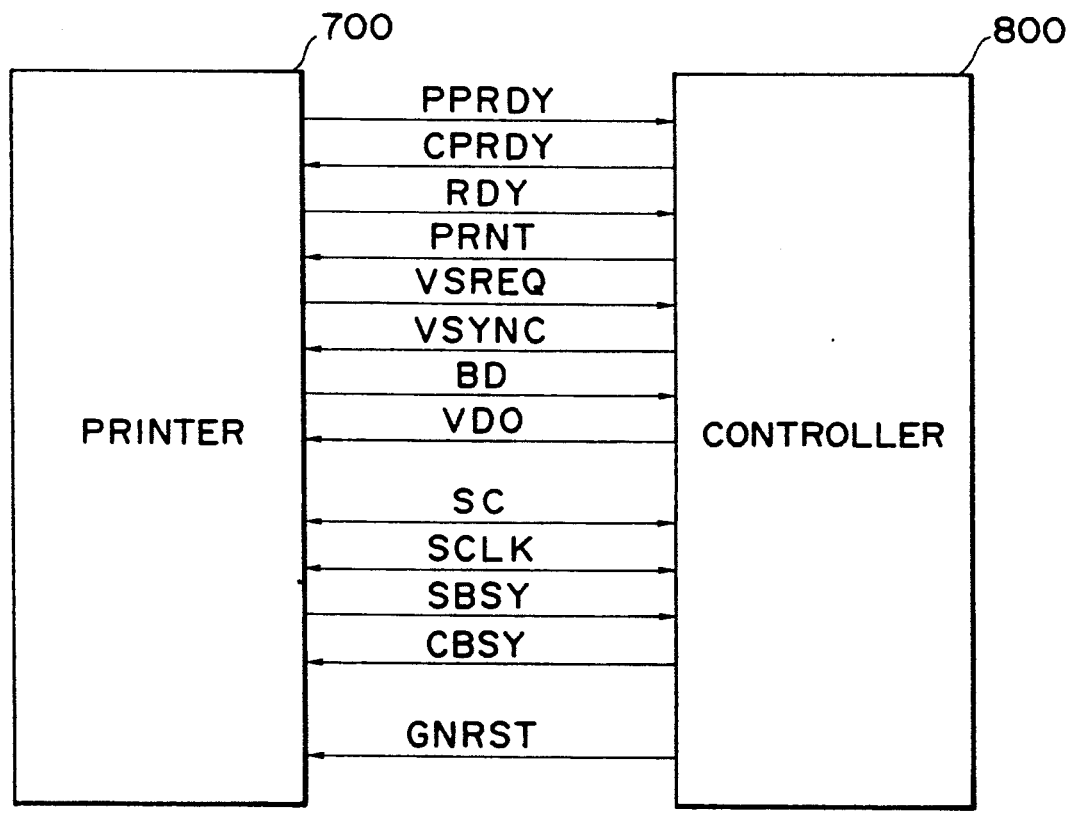
FIG. 40 is a block diagram showing interface signals between a conventional laser beam printer and a controller.
Figure 41:
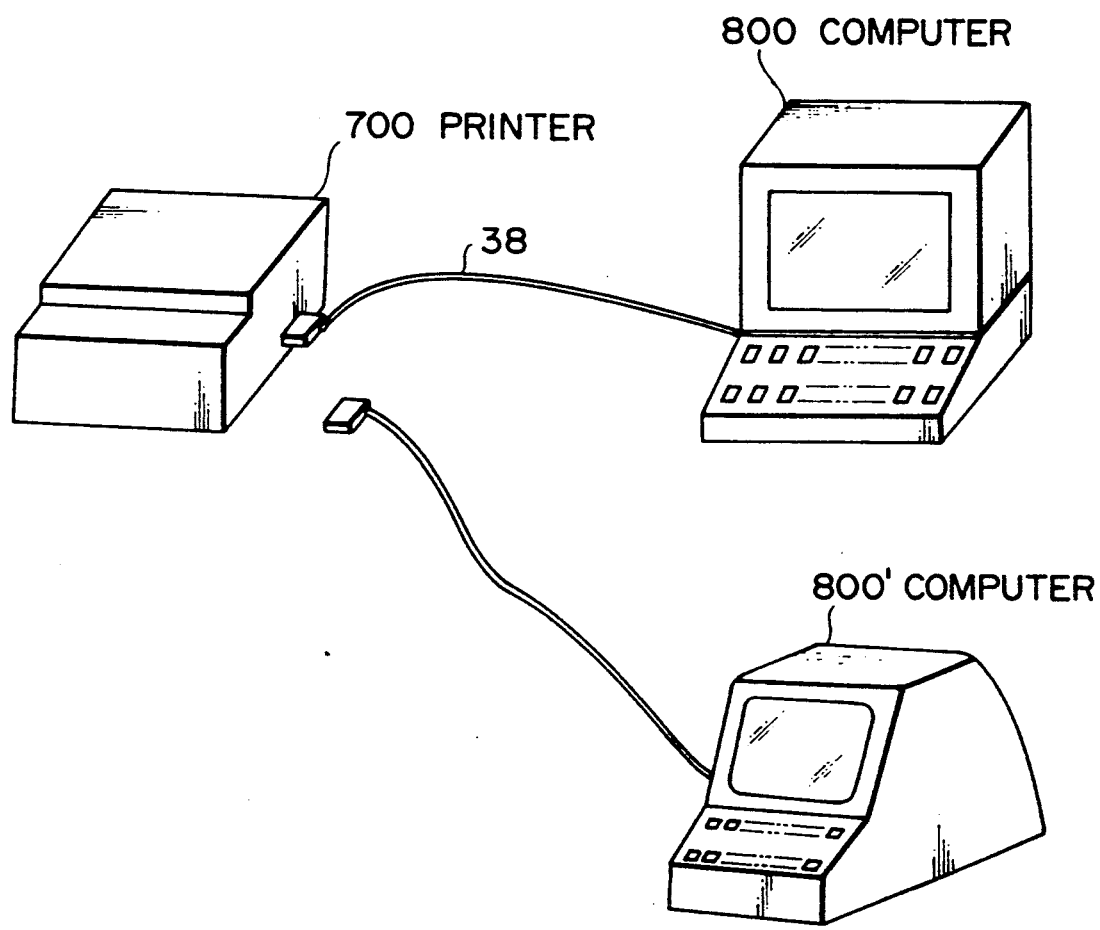
FIG. 41 is a view showing connections between a conventional printer and a computer.

The printer 700 and the computer 800 are connected through their own I/O interfaces 730 and 732, a connection cable 738, and their own I/O buses 734 and 736. I/O signals exchanged through the connection cable 738 are the same as those shown in FIG. 40.

A select means 769 comprises a rotary switch, or the like. The PCPU 766 can load a set value of the select means 769 through a data line 768 as needed. In this embodiment, the select means is used to switch a dot density, and an output dot density of 240 dpi, 300 dpi, 480 dpi, or the like is determined according to the set position of the select means 769.

A BD signal process circuit 799 converts a beam detect signal from a beam detector 755 into a digital signal, and outputs the digital signal.

Figure 30:
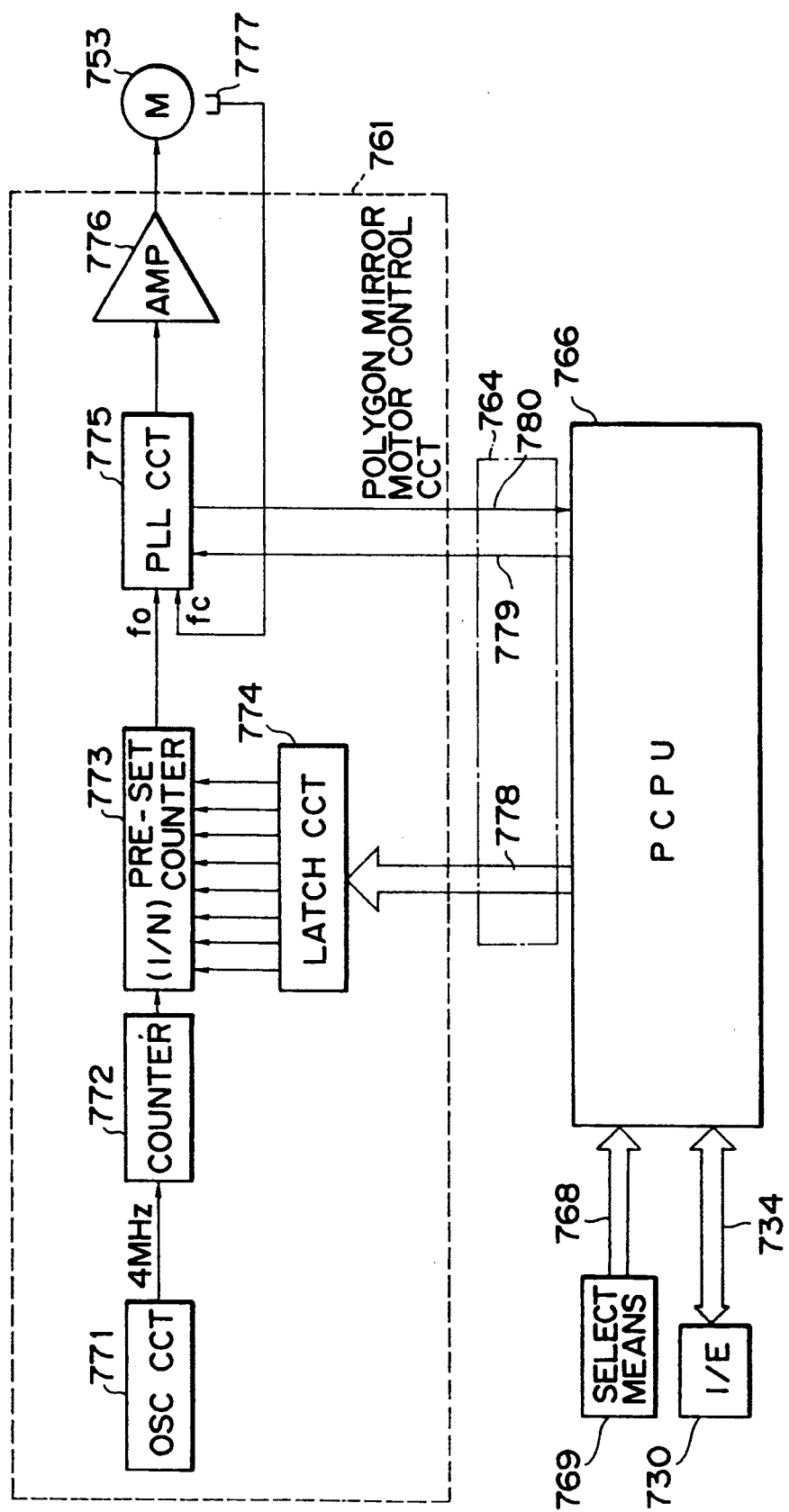
FIG. 30 is a detailed block diagram of a polygon mirror motor control circuit.

FIG. 30 shows in detail the polygon mirror motor control circuit 761.

In FIG. 30, a crystal oscillator circuit 771 generates a 4-MHz clock, and supplies it to a counter 772. The counter 772 decrements the clock from the crystal oscillator circuit 771 to (1/1,000). A pre-set counter 773 decrements the output from the counter 772 to "1/N" in accordance with data "N" set by a latch circuit 774. An output clock fo from the pre-set counter 773 serves as a reference signal for a PLL circuit 775.

More specifically, the clock fo is given by:

$$fo = 4\ MHz \times (1/1,000) \times (1/N)$$

The latch circuit 774 is loaded with an arbitrary value ("1" to "256") sent from the PCPU 766 through a data line 778. The latch circuit 774 is connected to the pre-set counter 773 through 8-bit data lines. The pre-set counter 773 determines a decrement value (1/N) in accordance with the value set in the latch circuit 774.

The PLL circuit 775 detects a difference signal between the reference frequency fo and a signal fc obtained from a rotation pulse signal generator 777 which generates a one-shot pulse per revolution of a polygon mirror motor 753, so that the signal fc is equal to the reference frequency fo. The PLL circuit 775 controls rotation of the polygon mirror motor 753 on the basis of the difference signal. In this case, the PLL circuit starts rotation of the motor upon reception of a motor ON signal 779 from the PCPU 766, and sends back a ready signal to the PCPU 766 when the rotational speed (rotations) of the polygon mirror motor 753 has reached a predetermined rotational speed and is rotated at a constant speed.

FIG. 31 shows the relationship among an output dot density, output clocks of the counters 772, 773, and the rotational speed of the polygon mirror motor 753.

As shown in FIG. 31, a 4-MHz oscillation frequency from the oscillator circuit 771 is frequency-divided in correspondence with an output dot density to change the rotational speed of the polygon mirror motor 753 accordingly. Thus, the scan speed of a laser beam 720 by the rotary polygon mirror 752 is changed, thereby obtaining an arbitrary output dot density.

A pre-set value for the pre-set counter 773 is latched by the latch circuit 774 under the control of the PCPU 766 through the data line 778. The PCPU 766 loads a value set at the select means 769 through the data line 768, and causes the latch circuit 774 to latch a value corresponding to the set value.

When a dot density, e.g., 240 dpi is directly designated in the latch circuit 774 in accordance with an output dot density designating command (to be described later) sent from the computer 800 through the I/O interface 732 and the connection cable 738, a value (N=100) can be set.

The oscillation frequency by a crystal oscillator of the oscillator circuit 771 is selected by calculating backward from the rotational speed of the polygon mirror motor 753 for obtaining a required output dot density. That is, the oscillation frequency is selected to be a least common multiple of the fo values corresponding to output dot densities.

More specifically, when the dot densities shown in FIG. 31 are required, the required rotational speed of the polygon mirror motor 753 and the output frequency fo of the pre-set counter take values shown in FIG. 31, and the least common multiple of these fo values is 13,333.333 Hz.

In this embodiment, an integer multiple (300 times) of this least common multiple is used as the oscillation frequency of the oscillator circuit 771. For this reason, 4 MHz are selected.

In this manner, the scan speed of the optical beam 720 with respect to the surface of the photosensitive drum 711 can be arbitrary selected in accordance with a designating command from the computer 800 or a set value of the select means 769.

In this embodiment, the pre-set counter 773 comprises an 8-bit counter. However, if a 16-bit counter is used, i.e., if the number of bits is increased, the number of select steps of the scan speed can be increased from ($2^8$ =256 steps) for 8 bits to, e.g., ($2^{16}$ =65,536 steps).

With this arrangement, the printer can be operated in correspondence with any output dot density request.

Note that the content of the designating command sent from the computer 800 may designate the value of dpi or may be data itself to be loaded in the pre-set counter.

Figure 32:
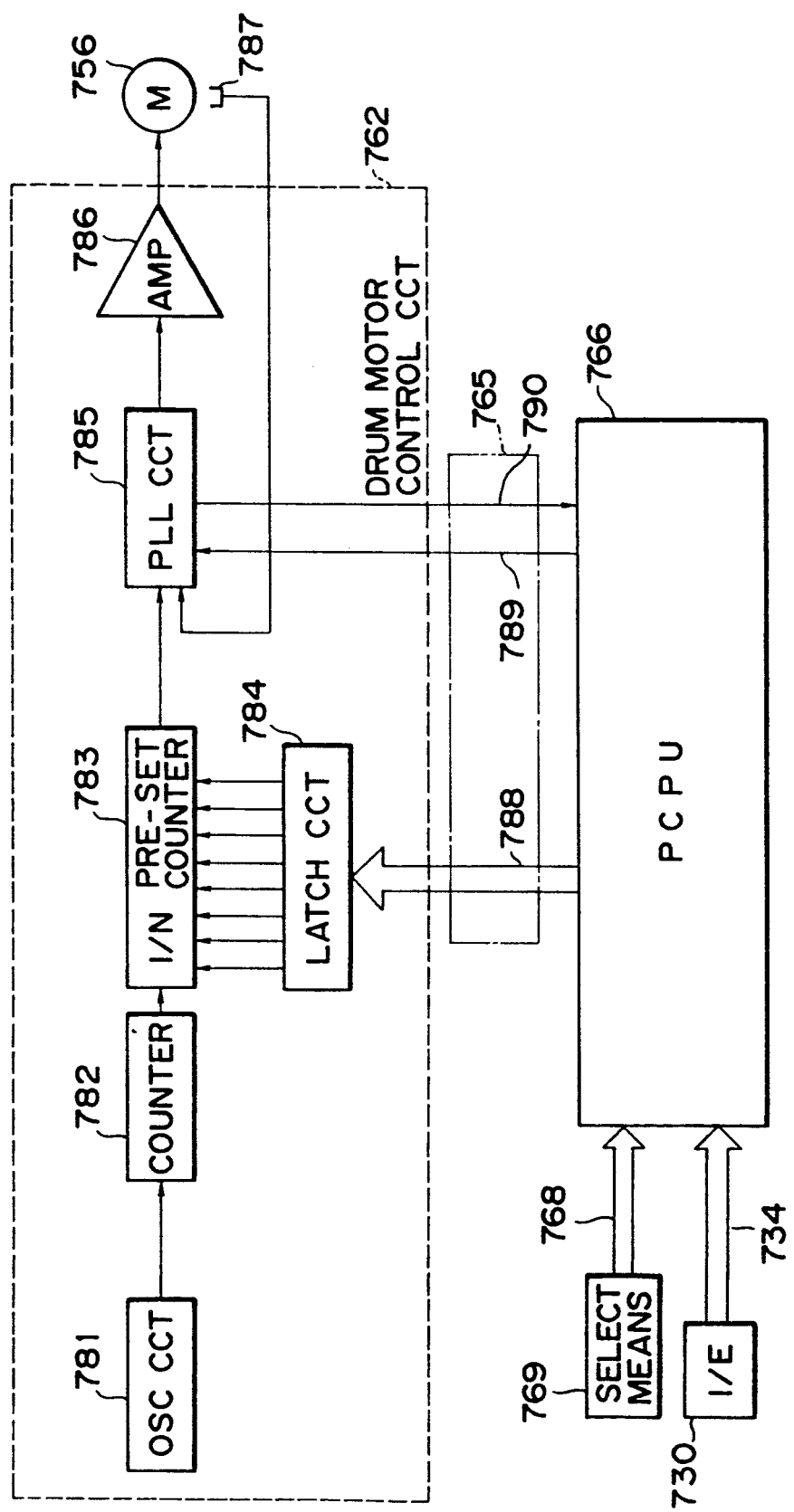
FIG. 32 is a detailed block diagram of a drum motor control circuit.

FIG. 32 shows in detail the drum motor control circuit 762.

As shown in FIG. 32, the drum motor control circuit 762 comprises an oscillator circuit 781, a counter 782, a pre-set counter 783, a latch circuit 784, a PLL circuit 785, and an amplifier 786. The arrangement and roles of these circuits are the same as those of the polygon mirror motor control circuit 761 shown in FIG. 30, and a detailed description thereof will be omitted.

The control circuit 762 also includes a rotation pulse generator 787 for generating a pulse signal corresponding to rotation of the drum motor 756. The PCPU 766 outputs an ON signal 789 of the drum motor 756 to the PLL circuit 785, and also outputs a ready signal 790 which is the same as the ready signal 780 shown in FIG. 30.

In the drum motor control circuit 762, the latch circuit 784 is caused to latch an appropriate value in correspondence with an output dot density designating command from the computer 800 or a set value at the select means 769, so that the feed speed of the drum motor 756 can be controlled to a predetermined speed.

Figure 33:
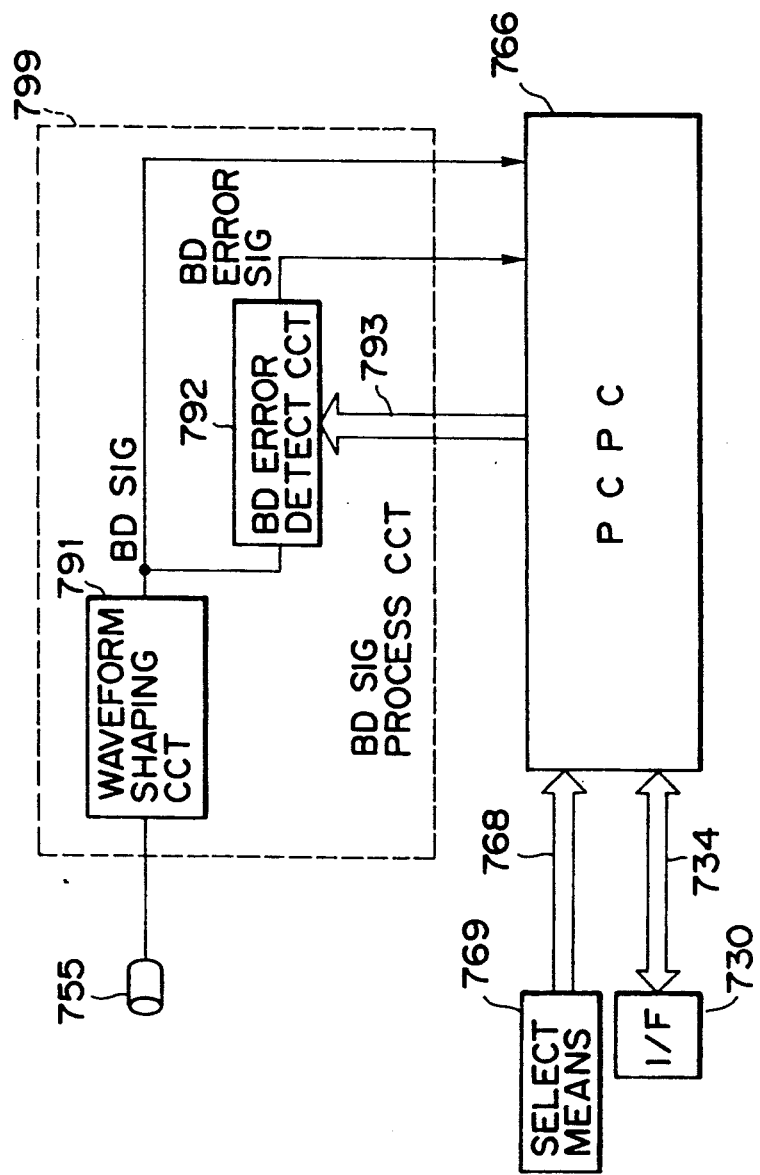
FIG. 33 is a detailed block diagram of a BD signal process circuit.

FIG. 33 shows in detail the BD signal process circuit 799 shown in FIG. 29. A beam detector signal as a detection signal from the beam detector 755 is waveshaped by a waveform shaping circuit 791, and is then output as a BD signal. The BD signal is used for performing synchronization in the main scan direction. The BD signal is also input to a BD error detect circuit 792. The BD error detect circuit 792 monitors whether or not the BD signal is output at a normal timing. If the BD signal is not output at a normal timing, the detect circuit 792 outputs a BD error signal to the PCPU 766.

When an output dot density is changed, the scan speed of the laser beam 720 is changed, and the output timing of the BD signal is also changed. For this purpose, the PCPU 766 supplies data corresponding to the output dot density to the BD error detect circuit 792. The BD error detect circuit 792 switches output timings of an unblanking signal (UNBL) and an error detect sub signal (ERDT) like in the pre-set counter shown in FIGS. 30 and 32 in accordance with the input data.

The unblanking signal (UNBL) is used to cause the laser 751 to emit a laser beam at a timing when the laser beam 720 reaches the beam detector 755 in order to reliably obtain the BD signal. Thus, the unblanking signal is output to cause the laser 751 to forcibly emit a laser beam at a timing when the laser beam 720 scans a portion immediately before the beam detector 755.

The error detect sub signal (ERDT) is a timing signal used for determining whether or not the detection timing of the BD signal falls within a predetermined timing width range which is changed depending on the output dot density.

More specifically, the unblanking signal (UNBL) is output at a timing after the lapse of a predetermined period of time (a period of time slightly shorter than a BD signal generating cycle) from the immediately preceding BD signal. The error detect sub signal (ERDT) is output for a $\pm \Delta t$ time from the immediately preceding BD signal until the next BD signal output cycle in which the next BD signal is expected to be input. The $\Delta t$ time may be a variable corresponding to the output dot density or a fixed value.

Figures 1A, 38:
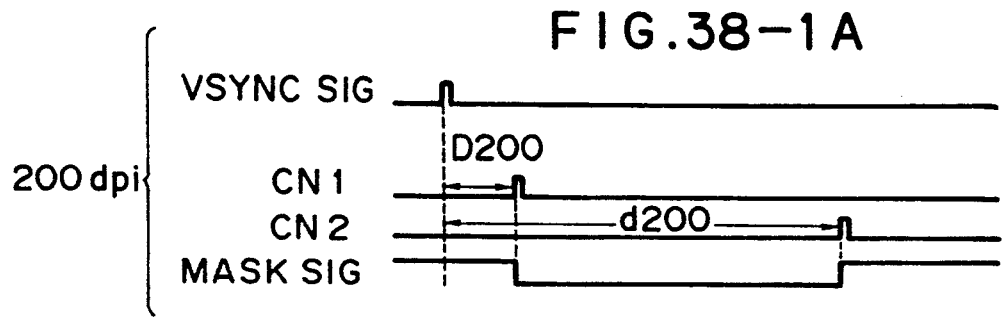

FIGS. 34-1A to 34-E show output timings of the unblanking signal (UNBL) and the error detect sub signal (ERDT) corresponding to the output dot densities.

Figures 1B, 38:
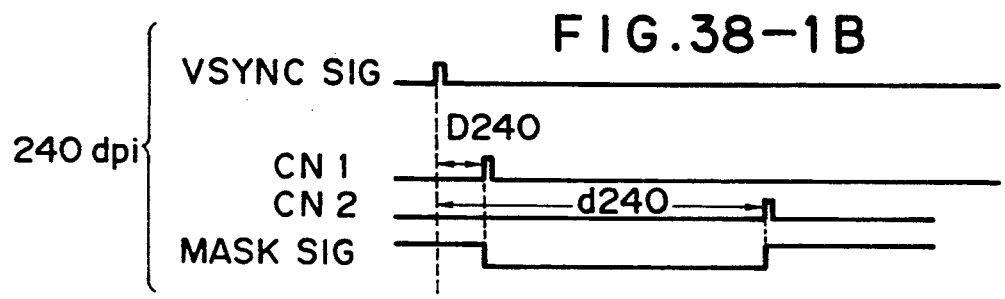
Figures 1C, 38:
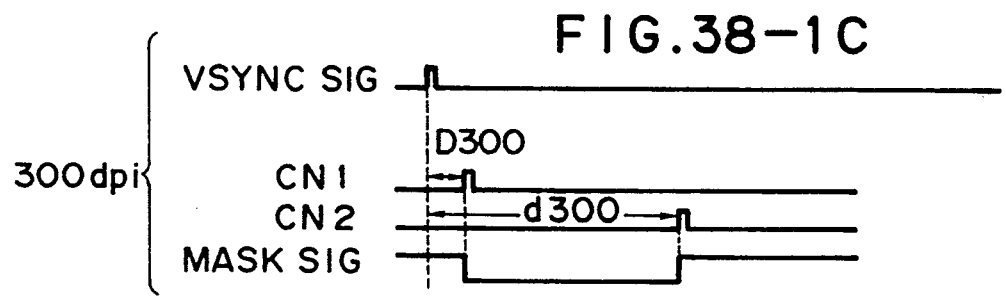
Figures 1D, 38:
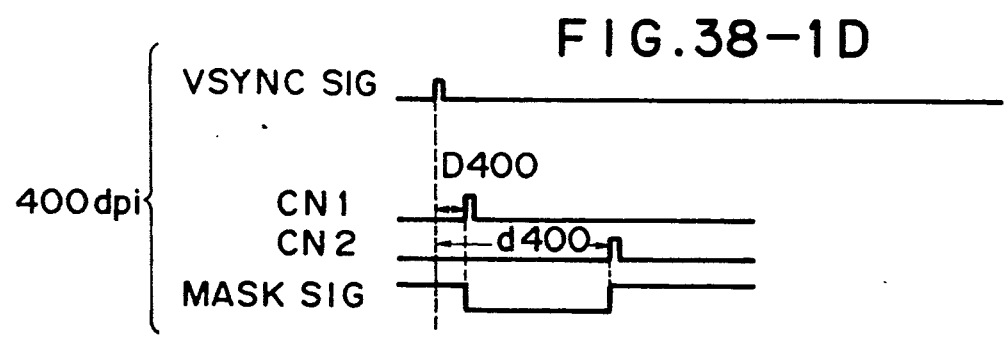

FIG. 34-1A shows the output timings when the dot density is 200 dpi; FIG. 34-1B, 240 dpi; FIG. 34-1C, 300 dpi; FIG. 34-1D, 400 dpi; and FIG. 34-1E, 480, dpi.

When the BD signal is detected at the output timing of the error detect sub signal (ERDT), it is determined that the BD signal output cycle is normal. However, when the BD signal is detected at a timing other than the output timing of the error detect sub signal (ERDT) or no BD signal is detected at all, a BD error is determined, and the BD error signal is output to the PCPU 766.

The output timing of the unblanking signal (UNBL) and the error detection timing of the BD signal can be set to be (arbitrary) optimal values by the PCPU 766 in correspondence with the output dot density. Thus, an accurate beam scan operation is allowed in correspondence with an arbitrary output dot density, and a scan error can be accurately detected.

FIG. 34-2 shows the relationship between a paper sheet A and a printing area B (hatched portion in FIG. 34-2). A leading edge mask area a, a trailing edge mask area b, a left margin mask area c, and a right margin mask area d are set as the peripheral portions of the paper sheet A. In the printer of this embodiment, the printing area B is provided, so that no image is formed on the peripheral portions a, b, c, and d of the paper sheet A.

Figures 1E, 38:
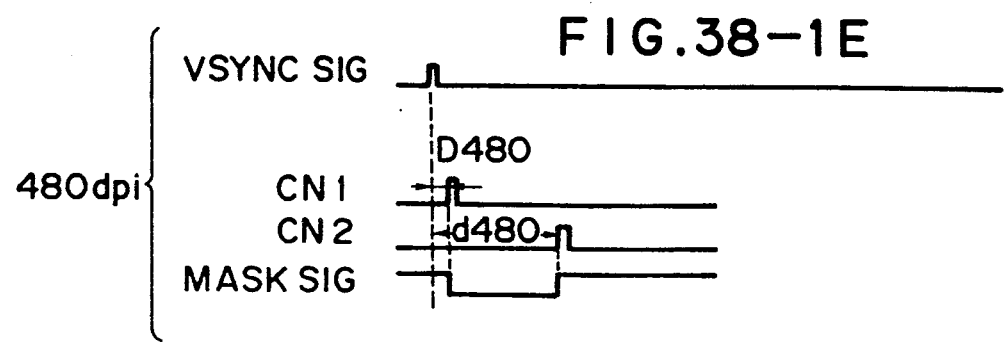
Figures 2, 38:
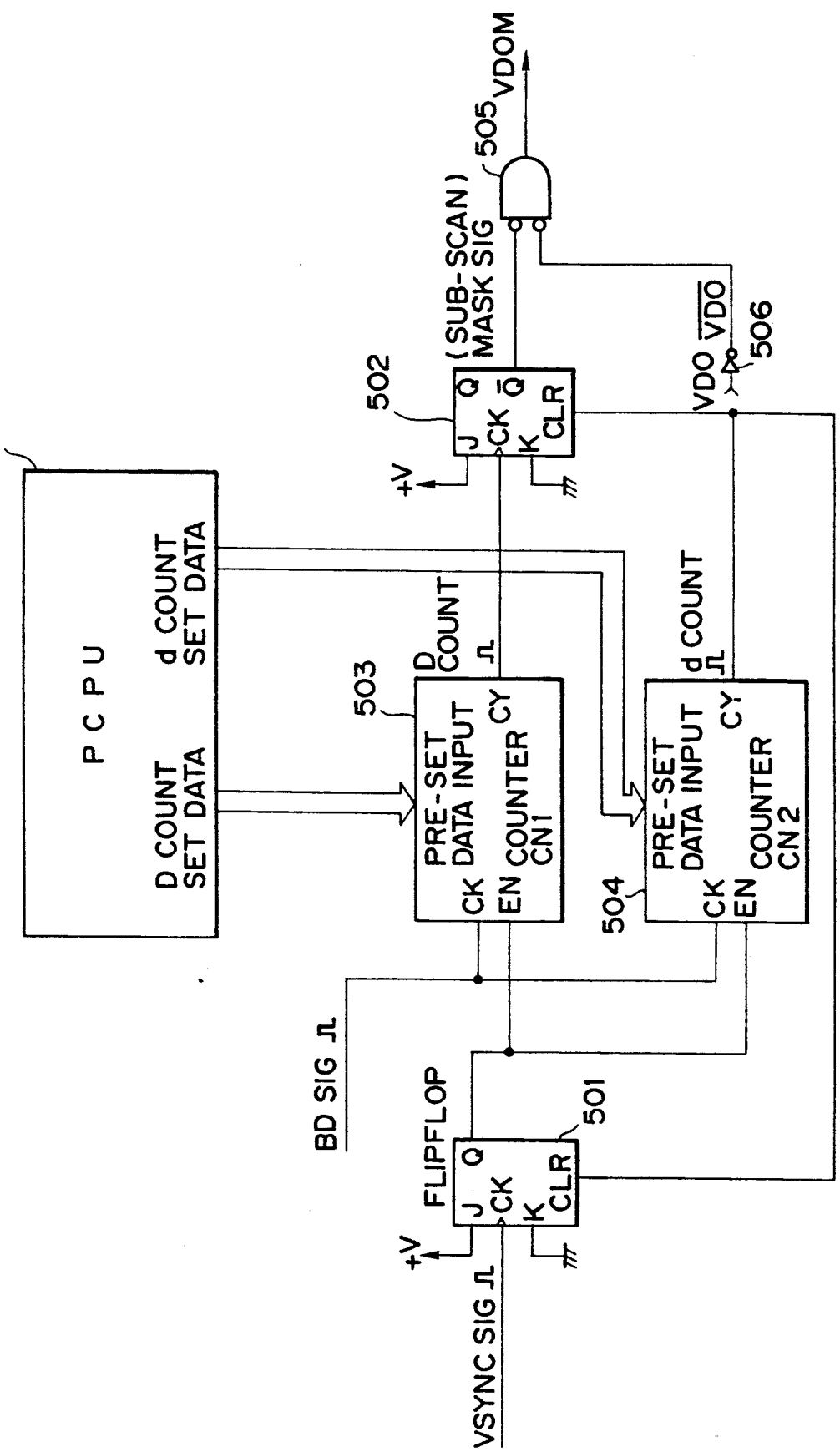

FIG. 34-3 is a circuit diagram of a circuit for generating a mask signal for a VDO signal (image signal) in the main scan direction (beam scan direction). FIGS. 34-1A to 34-1E show a selection control state of a generation timing of the mask signal in accordance with the dot density.

The circuit shown in FIG. 34-3 includes J-K flip-flops 501 and 502, pre-set counters CN1 (503) and CN2 (504), an AND gate 505, an oscillator 400, and an inverter 506 for inverting an image signal VDO to output an inverted image signal $\overline{VDO}$.

When the BD signal is input, the flip-flop 501 sets its Q output at "H" level. Thus, the counters CN1 (503) and CN2 (504) are set in a count enable state.

The counters CN1 and CN2 are pre-settable counters, and values corresponding to the dot densities are pre-set in these counters as their count values. For example, when the dot density is 300 dpi, a count value $D_{300}$ is pre-set in the counter CN1, and a count value $d_{300}$ is pre-set in the counter CN2. The counters CN1 and CN2 receive a clock output from the oscillator 400, and count the pre-set count values. Thereafter, the counters CN1 and CN2 output pulses to their CY terminals as carry outputs. Thus, the $\overline{Q}$ output of the flip-flop 502, i.e., the mask signal (MASK signal) in the main scan direction is controlled as shown in FIGS. 34-1A to 34-1E. The MASK signal is input to the AND gate 505 together with the inverted image signal $\overline{VDO}$. The AND gate 505 outputs a masked image signal VDOM. In this manner, the MASK signal is a signal for forcibly inhibiting inputting of the image signal VDO to the laser drive circuit 760. When the MASK signal is kept at HIGH level, the laser emits no light even if the image signal is at HIGH level. The generation timing of the MASK signal is switched in accordance with the dot density, so that a desired area can be accurately masked.

FIG. 34-4 shows another mask control circuit, and the same reference numerals in FIG. 34-4 denote the same parts as in FIG. 34-3. In FIG. 34-4, the counters CN1 and CN2 are pre-set to fixed count values D and d regardless of the dot density.

Crystal oscillators 400, 401, and 402 have different frequency clocks X1, X2, and X3 corresponding to the numbers of lines (dot densities) of 200 dpi, 240 dpi, and 300 dpi. One of the outputs X1, X2, and X3 is selected by a selector 403 under the control of the PCPU 766, and the selected output is supplied to the counters CN1 and CN2. More specifically, the PCPU 766 selects one of the crystal oscillators 400, 401, and 402 in accordance with the designated dot density.

The frequencies of the crystal oscillators 400, 401, and 402 are determined to obtain optimal image mask areas at corresponding dot densities. In this manner, in the circuit shown in FIG. 34-4, the frequency of a clock supplied to the counters CN1 and CN2 is selected in accordance with the designated dot density, so that a desired area can be accurately masked as in FIG. 34-3. Note that the number of crystal oscillators may be increased or a frequency divider may be used to cope with more designated dot densities.

FIG. 38-2 is a circuit diagram of a circuit for generating a mask signal for an image signal (VDO signal) in a sub-scan direction (drum rotation direction). FIGS. 38-1A to 38-1E show a selection control state of a generation timing of the mask signal in accordance with the dot density. Note that in the circuit shown in FIG. 38-2, the same reference numerals denote the same parts as in FIG. 34-3, and a detailed description thereof will be omitted. The operation of the circuit shown in FIG. 38-2 is basically the same as that of FIG. 34-3. However, the counters CN1 and CN2 receive the BD signal in place of a clock from the oscillator 400, and the flip-flop 501 receives a VSYNC signal in place of the BD signal. Thus, the masked signal VDOM in the sub-scan direction can be obtained. FIGS. 38-1A to 38-1E show a state wherein the count values of the counters CN1 and CN2 are switched in accordance with the designated dot densities.

In practice, the laser is driven based on an AND product of the MASK signal in the main scan direction shown in FIG. 34-3 (FIG. 34-4), the MASK signal in the sub-scan direction shown in FIG. 38-2, and the inverted image signal ($\overline{VDO}$ signal).

The positions of mask areas in the main scan and sub-scan directions corresponding to a paper sheet may remain the same when a dot density is switched. However, within an area where a toner can be prevented from becoming attached to a portion other than the paper sheet, the mask areas may be varied more or less in accordance with the dot density.

FIG. 35 shows in detail the laser drive circuit 760.

The laser drive circuit 760 includes a latch circuit 794, NAND gates 795a to 795e, driver transistors 796a to 796e, and resistors 797a to 797e having different resistances.

The laser drive circuit 760 turns on/off the semiconductor laser 751 in correspondence with an image signal sent from the computer 800. As described above, when the image signal VDO is to be masked, the image signal VDOM obtained through the circuits shown in FIG. 34-3 (FIG. 34-4) and FIG. 38-2 is applied to the laser drive circuit 760.

In this embodiment, a drive current value for driving the semiconductor laser 751 can be changed in accordance with emission intensity designating data (laser emission intensity change command) or the dot density select command sent from the PCPU 766 through the data line 763. More specifically, one of the outputs of the latch circuit 794 is set in correspondence with the emission intensity designating data or dot density select command supplied from the computer 800, and the NAND gate connected to the set output is enabled, thus making an output corresponding to the image signal.

The selected laser drive transistor 796 is turned on/off in accordance with an image signal, and a current value corresponding to the resistance of the resistor 797 connected to the collector of this transistor 796 is supplied to the semiconductor laser 751. The semiconductor laser 751 emits a laser beam having an intensity corresponding to the magnitude of the current supplied thereto.

With the above arrangement, when the laser emission intensity change command is received from the computer 800 through the I/O bus 734, the output of the latch circuit 794 corresponding to the transistor 796 corresponding to the designated emission intensity is set, and the semiconductor laser 751 emits light at the designated emission intensity. In this manner, the computer 800 can arbitrarily change the laser emission intensity. For example, in a graphic print output mode, the laser emission intensity is lowered to perform a print output with fine dots. In a character print output mode, the laser emission intensity is increased to perform a print output with bold dots.

Operation of Eighth Embodiment

Figure 36:
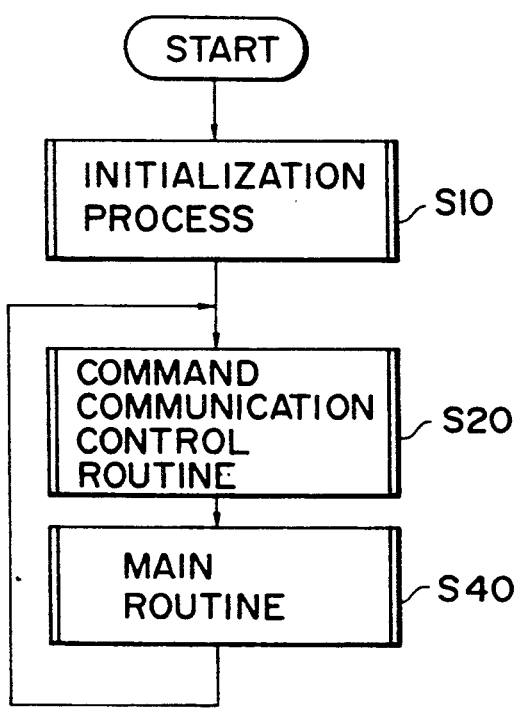
FIGS. 36 and 37 are operation flow charts of the eighth embodiment.

The operation control of the eighth embodiment with the above arrangement will be described below with reference to the flow charts shown in FIGS. 36 and 37.

When the power switch of the laser beam printer of the eighth embodiment is turned on, step S10 is executed to perform initialization processing. In this processing, the content of the RAM 766b is initialized, the rotary polygon mirror 752 is rotated, and the like. In step S20, a command communication control routine for executing communication processing of a printer control command with the computer 800 and the like is executed. When the command is received, analysis & return processing of the received command, processing corresponding to the received command, and the like are executed. Thereafter, the main routine in step S40 is executed. In the main routine, known printer control operations are executed.

Figure 37:
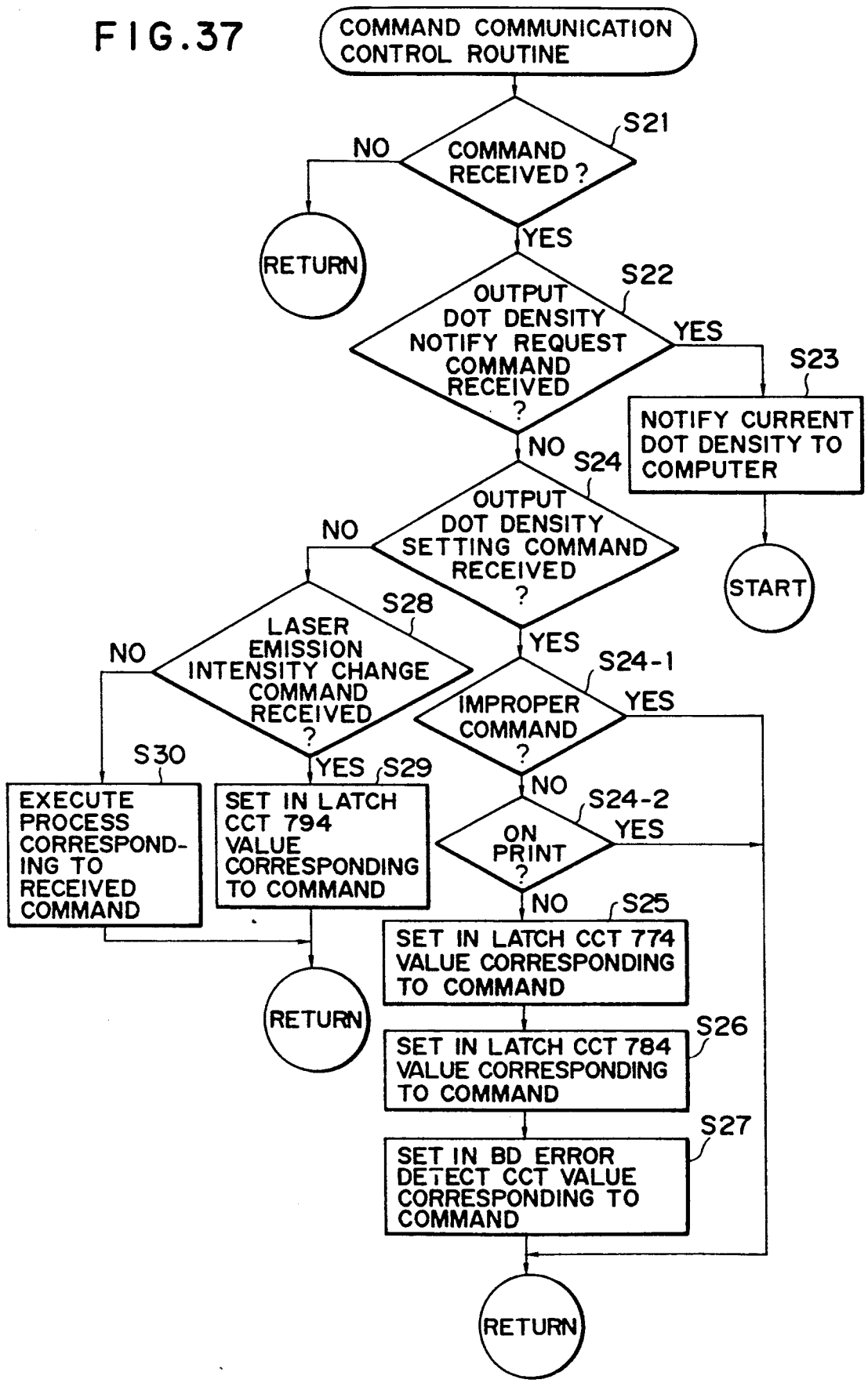

FIG. 37 shows in detail the command communication control routine shown in step S20.

It is checked in step S21 if the printer control command from the computer 800 is input. If NO in step S21, the flow returns without any processing. If YES in step S21, it is checked in step S22 if an output dot density notify request command is received. If YES in step S22, the flow advances to step S23, and the output dot density currently set in the printer 700 is notified to the computer 800. Thus, the processing for the received command is ended, and the flow returns. Note that the set output dot density is held in the RAM 766b.

If it is determined in step S22 that the received command is not an output dot density notify request command, the flow advances to step S24 to check if the received command is an output dot density setting command for setting (re-setting) a new output dot density. If YES in step S24, the flow advances to step S24-1 to check if the designated dot density can be set in the printer. If it is determined in step S24-1 that the designated density is an improper one, the flow returns without any processing. If the designated density is a proper one, the flow advances to step S24-2 to check if the printer is an on-print state. If YES in step S24-2, the flow returns without any processing. If NO in step S24-2, the flow advances to step S25, and the PCPU 766 sets a value corresponding to the designated output density included in the received setting command in the latch circuit 774 of the polygon mirror motor control circuit 761. In step S26, the PCPU similarly sets the value corresponding to the designated output density in the latch circuit 784 of the drum motor control circuit 762. In step S27, the PCPU also sets a value corresponding to the output dot density in the BD error detect circuit 792. Thus, the rotary polygon mirror 752, the photosensitive drum 711, and the BD signal process circuit 799 can perform operations matching with the designated output dot density. Thus, the processing ends, and the flow returns.

In step S24-2, the on-print state means that the laser beam is exposing the photosensitive drum. However, the on-print state need not always be an exposure state but may be a period wherein a paper sheet is being conveyed in the printer or may be a period wherein the printer drives the photosensitive drum or the convey motor.

If it is determined in step S24 that the printer control command received from the computer 800 is not the output dot density setting command, the flow advances to step S28 to check if the received command is a laser emission intensity change command. If YES in step S28, the output corresponding to the designated emission intensity is set in the latch circuit 794 of the laser drive circuit 760. Thereafter, the semiconductor laser 751 emits light at an emission intensity corresponding to the selected output of the latch circuit 794 in synchronism with an image signal.

If it is determined in step S28 that the received command is not the laser emission intensity change command, the flow advances to step S30, and processing corresponding to the received command is executed. Upon completion of the processing, the flow returns.

When the dot density which cannot be set in the printer is designated or when the dot density is designated to be changed during printing, the printer of the eighth embodiment invalidates these designations (requests). Therefore, an erroneous operation or print error can be prevented.

The present invention is not limited to the above embodiments, and various other changes and modifications may be made within the scope of the appended claims.

What is claimed is:

1. A recording apparatus comprising:
   input means for inputting image data output from an external apparatus;
   gradation process means for performing gradation processing of the image data input from said input means; and
   setting means for setting a resolution of an image to be recorded, on the basis of a command output from said external apparatus,
   wherein said said setting means can manually set the resolution of the image to be recorded.

2. An apparatus according to claim 1, further comprising means for notifying the manually set resolution to said external apparatus.

3. An apparatus according to claim 1, further comprising selecting means for selecting the setting of the resolution of the image to be recorded by a manual operation or by the command output from said external apparatus.

4. An apparatus according to claim 1, wherein said gradation process means comprises density correction means for performing density correction of the input image data in accordance with the resolution set by said setting means.

5. An apparatus according to claim 4, wherein said density correction means has a plurality of density conversion tables, and selects a density conversion table to be used in accordance with the resolution set by said setting means.

6. An apparatus according to claim 1, further comprising pulse-width modulating means for comparing the density of the image data with a level of the predetermined pattern signal, and for outputting a pulse-width modulated signal having a pulse-width corresponding to a level thereof, wherein said pulse-width modulating means employs a predetermined pattern signal having a frequency according to the resolution set by said setting means.

7. An apparatus according to claim 6, wherein said predetermined signal is a triangular wave signal.

8. A recording apparatus comprising:
   recording means for performing a recording operation on a recording medium on the basis of input recording data, said recording means being capable of performing the recording operation at one of plural recording densities;
   designating means for designating a recording resolution at which said recording means performs the recording operation;
   discriminating means for discriminating whether or not said recording means is capable of performing the recording operation at the recording resolution designated by said designating means; and
   controlling means for controlling a recording resolution of said recording means on the basis of a discrimination result of said discriminating means,
   wherein said control means causes said recording means to perform the recording operation at the designated recording resolution when said discriminating means discriminates that the recording operation is possible at the designated resolution and wherein said control means invalidates the designation by said designating means when said discriminating means discriminates that the recording operation is not possible at the designated resolution.

9. An apparatus according claim 8, wherein said apparatus changes a masking timing in accordance with the recording resolution designated by the designating means.

10. An apparatus according to claim 9, wherein said recording means includes a beam generating means for generating a beam modulated in accordance with the recording data and beam scanning means for scanning the modulated beam, and wherein said masking timing corresponds to a period of beam scanning of a non-image forming area and is a forced masking of the beam.

11. An apparatus according to claim 8, wherein said controlling means inhibits the change of the resolution of said recording means during a recording operation.

12. An apparatus according to claim 8, wherein said recording means includes beam generating means for generating a beam modulated in accordance with the recording data and beam scanning means for scanning the modulated beam, and wherein said apparatus changes a scanning speed of the beam scanning means in accordance with the recording resolution designated by the designating means.

13. An apparatus according to claim 8, wherein said designating means can manually designate the recording resolution.

14. An apparatus according to claim 8, wherein said designating means designates a recording resolution on the basis of a command sent from the external apparatus.

15. An apparatus according to claim 8, wherein said recording means includes beam generating means for generating a beam modulated in accordance with the recording data and an intensity of the beam is controlled on the basis of the recording resolution designated by the designating means.

16. A recording apparatus, comprising:
a recording unit structured to perform an electrophotographic recording operation on the basis of recording data, said recording unit being capable of recording at one of plural recording resolutions;
a designator structured to designate a recording resolution as a designated recording resolution at which said recording unit performs the recording operation; and
a controller structured to control the recording operation of said recording unit;
wherein said recording unit includes a developing unit for developing an electrostatic latent image formed on a recording medium, and
said controller controls a developing bias voltage of the developing unit in accordance with the designated recording resolution.

17. A recording apparatus according to claim 16,
wherein said recording unit includes a beam generator for generating a beam modulated on the basis of the recording data, and
said controller controls a driving current to be supplied to said beam generator, in accordance with the designated recording resolution.

18. A recording apparatus according to claim 17, wherein said recording unit changes a speed of modulation of the beam based on the recording data and a speed of movement of the recording medium in accordance with the designated recording resolution so as to perform the recording operation at the designated recording resolution.

19. A recording apparatus according to claim 17, further comprising a beam scanner for scanning the beam generated by said beam generator, wherein said recording unit changes a speed of modulation of the beam based on the recording data and a speed of scanning by said beam scanner in accordance with the designated recording resolution, so as to perform the recording operation at the designated recording resolution.

20. A recording apparatus, comprising:
a recording unit structured to perform an electrophotographic recording operation on the basis of recording data, said recording unit being capable of recording at one of plural recording resolutions;
a designator structured to designate a recording resolution as a designated recording resolution at which said recording unit performs the recording operation; and
a controller structured to control the recording operation of said recording unit;
wherein said recording unit includes a primary charging unit for uniformly charging a recording medium, and said controller controls a voltage to be applied to said primary charging unit, in accordance with the designated recording resolution.

21. A recording apparatus according to claim 20,
wherein said recording unit includes a beam generator for generating a beam modulated on the basis of the recording data, and
said controller controls a driving current to be supplied to said beam generator, in accordance with the designated recording resolution.

22. A recording apparatus according to claim 21, wherein said recording unit changes a speed of modulation of the beam based on the recording data and a speed of movement of the recording medium in accordance with the designated recording resolution so as to perform the recording operation at the designated recording resolution.

23. A recording apparatus according to claim 21, further comprising a beam scanner for scanning the beam generated by said beam generator, wherein said recording unit changes a speed of modulation of the beam based on the recording data and a speed of scanning by said beam scanner in accordance with the designated recording resolution, so as to perform the recording operation at the designated recording resolution.

24. A recording apparatus according to claim 23, wherein said processing unit changes a masking timing in accordance with the designation recording resolution to perform a masking operation.

25. A recording apparatus according to claim 24, wherein said recording unit includes a beam generator for generating a beam modulated in accordance with the image data and a beam scanning unit for scanning the modulated beam, and
wherein said masking timing corresponds to a period of beam scanning of a non-image forming area and is a forced masking period of the beam.

26. A recording apparatus, comprising:
a recording unit structured to perform an electrophotographic recording operation on the basis of recording data, said recording unit being capable of recording at one of plural recording resolutions;
a designator structured to designate a recording resolution as a designated recording resolution at which said recording unit performs the recording operation; and
a controller structured to control the recording operation of said recording unit;

wherein said recording unit includes a transfer unit for transferring a toner image formed on a recording medium onto a transfer material, and said controller controls a voltage to be applied to said transfer unit in accordance with said designated recording resolution.

27. A recording apparatus according to claim 26, wherein said recording unit includes a beam generator for generating a beam modulated on the basis of the recording data, and said controller controls a driving current to be supplied to said beam generator, in accordance with the designated recording resolution.

28. A recording apparatus according to claim 27, wherein said recording unit changes a speed of modulation of the beam based on the recording data and a speed of movement of the recording medium in accordance with the designated recording resolution, so as to perform the recording operation at the designated recording resolution.

29. A recording apparatus according to claim 27, further comprising a beam scanner for scanning the beam generated by said beam generator, wherein said recording unit changes a speed of modulation of the beam based on the recording data and a speed of scanning by said beam scanner in accordance with the designated recording resolution, so as to perform the recording operation at the designated recording resolution.

30. A recording apparatus, comprising:
a recording unit structured to perform an electrophotographic recording operation on the basis of recording data, said recording unit being capable of recording at one of plural recording resolutions;
a designator structured to designate a recording resolutions as a designated recording resolutions at which said recording unit performs the recording operation; and
a controller structured to control the recording operation of said recording unit;
wherein said recording unit includes a fixing unit for thermally fixing a toner image formed on a transfer material, and said controller controls a temperature of said fixing unit in accordance with the designated recording resolution.

31. A recording apparatus according to claim 30, wherein said recording unit includes a beam generator for generating a beam modulated on the basis of the recording data, and a beam scanner for scanning the modulated beam on a recording medium, wherein said recording unit changes a speed of modulation of the beam based on the recording data and a speed of movement of the recording medium in accordance with the designated recording resolution, so as to perform the recording operation at the designated recording resolution.

32. A recording apparatus according to claim 30, wherein said recording unit includes a beam generator for generating a beam modulated on the basis of the recording data, and a beam scanner for scanning the modulated beam on a recording medium, and wherein said recording unit changes a speed of modulation of the beam based on the recording data and a speed of scanning by said beam scanner in accordance with the designated recording resolution, so as to perform the recording operation at the designated recording resolution.

33. A recording apparatus, comprising:
a processing unit structured to process input data to generate image data;

a recording unit structured to perform a recording operation on a recording medium on the basis of the image data, said recording unit including a beam generator for generating a beam modulated on the basis of the image data, and a beam scanner for scanning the modulated beam on the recording medium; and a designator structured to designate a recording resolution at which said recording unit performs the recording operation;

wherein said processing unit performs a different process on input data in accordance with the recording resolution designated by said designator, to output the processed data as the image data, and wherein said recording unit changes a speed of scanning by said beam scanner in accordance with the designated recording resolution, so as to perform the recording operation at the designated recording resolution.

34. A recording apparatus according to claim 33, wherein said processing unit comprises a gradation processing unit for entering multi-level image data as the input data and for performing a different gradation process on inputted multi-level image data in accordance with the designation recording resolution designated by said designator.

35. A recording apparatus according to claim 34, wherein said gradation processing unit enters multi-value data as the input data to perform a binarizing operation, said gradation processing unit performing the binarizing operation by selectively using one of plural threshold values or one of plural sets of threshold values in accordance with the designation recording resolution designated by said designator.

36. A recording apparatus according to claim 35, wherein said gradation processing unit performs a binarizing operation by selectively using one of plural threshold matrices in accordance with the designation recording resolution.

37. An apparatus according to claim 36, wherein each of said plural threshold matrices has a matrix size according to the recording resolution corresponding thereto.

38. An apparatus according to claim 36, further comprising means for designating the number of lines, wherein said plural threshold matrices have respective different matrix sizes, and said apparatus uses the threshold matrices having matrix size according to the number of lines designated by said number-of-lines designating means and the designated resolution.

39. An apparatus according to claim 33, wherein said apparatus inhibits changing the recording resolution during a recording operation.

40. An apparatus according to claim 33, wherein said beam generator is capable of controlling an amount of the light emission in accordance with the designated recording resolution.

41. An image processing apparatus for outputting an image signal to a recording means comprising:
data processing means for processing input data from an external data source to generate the image signal;
image data output means for outputting the image signal generated by said data processing means to said recording means; and
designating means for designating one of plural recording resolutions so as to cause said recording means to perform the recording operation at the designated recording resolution;

wherein said data processing means performs a different process on input data in accordance with the designated recording resolution, and wherein said output means changes an image clock of the image signal to be outputted, in accordance with the designated recording resolution.

42. An image processing apparatus according to claim 41, wherein said designating means designates a recording resolution on the basis of a command from the external data source.

43. A recording apparatus comprising according to claim 41, wherein said processing means comprises a gradation processing unit for entering multi-level image data as the input data and for performing a different gradation process on inputted multi-level image data in accordance with the designation recording resolution designated by said designating means.

44. A recording apparatus according to claim 43, wherein said gradation processing unit enters multi-value data as the input data to perform a binarizing operation, said gradation processing unit performing the binarizing operation by selectively using one of plural threshold values or one of plural sets of threshold values in accordance with the designation recording resolution designated by said designating means.

45. A recording apparatus according to claim 44, wherein said gradation processing unit performs a binarizing operation by selectively using one of plural threshold matrices in accordance with the designation recording resolution.

46. An apparatus according to claim 45, wherein each of said plural threshold matrices has a matrix size according to the recording resolution corresponding thereto.

47. An apparatus according to claim 45, further comprising means for designating the number of lines, wherein said plural threshold matrices have respective different matrix sizes, and said apparatus uses the threshold matrices having matrix size according to the number of lines designated by said number-of-lines designating means and the designated resolution.

48. A recording apparatus according to claim 41, wherein said processing unit changes a masking timing in accordance with the designation reporting resolution to perform a masking operation.

49. A recording apparatus according to claim 48, wherein said recording unit includes a beam generator for generating a beam modulated in accordance with the image data and a beam scanning unit for scanning the modulated beam, and wherein said masking timing corresponds to a period of beam scanning of a non-image forming area and is a forced masking period of the beam.

50. An apparatus according to claim 41, wherein said apparatus inhibits changing the recording resolution during a recording operation.

51. An apparatus according to claim 41, wherein said beam generator is capable of controlling an amount of the light emission in accordance with the designated recording resolution.

52. A recording apparatus comprising:

recording means for performing an electrophotographic recording operation on the basis of recording data, said recording means being capable of performing the recording operation at one of plural recording resolutions;

designating means for designating a recording resolution at which said recording means performs the recording operation; and control means for controlling the recording operation of said recording means;

wherein said recording means includes detection means for detecting a surface potential on a photosensitive member, and said control means controls the surface potential in accordance with an output of said detection means and the designated recording resolution.

53. An apparatus according to claim 52, wherein said recording means includes a beam generating means for generating a beam modulated on the basis of the recording data, and a beam scanner for scanning the modulated beam on a recording unit; and wherein said recording unit changes a speed of modulating of the beam based on the recording data and a speed of movement of the recording medium in accordance with the designated recording resolution, so as to perform the recording operation at the designated recording resolution.

54. An apparatus according to claim 52, wherein said recording means includes a beam generating means for generating a beam modulated on the basis of the recording data and a beam scanner for scanning the modulated beam on a recording medium, wherein said recording unit changes a speed of modulation of the beam based on the recording data and a speed of scanning by said beam scanner in accordance with the designated recording resolution, so as to perform the recording operation at the designated recording resolution.

55. An apparatus according to claim 52, wherein said recording unit includes a beam generating means for generating a beam modulated on the basis of the recording data and an amount of the light emission of the beam is changed in accordance with the designated resolution.

56. A recording apparatus comprising:

input means for inputting image data output from an external apparatus;

gradation process means for performing gradation processing of the image data input from said input means; and setting means for setting a resolution of an image to be recorded;

wherein said apparatus is capable of sending to the external apparatus data relating to the resolution set by said setting means.

57. An apparatus according to claim 56, wherein said setting means can manually set the resolution of the image to be recorded.

58. An apparatus according to claim 56, wherein said setting means sets the resolution of the image to be recorded, on the basis of a command output from said external apparatus.

59. An apparatus according to claim 56, wherein said gradation process means comprises density correction means for performing density correction of the input image data in accordance with the resolution set by said setting means.

60. An apparatus according to claim 59, wherein said density correction means has a plurality of density conversion tables, and selects a density conversion table to be used in accordance with the resolution set by said setting means.

61. An apparatus according to claim 56, further comprising pulse-width modulating means for comparing the density of the image data with a level of the predetermined pattern signal, and for outputting a pulse-width modulated signal having a pulse-width corresponding to a level thereof, wherein said pulse-width modulating means employs a predetermined pattern signal having a frequency according to the resolution set by said setting means.

62. An apparatus according to claim 61, wherein said predetermined signal is a triangular wave signal.

63. A recording apparatus, comprising:
a processing unit structured to process input data to generate image data, said input data being outputted by an external apparatus;
a recording unit structured to perform a recording operation on a recording medium on the basis of the image data, said recording unit including a beam generator for generating a beam modulated on the basis of the image data, and a beam scanner for scanning the modulated beam on a recording medium; and
a designator structured to designate a recording resolution at which said recording unit performs the recording operation, in accordance with a command from the external apparatus;
wherein said processing unit performs a different process on input data in accordance with the recording resolution designated by said designator, to output the processed data as the image data, and
wherein said recording unit changes a speed of scanning by said beam scanner in accordance with the designated recording density, so as to perform the recording operation at the designated recording resolution.

64. A recording apparatus according to claim 63, wherein said processing unit comprises a gradation processing unit for entering multi-level image data as the input data and for performing a different gradation process on inputted multi-level image data in accordance with the designation recording resolution designated by said designator.

65. A recording apparatus according to claim 64, wherein said gradation processing unit enters multi-value data as the input data to perform a binarizing operation, said gradation processing unit performing the binarizing operation by selectively using one of plural threshold values or one of plural sets of threshold values in accordance with the designation recording resolution designated by said designator.

66. A recording apparatus according to claim 65, wherein said gradation processing unit performs a binarizing operation by selectively using one of plural threshold matrices in accordance with the designation recording resolution.

67. An apparatus according to claim 66, wherein each of said plural threshold matrices has a matrix size according to the recording resolution corresponding thereto.

68. An apparatus according to claim 66, further comprising means for designating the number of lines, wherein said plural threshold matrices have respective different matrix sizes, and said apparatus uses the threshold matrices having matrix size according to the number lines designated by said number-of-lines designating means and the designated resolution.

69. A recording apparatus according to claim 63, wherein said processing unit changes a masking timing in accordance with the designation reporting resolution to perform a masking operation.

70. A recording apparatus according to claim 69, wherein said recording unit includes a beam generator for generating a beam modulated in accordance with the image data and a beam scanning unit for scanning the modulated beam, and
wherein said masking timing corresponds to a period of beam scanning of a non-image forming area and is a forced masking period of the beam.

71. An apparatus according to claim 63, wherein said apparatus inhibits changing the recording resolution during a recording operation.

72. An apparatus according to claim 63, wherein said beam generator is capable of controlling an amount of the light emission in accordance with the designated recording resolution.

73. An image processing apparatus for outputting an image signal to a recording means comprising:
data processing means for processing input data from an external data source to generate the image signal;
image data output means for outputting the image signal generated by said data processing means to said recording means; and
designating means for designating one of plural recording resolution in accordance with a command outputted from the external apparatus, so as to cause said recording means to perform the recording operation at the designated recording resolution;
wherein said data processing means performs a different processing on input data in accordance with the designated recording resolution, and
wherein said output means changes an image clock of the image signal to be outputted, in accordance with the designated recording resolution.

74. An image processing apparatus according to claim 73, wherein said designating means is capable of manually designating the recording resolution.

75. A recording apparatus comprising according to claim 73, wherein said processing means comprises a gradation processing unit for entering multi-level image data as the input data and for performing a different gradation process on inputted multi-level image data in accordance with the designation recording resolution designated by said designating means.

76. A recording apparatus according to claim 75, wherein said gradation processing unit enters multi-value data as the input data to perform a binarizing operation, said gradation processing unit performing the binarizing operation by selectively using one of plural threshold values or one of plural sets of threshold values in accordance with the designation recording resolution designated by said designating means.

77. A recording apparatus according to claim 76, wherein said gradation processing unit performs a binarizing operation by selectively using one of plural threshold matrices in accordance with the designation recording resolution.

78. An apparatus according to claim 77, wherein each of said plural threshold matrices has a matrix size according to the recording resolution corresponding thereto.

79. An apparatus according to claim 77, further comprising means for designating the number of lines, wherein said plural threshold matrices have respective different matrix sizes, and said apparatus uses the threshold matrices having matrix size according to the number of lines designated by said number-of-lines designating means and the designated resolution.

80. A recording apparatus according to claim 73, wherein said processing unit changes a masking timing in accordance with the designation reporting resolution to perform a masking operation.

81. A recording apparatus according to claim 80, wherein said recording unit includes a beam generator for generating a beam modulated in accordance with the image data and a beam scanning unit for scanning the modulated beam, and wherein said masking timing corresponds to a period of beam scanning of a non-image forming area and is a forced masking period of the beam.

82. An apparatus according to claim 73, wherein said apparatus inhibits changing the recording resolution during a recording operation.

83. An apparatus according to claim 73, wherein said beam generator is capable of controlling an amount of the light emission in accordance with the designated recording resolution.

* * * * *

UNITED STATES PATENT AND TRADEMARK OFFICE
CERTIFICATE OF CORRECTION

PATENT NO. : 5,140,349
DATED : August 18, 1992
INVENTOR(S) : Makoto Abe, et al.

It is certified that error appears in the above-identified patent and that said Letters Patent is hereby corrected as shown below:

COVER PAGE

Under [56] References Cited, U.S. Patent Documents,
"4,922,335    5/1990    Outa, et al.", should read
-- 4,922,335    5/1990    Dietz, et al. --, and
please insert:

| | | |
|---|---|---|
| -- 4,302,782 | 11/1981 | Gunning, et al. |
| 4,318,134 | 3/1982 | Partridge, et al. |
| 4,698,778 | 10/1987 | Ito, et al. |
| 4,758,866 | 7/1988 | Ito |
| 4,782,400 | 11/1988 | Ohtami |
| 4,841,375 | 6/1989 | Nakajima, et al. |
| 4,181,912 | 1/1980 | Satake --; |

Under [56] References Cited, Foreign Patent Documents, please insert:

| | | |
|---|---|---|
| -- 62-279953 | 12/1987 | Japan |
| 63-31371 | 2/1988 | Japan |
| 2,108,687 | 5/1983 | United Kingdom |
| 2,127,251 | 4/1984 | United Kingdom |
| 2,179,462 | 3/1987 | United Kingdom |
| 00375225 | 10/1981 | European Patent Office |
| 0050673 | 5/1982 | European Patent Office |
| 177,843 | 4/1986 | European Patent Office |
| 331,329 | 9/1989 | European Patent Office --; | and

UNITED STATES PATENT AND TRADEMARK OFFICE
CERTIFICATE OF CORRECTION

PATENT NO. : 5,140,349

DATED : August 18, 1992

INVENTOR(S) : Makoto Abe, et al.

It is certified that error appears in the above-identified patent and that said Letters Patent is hereby corrected as shown below:

COVER PAGE (Cont.)

Under [56] References Cited, after "Foreign Patent Documents", please insert:

--          OTHER DOCUMENTS

Electronic & Communications in Japan/Part II, Vol. 70, No. 9, Sept. 1987, Tanaka, et al., "A High-Quality Color Printing Technology By Electrophotography", pp. 12-18. --

COLUMN 1

Line 8, "INVENTION:" should read --INVENTION--.

COLUMN 16

Line 29, "control" should read --controls--.

COLUMN 17

Line 13, "FIG. 13A" should read --FIG. 13--;
Line 28, "$V_L,$" should read --$V_L$--; and
Line 32, "$V_L,$" should read --$V_L$--.

UNITED STATES PATENT AND TRADEMARK OFFICE
CERTIFICATE OF CORRECTION

PATENT NO. : 5,140,349
DATED : August 18, 1992
INVENTOR(S) : Makoto Abe, et al.

It is certified that error appears in the above-identified patent and that said Letters Patent is hereby corrected as shown below:

COLUMN 20

Line 21, "comparator 243. . The" should read --comparator 243.
    The--.

COLUMN 23

Line 21, "control line 75B" should read --control line 758--.

COLUMN 33

Line 35, "lutions", both occurrences should read --lution--.

UNITED STATES PATENT AND TRADEMARK OFFICE
CERTIFICATE OF CORRECTION

PATENT NO. : 5,140,349

DATED : August 18, 1992

INVENTOR(S) : Makoto Abe, et al.

It is certified that error appears in the above-identified patent and that said Letters Patent is hereby corrected as shown below:

COLUMN 35

Line 44, "claim 41," should read --claim 33,--; and
Line 46, "reporting" should read --recording--.

Signed and Sealed this

Twenty-first Day of June, 1994

Attest:

BRUCE LEHMAN

Attesting Officer

Commissioner of Patents and Trademarks